US012811760B2

(12) United States Patent
Wang et al.

(10) Patent No.: US 12,811,760 B2
(45) Date of Patent: Nov. 24, 2026

(54) ANTENNA STRUCTURE AND ELECTRONIC DEVICE

(71) Applicant: Huawei Technologies Co., Ltd., Shenzhen (CN)

(72) Inventors: Hanyang Wang, Reading (GB); Chuanbo Shi, Shanghai (CN); Pengfei Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 18/682,239

(22) PCT Filed: Aug. 5, 2022

(86) PCT No.: PCT/US2022/110435

§ 371 (c)(1),
(2) Date: Feb. 8, 2024

(87) PCT Pub. No.: WO2023/016353

PCT Pub. Date: Feb. 16, 2023

(65) Prior Publication Data

US 2025/0226962 A1 Jul. 10, 2025

(30) Foreign Application Priority Data

Aug. 12, 2021 (CN) ......................... 202110922415.4

(51) Int. Cl.
*H04L 5/00* (2006.01)
*H01Q 1/36* (2006.01)
*H01Q 13/16* (2006.01)

(52) U.S. Cl.
CPC ........... *H04L 5/0098* (2013.01); *H01Q 13/16* (2013.01)

(58) Field of Classification Search
CPC .......... H01Q 1/243; H01Q 1/36; H01Q 1/521; H01Q 13/10; H01Q 21/30; H01Q 1/38;
(Continued)

(56) References Cited

U.S. PATENT DOCUMENTS 5,446,471 A 8/1995 Chung et al.
2003/0090426 A1 5/2003 Sun et al.
(Continued)

FOREIGN PATENT DOCUMENTS

CN 105144479 A 12/2015
CN 109586017 A * 4/2019 ............... H01Q 1/36
(Continued)

*Primary Examiner* — Wei (Victor) Y Chan
(74) *Attorney, Agent, or Firm* — Slater Matsil, LLP

(57) ABSTRACT

According to embodiments, an antenna structure may include a first antenna element and a second antenna element. A first slot of the first antenna element and a second slot of the second antenna element extend in a first direction and are spaced apart in a second direction, and projections of the first slot and the second slot in the second direction at least partially overlap, where the second direction is perpendicular to the first direction. A first feed point of the first antenna element is disposed in a central region of the first slot, or disposed at an end of the first slot, and a second feed point of the second antenna element is disposed at an end of the second slot. An operating frequency band of the first antenna element is the same as or adjacent to an operating frequency band of the second antenna element.

20 Claims, 38 Drawing Sheets

(58) Field of Classification Search
CPC ............ H01Q 21/28; H01Q 9/42; H01Q 1/48; H01Q 1/50; H01Q 5/378; H01Q 5/364
See application file for complete search history.

(56) References Cited

U.S. PATENT DOCUMENTS

| | | | | |
|---|---|---|---|---|
| 2009/0153407 | A1* | 6/2009 | Zhang | H01Q 1/243 343/702 |
| 2010/0302112 | A1* | 12/2010 | Lindenmeier | H01Q 21/24 343/730 |
| 2012/0256802 | A1* | 10/2012 | Wong | H01Q 5/40 343/771 |
| 2016/0294048 | A1* | 10/2016 | Xu | H01Q 1/2291 |
| 2021/0013626 | A1* | 1/2021 | Jang | H01Q 1/2258 |
| 2021/0036431 | A1* | 2/2021 | Wu | H01Q 1/52 |
| 2021/0044003 | A1* | 2/2021 | Ma | H01Q 13/10 |
| 2021/0066808 | A1* | 3/2021 | Tanaka | H01Q 1/3275 |
| 2021/0075108 | A1* | 3/2021 | Lin | H01Q 5/307 |
| 2021/0226318 | A1* | 7/2021 | Chen | H01Q 1/243 |
| 2021/0265736 | A1* | 8/2021 | Takahashi | H01Q 21/0043 |
| 2021/0399427 | A1* | 12/2021 | Hu | H01Q 9/0457 |
| 2022/0069473 | A1* | 3/2022 | Lai | H01Q 5/357 |

FOREIGN PATENT DOCUMENTS

| | | | |
|---|---|---|---|
| CN | 111293413 | A | 6/2020 |
| WO | 2020114607 | A1 | 6/2020 |
| WO | 2020224757 | A1 | 11/2020 |

* cited by examiner

Sectional view 3.15 GHz 3.12 GHz 2.52 GHz 2.52 GHz 2.45 GHz
(a)

2.45 GHz
(b)

2.45 GHz
(a)

2.45 GHz
(b)

ANTENNA STRUCTURE AND ELECTRONIC DEVICE

CROSS-REFERENCE TO RELATED APPLICATIONS

This application is a national stage of International Application No. PCT/CN2022/110435, filed on Aug. 5, 2022, which claims priority to Chinese Patent Application No. 202110922415.4, filed on Aug. 12, 2021. Both of the aforementioned applications are hereby incorporated by reference in their entireties.

TECHNICAL FIELD

This application relates to the field of wireless communication, and in particular, to an antenna structure and an electronic device.

BACKGROUND

For electronic devices, especially mobile phone products, with rapid development of key technologies such as curved and flexible screens, thinning and an ultimate screen-to-body ratio of an industrial design (industrial design, ID) have become a trend. This design greatly reduces antenna space. In addition, the electronic device, has an increasingly high requirement for some functions, such as photographing. This leads to a gradual increase in a quantity and size of cameras as well as complexity of an antenna design in the electronic device. In such an environment, a multi-input multi-output (multi-input multi-output, MIMO) antenna system usually has insufficient space for design, or fails to achieve high system isolation or a high envelope correlation coefficient (envelope correlation coefficient, ECC) when a conventional design is used in compact space. Consequently, it is difficult to meet performance requirements of a communication frequency band. In a current state, frequency bands of a third generation mobile communication technology (3rd generation wireless systems, 3G), a fourth generation mobile communication technology (4th generation wireless systems, 4G), and a fifth generation mobile communication technology (5th generation wireless systems, 5G) coexist as electronic device communication frequency bands for a long time. This leads to an increasing quantity of antennas, a wider frequency band coverage, and more mutual impact. Based on these changes, it is an urgent task to implement a new type of antenna with a wide frequency band, a small area, and a high degree of freedom on an electronic device.

SUMMARY

This application provides an antenna structure and an electronic device. The antenna structure may include a first antenna element and a second antenna element. An operating frequency band of the first antenna element is the same as or adjacent to an operating frequency band of the second antenna element; and the first antenna element and the second antenna element have good isolation, and may be applied to a multi-input multi-output antenna system. In addition, a radiating element of the first antenna element and a radiating element of the second antenna element may be disposed in parallel and be spaced apart, to reduce space occupied by the antenna structure. This is applicable to increasingly limited internal space of an electronic device.

According to a first aspect, an antenna structure is provided. The antenna structure includes: a first antenna element, where the first antenna element includes a first slot and a first feed point; and a second antenna element, where the second antenna element includes a second slot and a second feed point. The first slot and the second slot extend in a first direction and are spaced apart in a second direction, the second direction is perpendicular to the first direction, projections of the first slot and the second slot in the second direction at least partially overlap, a spacing distance between the first slot and the second slot in the second direction is less than a quarter of a first wavelength or a quarter of a second wavelength, the first wavelength is a wavelength corresponding to an operating frequency band of the first antenna element, and the second wavelength is a wavelength corresponding to an operating frequency band of the second antenna element. The first feed point is disposed in a central region of the first slot, or the first feed point is disposed at an end of the first slot, and the first feed point is configured to feed the first antenna element. The second feed point is disposed at an end of the second slot, and the second feed point is configured to feed the second antenna element.

According to the technical solution in this embodiment of this application, the first antenna element uses a symmetrical central feed manner, and electric fields generated by the first antenna element are symmetrically distributed. The second antenna element uses an offset central feed manner, and electric fields generated by the second antenna element are anti-symmetrically distributed. Because the electric field generated by the first antenna element is orthogonal to the electric field generated by the second antenna element (the electric fields of the first antenna element are symmetrically distributed, and the electric fields of the second antenna element are anti-symmetrically distributed), isolation between the first antenna element and the second antenna element is good.

With reference to the first aspect, in some implementations of the first aspect, the first operating frequency band of the first antenna element is the same as or adjacent to the second operating frequency band of the second antenna element.

According to the technical solution in this embodiment of this application, the operating frequency band of the first antenna element is the same as or adjacent to the operating frequency band of the second antenna element; and the first antenna element and the second antenna element have good isolation, and may be applied to a multi-input multi-output antenna system.

With reference to the first aspect, in some implementations of the first aspect, that the first operating frequency band is adjacent to the second operating frequency band means that a difference between a start frequency point of the first operating frequency band and an end frequency point of the second operating frequency band is less than 10% of a center frequency of the first operating frequency band, and a frequency of a frequency point in the first operating frequency band is greater than a frequency of a frequency point in the second operating frequency band.

With reference to the first aspect, in some implementations of the first aspect, a spacing distance between a virtual symmetry axis of the first slot and a virtual symmetry axis of the second slot in the first direction is less than a quarter of the first wavelength or a quarter of the second wavelength.

With reference to the first aspect, in some implementations of the first aspect, the virtual symmetry axis of the first slot overlaps the virtual symmetry axis of the second slot.

According to the technical solution in this embodiment of this application, as overall symmetry of the antenna structure increases, a radiation characteristic of the antenna structure becomes better. However, in an electronic device, an antenna structure needs to be designed with reference to internal space of the electronic device. Therefore, the virtual symmetry axis of the first slot and the virtual symmetry axis of the second slot may not necessarily fully overlap. When the spacing distance between the virtual symmetry axis of the first slot and the virtual symmetry axis of the second slot in the first direction is less than a quarter of the first wavelength or less than a quarter of the second wavelength, good isolation may also be maintained between the first antenna element and the second antenna element.

With reference to the first aspect, in some implementations of the first aspect, the first feed point is disposed in the central region of the first slot, an electrical length of the first slot is the first wavelength, and an electrical length of the second slot is the second wavelength.

According to the technical solution in this embodiment of this application, all sizes of antenna radiators may be based on one time of an operating wavelength. Because the size of the radiator of the antenna structure is large, radiation efficiency of the antenna structure can be improved by increasing a radiation aperture. Therefore, radiation efficiency bandwidths of the foregoing antenna structures are good.

With reference to the first aspect, in some implementations of the first aspect, the first feed point is disposed at an end of the first slot, an electrical length of the first slot is a half of the first wavelength, and an electrical length of the second slot is the second wavelength.

According to the technical solution in this embodiment of this application, all sizes of antenna radiators may be based on a half of an operating wavelength, so that a size of the antenna structure can be reduced.

With reference to the first aspect, in some implementations of the first aspect, the first feed point and the second feed point are disposed on a same side of a virtual axis, the virtual axis is the virtual symmetry axis of the first slot or the virtual symmetry axis of the second slot, and the virtual axis is perpendicular to the first direction.

According to the technical solution in this embodiment of this application, the first feed point and the second feed point may be disposed on a same side of the virtual axis, or may be respectively disposed on two sides of the virtual axis based on an actual design.

With reference to the first aspect, in some implementations of the first aspect, the spacing distance between the first slot and the second slot in the second direction is less than 10 mm.

According to the technical solution in this embodiment of this application, the distance between the first slot and the second slot may be considered as a shortest straight-line distance between a point in the first slot and a point in the second slot.

According to a second aspect, an electronic device is provided, including the antenna structure according to any implementation of the first aspect. The electronic device further includes one or more conductive parts, where a first slot of a first antenna element or a second slot of a second antenna element is either of the following slots: a slot disposed on the conductive part, or a slot formed between at least two of the one or more conductive parts.

According to a third aspect, an antenna structure is provided. The antenna structure includes: a first antenna element, where the first antenna element includes a slot and a first feed point; and a second antenna element, where the second antenna element includes a radiator and a second feed point. The slot and the radiator extend in a first direction and are spaced apart in a second direction, the second direction is perpendicular to the first direction, projections of the slot and the radiator in the second direction at least partially overlap, a spacing distance between the slot and the radiator in the second direction is less than a quarter of a first wavelength or a quarter of a second wavelength, the first wavelength is a wavelength corresponding to an operating frequency band of the first antenna element, and the second wavelength is a wavelength corresponding to an operating frequency band of the second antenna element. The first feed point is disposed at an end of the slot, and the first feed point is configured to feed the first antenna element. The second feed point is disposed in a central region of the radiator, or the second feed point is disposed at an end of the radiator, and the second feed point is configured to feed the second antenna element.

According to the technical solution in this embodiment of this application, the first antenna element uses an offset central feed manner, the second antenna element uses a symmetrical central feed manner or an offset central feed manner, and an electric field generated by the first antenna element is orthogonal to an electric field generated by the second antenna element. Therefore, isolation between the first antenna element and the second antenna element is good.

With reference to the third aspect, in some implementations of the third aspect, a first operating frequency band of the first antenna element is the same as or adjacent to a second operating frequency band of the second antenna element.

According to the technical solution in this embodiment of this application, the operating frequency band of the first antenna element is the same as or adjacent to the operating frequency band of the second antenna element; and the first antenna element and the second antenna element have good isolation, and may be applied to a multi-input multi-output antenna system.

With reference to the third aspect, in some implementations of the third aspect, a spacing distance between a virtual symmetry axis of the slot and a virtual symmetry axis of the radiator in the first direction is less than a quarter of the first wavelength or a quarter of the second wavelength.

With reference to the third aspect, in some implementations of the third aspect, the virtual symmetry axis of the slot overlaps the virtual symmetry axis of the radiator.

According to the technical solution in this embodiment of this application, as overall symmetry of the antenna structure increases, a radiation characteristic of the antenna structure becomes better. However, in an electronic device, an antenna structure needs to be designed with reference to internal space of the electronic device. Therefore, the virtual symmetry axis of the first slot and the virtual symmetry axis of the second slot may not necessarily fully overlap. When the spacing distance between the virtual symmetry axis of the first slot and the virtual symmetry axis of the second slot in the first direction is less than a quarter of the first wavelength or less than a quarter of the second wavelength, good isolation may also be maintained between the first antenna element and the second antenna element.

With reference to the third aspect, in some implementations of the third aspect, an electrical length of the slot is the first wavelength, and an electrical length of the radiator is the second wavelength.

According to a fourth aspect, an electronic device is provided, including the antenna structure according to any implementation of the foregoing third aspect. The electronic device further includes one or more conductive parts, where a slot of a first antenna is either of the following slots: a slot disposed on a first conductive part in the one or more conductive parts, or a slot formed between at least a first conductive part and a second conductive part in the one or more conductive parts.

With reference to the fourth aspect, in some implementations of the fourth aspect, a radiator of a second antenna is a third conductive part in the one or more conductive parts, and two ends of the radiator are open.

According to a fifth aspect, an antenna structure is provided. The antenna structure includes: a first antenna element, where the first antenna element includes a first radiator and a first feed point; and a second antenna element, where the second antenna element includes a second radiator and a second feed point. The first radiator and the second radiator are disposed in parallel and are spaced apart, a spacing distance between the first radiator and the second radiator is less than a quarter of a first wavelength or a quarter of a second wavelength, the first wavelength is a wavelength corresponding to an operating frequency band of the first antenna, the second wavelength is a wavelength corresponding to an operating frequency band of the second antenna, and an electrical length of the first radiator is the first wavelength and/or an electrical length of the second radiator is the first wavelength. An electric field generated by the first antenna element is orthogonal to an electric field generated by the second antenna element, or a current generated by the first antenna element is orthogonal to a current generated by the second antenna element.

With reference to the fifth aspect, in some implementations of the fifth aspect, a first operating frequency band of the first antenna element is the same as or adjacent to a second operating frequency band of the second antenna element.

With reference to the fifth aspect, in some implementations of the fifth aspect, the electric fields generated by the first antenna element are anti-symmetrical along a virtual axis, the electric fields generated by the second antenna element are symmetrical along the virtual axis, and the virtual axis is a virtual symmetry axis of the first radiator or a virtual symmetry axis of the second radiator. Alternatively, currents generated by the first antenna element are anti-symmetrical along the virtual axis, and currents generated by the second antenna element are symmetrical along the virtual axis.

DETAILED DESCRIPTION OF ILLUSTRATIVE EMBODIMENTS

Figure 1:
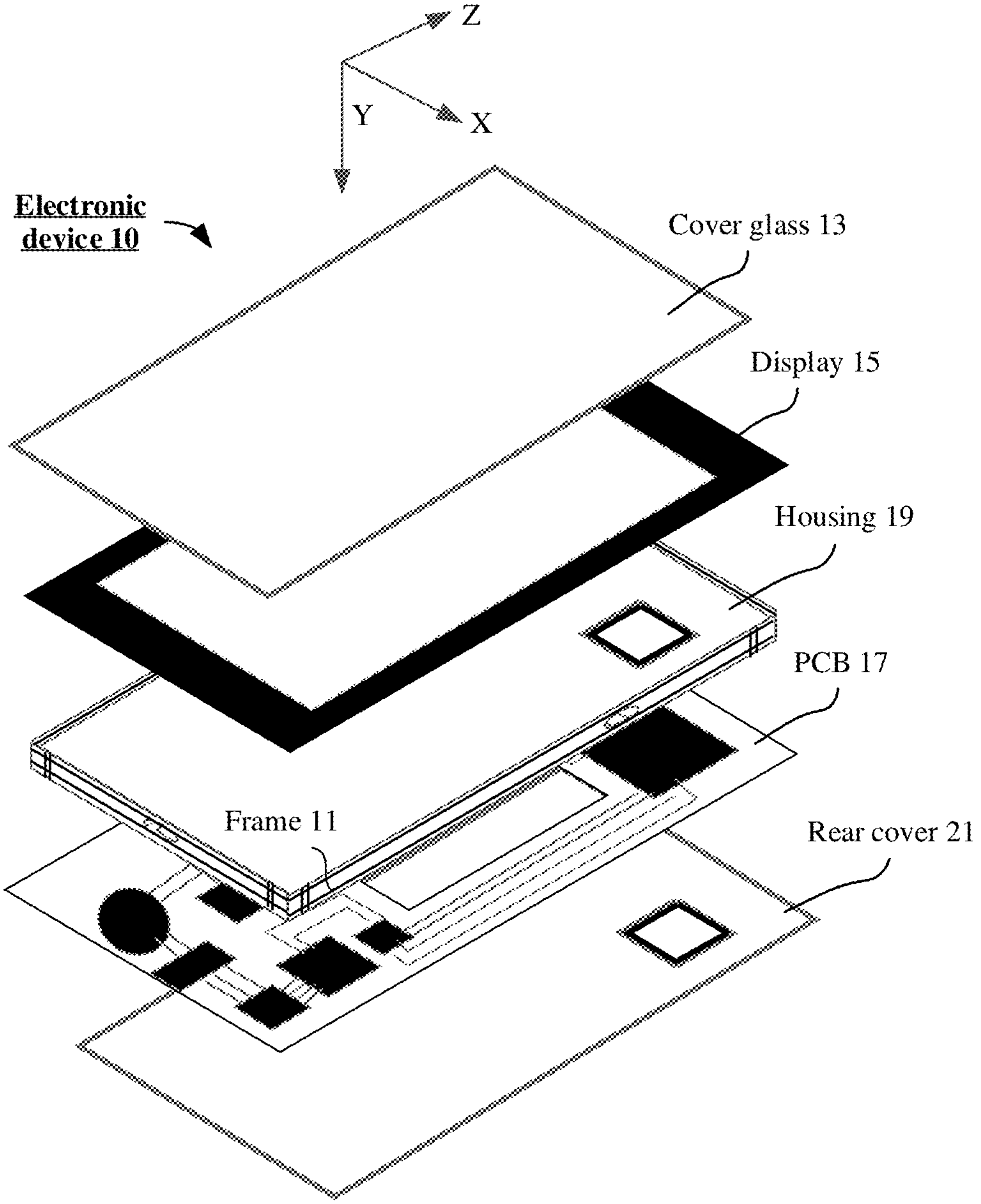
FIG. 1 is a schematic diagram of an electronic device according to an embodiment of this application.

The following describes technical solutions of this application with reference to accompanying drawings.

It should be understood that, in this application, an "electrical connection" may be understood as a form in which components are physically in contact and electrically conducted; or may be understood as a form in which different components in a line structure are connected by using physical lines that can transmit an electrical signal, such as printed circuit board (printed circuit board, PCB) copper foil or a conducting wire; or may be understood as a form of performing mid-air electrical conduction in an indirect coupling manner. "Coupling" may be understood as a form of performing mid-air electrical conduction in an indirect coupling manner. A person skilled in the art may understand that a coupling phenomenon refers to a phenomenon that close cooperation and mutual influence exist between inputs and outputs of two or more circuit elements or electrical networks, and energy is transmitted from one side to another side through interaction. Both "connection" and "interconnection" may refer to a mechanical connection relationship or a physical connection relationship. For example, A-B connection or A-B interconnection means that a fastening component (like a screw, a bolt, or a rivet) may exist between A and B, or that A and B are in contact with each other and are difficult to be separated.

Antenna pattern: The antenna pattern is also referred to as a radiation pattern. The antenna pattern refers to a pattern in which a relative field strength (a normalized modulus value) of an antenna radiation field changes with a direction at a specific distance from the antenna. The antenna pattern is usually represented by two plane patterns that are perpendicular to each other in a maximum radiation direction of an antenna.

The antenna pattern usually includes a plurality of radiation beams. A radiation beam with a highest radiation intensity is referred to as a main lobe, and other radiation beams are referred to as side lobes or minor lobes. In the side lobes, a side lobe in a direction opposite to the main lobe is also referred to as a back lobe.

Antenna total efficiency: The antenna total efficiency refers to a ratio of a power (namely, a power effectively converted to electromagnetic waves) radiated by an antenna to space to an input power of the antenna. Total efficiency is actual efficiency obtained after antenna port matching is considered, that is, the antenna total efficiency is actual efficiency (namely, efficiency) of the antenna.

Antenna radiation efficiency: The antenna radiation efficiency refers to a ratio of a power (namely, a power effectively converted to electromagnetic waves) radiated by an antenna to space to an active power input to the antenna. The active power input to the antenna is equal to an input power of the antenna minus a loss power, where the loss power mainly includes a return loss power and an Ohmic loss power of metal and/or a dielectric loss power. Radiation efficiency is a value used to measure a radiation capability of an antenna. Both a metal loss and a dielectric loss are factors that affect the radiation efficiency.

A person skilled in the art may understand that efficiency is generally represented by a percentage, and there is a corresponding conversion relationship between the efficiency and dB. Efficiency closer to 0 dB indicates better efficiency of the antenna.

Antenna return loss: The antenna return loss may be understood as a ratio of a power of a signal reflected back to an antenna port by an antenna circuit to a transmit power of the antenna port. A smaller reflected signal indicates a larger signal radiated to space through an antenna and indicates higher radiation efficiency of the antenna. A larger reflected signal indicates a smaller signal radiated to the space through the antenna and indicates lower radiation efficiency of the antenna.

The antenna return loss may be represented by using an S11 parameter, and S11 belongs to one of S parameters. S11 indicates a reflection coefficient, and can indicate a level of transmit efficiency of the antenna. The S11 parameter is usually a negative number. A smaller S11 parameter indicates a smaller antenna return loss and less energy reflected by the antenna. In other words, more energy that actually enters the antenna indicates higher antenna total efficiency.

A larger S11 parameter indicates a larger antenna return loss and lower antenna total efficiency.

It should be noted that, in engineering, an S11 value of −6 dB is generally used as a standard. When an S11 value of the antenna is less than −6 dB, it may be considered that the antenna can operate normally, or it may be considered that transmit efficiency of the antenna is good.

Antenna isolation: The antenna isolation refers to a ratio of a signal that is transmitted by one antenna and received by another antenna to the transmitted antenna signal. Isolation is a physical quantity used to measure a degree of mutual coupling between antennas. It is assumed that two antennas form a dual-port network. In this case, isolation between the two antennas is S21 and S12 between the antennas. The antenna isolation may be represented by using a parameter S21 and a parameter S12. The parameter S21 and the parameter S12 are usually negative numbers. A smaller S21 parameter and a smaller S12 parameter indicate larger isolation between the antennas and a smaller degree of mutual coupling between the antennas. A larger parameter S21 and a larger parameter S12 indicate smaller isolation between the antennas and a larger degree of mutual coupling between the antennas. The antenna isolation depends on an antenna radiation pattern, an antenna space distance, an antenna gain, and the like.

Ground: The ground may generally refer to at least a part of any ground layer, or ground plane, or ground metal layer in an electronic device (like a mobile phone), or at least a part of any combination of any ground layer, or ground plane, or ground component. The "ground" may be used to ground a component in the electronic device. In an embodiment, the "ground" may be a ground layer of a circuit board of an electronic device, or may be a ground metal layer formed by a ground plane formed using a housing of the electronic device or a metal thin film below a screen in the electronic device. In an embodiment, the circuit board may be a printed circuit board (printed circuit board, PCB), for example, an 8-layer, 10-layer, or 12-layer to 14-layer board having 8, 10, 12, 13, or 14 layers of conductive materials, or an element that is separated by a dielectric layer or insulation layer like glass fiber or polymer and that is electrically insulated. In an embodiment, the circuit board includes a dielectric substrate, a ground layer, and a wiring layer. The wiring layer and the ground layer are electrically connected through a via. In an embodiment, components such as a display 120, a touchscreen, an input button, a transmitter, a processor, a memory, a battery 140, a charging circuit, and a system on chip (system on chip, SoC) structure may be installed on or connected to the circuit board, or electrically connected to the wiring layer and/or the ground layer in the circuit board. For example, a radio frequency source is disposed at the wiring layer.

Any of the foregoing ground layer, or ground plane, or ground metal layer is made of a conductive material. In an embodiment, the conductive material may be any one of the following materials: copper, aluminum, stainless steel, brass and alloys thereof, copper foil on insulation laminates, aluminum foil on insulation laminates, gold foil on insulation laminates, silver-plated copper, silver-plated copper foil on insulation laminates, silver foil on insulation laminates and tin-plated copper, cloth impregnated with graphite powder, graphite-coated laminates, copper-plated laminates, brass-plated laminates and aluminum-plated laminates. A person skilled in the art may understand that the ground layer/ground plane/ground metal layer may alternatively be made of another conductive material.

The technical solutions provided in this application are applicable to an electronic device that uses one or more of the following communication technologies: a Bluetooth (Blue tooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, and other future communication technologies. The electronic device in embodiments of this application may be a mobile phone, a tablet computer, a laptop computer, a smart band, a smart watch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, an electronic device in a 5G network, an electronic device in a future evolved public land mobile network (public land mobile network, PLMN), or the like. This is not limited in this embodiment of this application.

FIG. 1 shows an example of an internal environment of an electronic device according to this application. An example in which the electronic device is a mobile phone is used for description.

As shown in FIG. 1, an electronic device 10 may include a cover glass (cover glass) 13, a display (display) 15, a printed circuit board (printed circuit board, PCB) 17, a housing (housing) 19, and a rear cover (rear cover) 21.

The cover glass 13 may be disposed snugly against the display 15, and may be mainly used to protect the display 15 for dust resistance.

In an embodiment, the display 15 may be a liquid crystal display (liquid crystal display, LCD), a light-emitting diode (light-emitting diode, LED) display, an organic light-emitting diode (organic light-emitting diode, OLED) display, or the like. This is not limited in this application.

The printed circuit board PCB 17 may be a flame-resistant material (FR-4) dielectric board, or may be a Rogers (Rogers) dielectric board, or may be a hybrid dielectric board of Rogers and FR-4, or the like. Herein, FR-4 is a grade designation for a flame-resistant material, the Rogers dielectric board is a high-frequency board. A metal layer may be disposed on a side that is of the printed circuit board PCB 17 and that is close to the housing 19, and the metal layer may be formed by etching metal on a surface of the PCB 17. The metal layer may be used to ground an electronic component carried on the printed circuit board PCB 17, to prevent a user from an electric shock or a device from being damaged. The metal layer may be referred to as a PCB ground plane. Not limited to the PCB ground plane, the electronic device 10 may alternatively have another ground plane for grounding, for example, a metal housing or another metal plane in the electronic device. In addition, a plurality of electronic components are disposed on the PCB 17, and the plurality of electronic components include one or more of a processor, a power management module, a memory, a sensor, a SIM card interface, and the like. Metal is also disposed inside or on surfaces of these electronic components.

The electronic device 10 may further include a battery, which is not shown herein. The battery may be disposed in the housing 19, the battery may divide the PCB 17 into a main board and a sub-board, the main board may be disposed between a frame 11 of the housing 19 and an upper edge of the battery, and the sub-board may be disposed between the housing 19 and a lower edge of the battery. A metal layer is also disposed inside or on a surface of the battery.

The housing 19 is mainly used to support the electronic device 10. The housing 19 may include the frame 11, and the frame 11 may be formed of a conductive material like metal. The frame 11 may extend around peripheries of the electronic device 10 and the display 15. The frame 11 may specifically surround four side edges of the display 15, to help fasten the display 15. In an implementation, the frame 11 made of a metal material may be directly used as a metal frame of the electronic device 10 to form an appearance of the metal frame, and is applicable to a metal industrial design (industrial design, ID). In another implementation, an outer surface of the frame 11 may alternatively be a non-metal material, for example, a plastic frame, to form an appearance of the non-metal frame, and is applicable to a non-metal ID.

The rear cover 21 may be a rear cover made of a metal material, or may be a rear cover made of a non-conductive material, for example, a glass rear cover, a plastic rear cover, or another non-metal rear cover.

FIG. 1 shows only an example of some components included in the electronic device 10. Actual shapes, actual sizes, and actual construction of these components are not limited to those shown FIG. 1. In addition, the electronic device 10 may further include components such as a camera and a sensor.

With rapid development of wireless communication technologies, a second generation (second generation, 2G) mobile communication system mainly supports a call function, an electronic device is only a tool used by people to send and receive text messages and perform voice communication, and a wireless network access function is very slow because data is transmitted through a voice channel. Currently, in addition to making a call, sending an SMS message, and taking a photo, the electronic device can also be used for listening to music online, watching an online movie, perform real-time video calling, and the like, covering various applications such as calling, film and television entertainment, and e-commerce in people's life. For a plurality of functional applications, data needs to be uploaded and downloaded through a wireless network. As people have an increasing demand for high-speed data transmission, a requirement for an antenna becomes higher. However, a volume left for the antenna in the electronic device is limited. As a fifth generation (5th generation, 5G) wireless communication system has an increasing requirement for a quantity of antennas, an antenna design with high isolation and a plurality of frequency bands becomes increasingly important.

An embodiment of this application provides an electronic device, including an antenna structure. The antenna structure may include a first antenna element and a second antenna element. An operating frequency band of the first antenna element is the same as or adjacent to an operating frequency band of the second antenna element; and the first antenna element and the second antenna element have good isolation, and may be applied to a multi-input multi-output (multi-input multi-output, MIMO) antenna system. In addition, a radiating element of the first antenna element and a radiating element of the second antenna element may be disposed in parallel and be spaced apart, to reduce space occupied by the antenna structure. This is applicable to increasingly limited internal space of an electronic device.

It should be understood that, mentioned in this specification, that the operating frequency band of the first antenna element is the same as the operating frequency band of the second antenna element (also referred to as intra-frequency) may alternatively be understood as any one of the following cases:

The operating frequency band of the first antenna element and the operating frequency band of the second antenna element include a same communication frequency band. For example, both the first antenna element and the second antenna element are used as subunits in the MIMO antenna system, and both the operating frequency band of the first antenna element and the operating frequency band of the second antenna element include a sub-6G frequency band in 5G. In this case, it may be considered that the first antenna element and the second antenna element are intra-frequency antenna elements.

A frequency of the operating frequency band of the first antenna element partially overlaps a frequency of the operating frequency band of the second antenna element. For example, the operating frequency band of the first antenna element includes B35 (1.85-1.91 GHz) in LTE, the operating band of the second antenna element includes B39 (1.88-1.92 GHz) in LTE, and the frequency of the operating band of the first antenna element partially overlaps the frequency of the operating band of the second antenna element. In this case, it may be considered that the first antenna element and the second antenna element are intra-frequency antenna elements.

It should be understood that, that the operating frequency band of the first antenna element is adjacent to the operating frequency band of the second antenna element may be understood as the following:

when a difference between the operating frequency band of the first antenna element and the operating frequency band of the second antenna element is small, it may be considered that a difference between a start frequency point of a high frequency band and an end frequency point of a low frequency band is less than 10% of a center frequency of the high frequency band. For example, the operating frequency band of the first antenna element includes B3 (1.71-1.785 GHz) in LTE, the operating frequency band of the second antenna element includes L1 (1578.42±1.023 MHz) in GPS, and a difference between B3 (1.71-1.785 GHz) and L1 (1578.42±1.023 MHz) is small; or the operating frequency band of the first antenna element includes B40 (2.3-2.4 GHz) in LTE, the operating frequency band of the second antenna element includes a BT frequency band (2.4-2.485 GHZ), and a difference between B40 (2.3-2.4 GHz) and the BT frequency band (2.4-2.485 GHZ) is small. In this case, it may be considered that the operating frequency band of the first antenna element is adjacent to the operating frequency band of the second antenna element.

Figure 2:
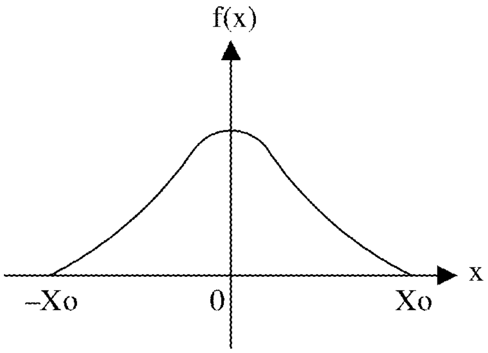
FIG. 2 is a schematic diagram of an even function according to an embodiment of this application.
Figure 3:
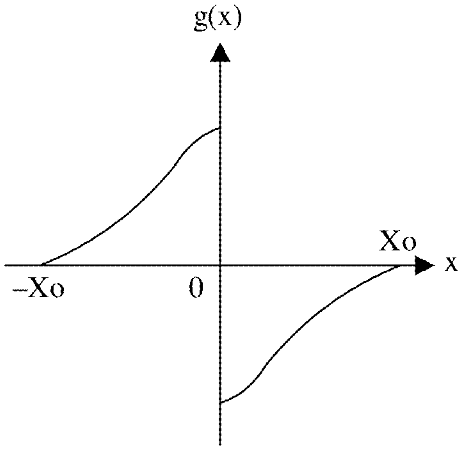
FIG. 3 is a schematic diagram of an odd function according to an embodiment of this application.
Figure 4:
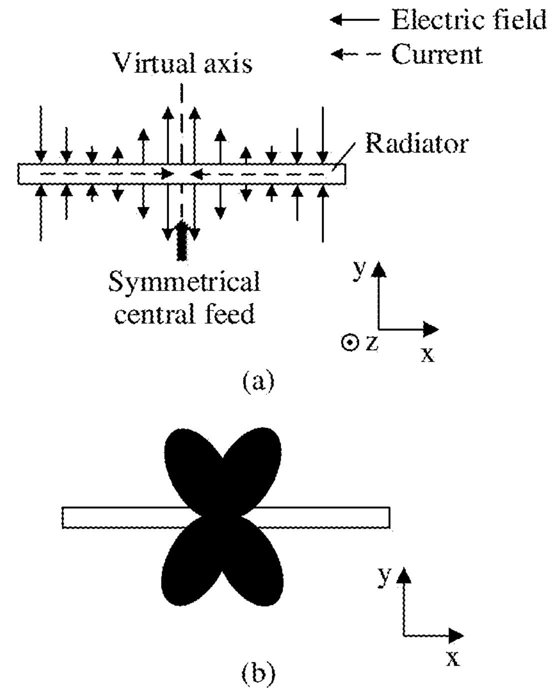
FIG. 4 is a schematic diagram of a symmetrical central feed manner used by a wire antenna according to an embodiment of this application.
Figure 5:
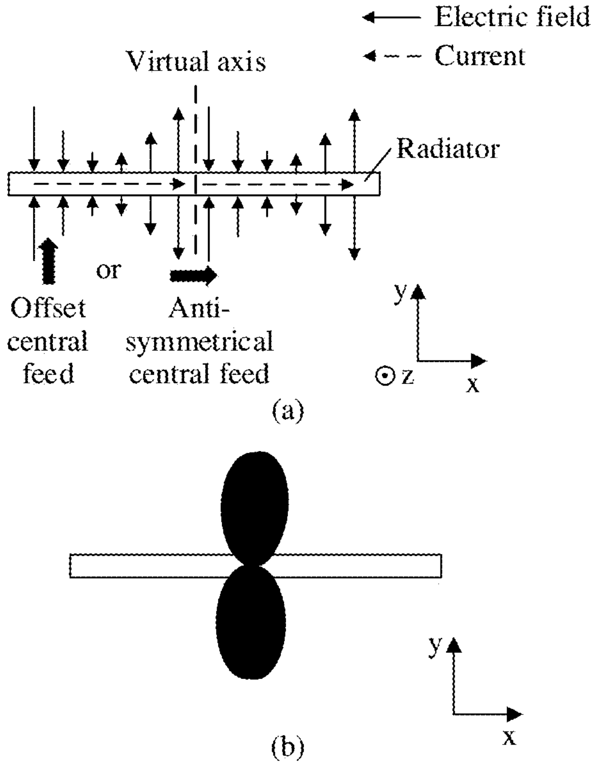
FIG. 5 is a schematic diagram of an offset central feed or anti-symmetrical central feed manner used by a wire antenna according to an embodiment of this application.
Figure 6:
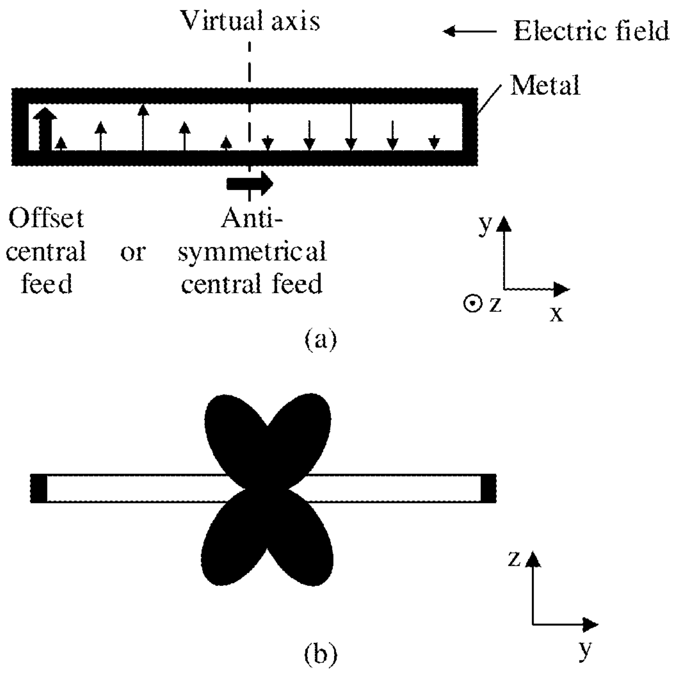
FIG. 6 is a schematic diagram of an offset central feed manner or anti-symmetrical central feed manner used by a slot antenna according to an embodiment of this application.
Figure 7:
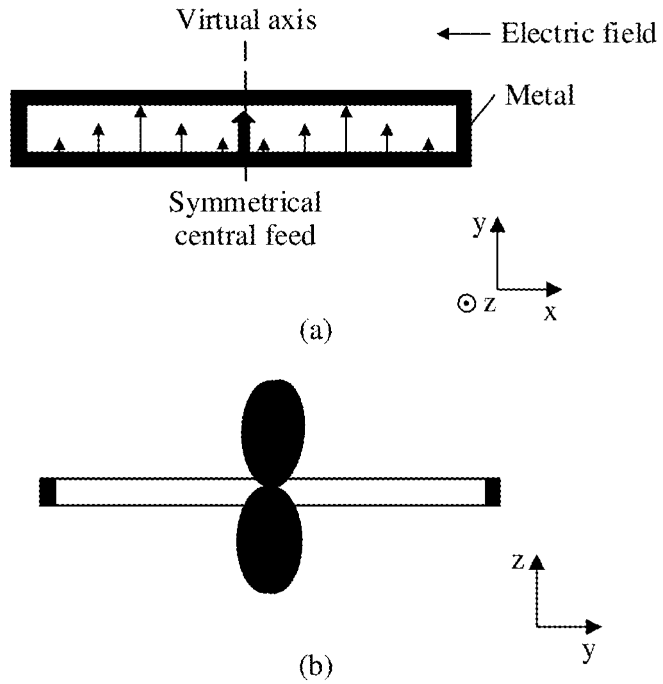
FIG. 7 is a schematic diagram of a symmetrical central feed manner used by a slot antenna according to an embodiment of this application.
Figure 8:
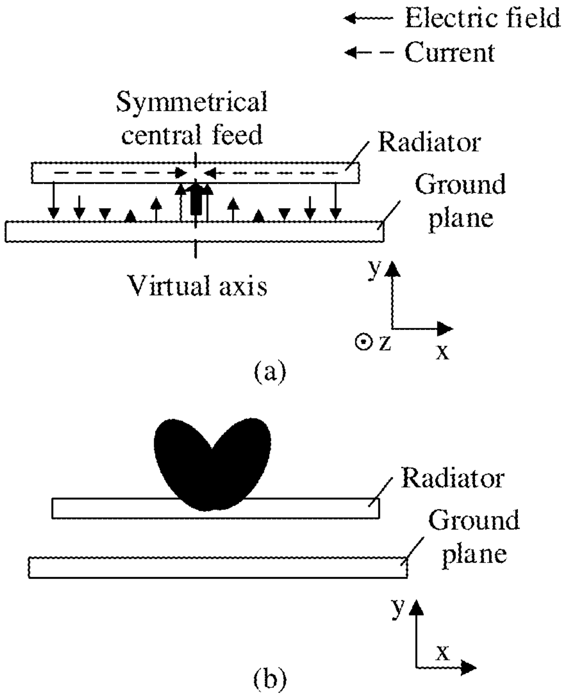
FIG. 8 is a schematic diagram of a symmetrical central feed manner used by a patch antenna according to an embodiment of this application.
Figure 9:
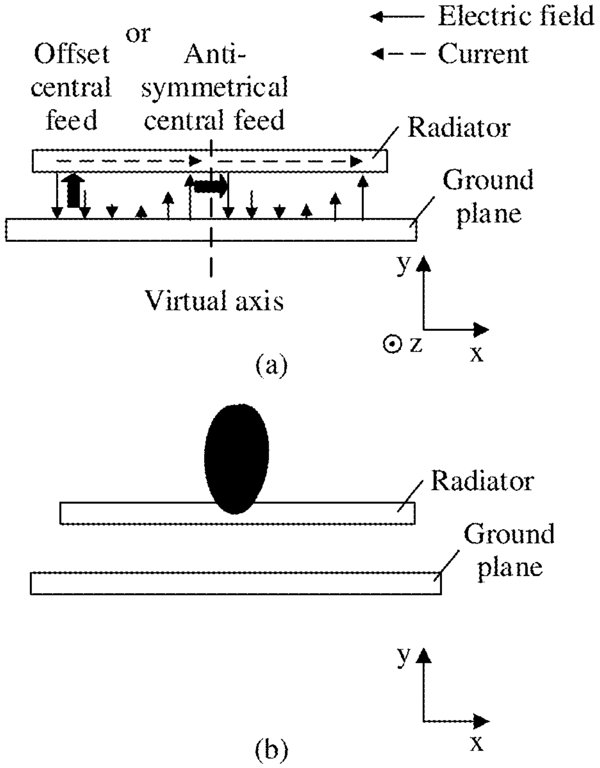
FIG. 9 is a schematic diagram of an offset central feed or anti-symmetrical central feed manner used by a patch antenna according to an embodiment of this application.
Figure 10:
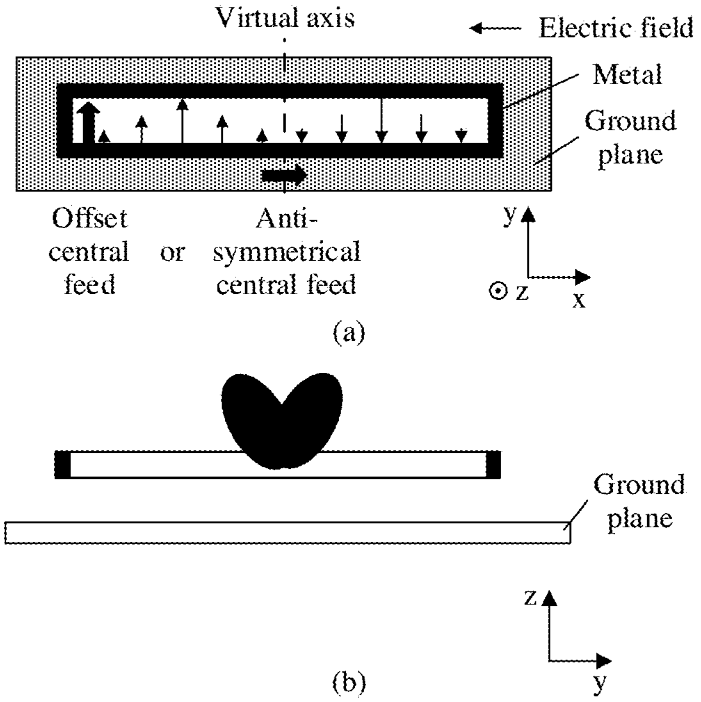
FIG. 10 is a schematic diagram of an offset central feed or anti-symmetrical central feed manner used by a slot antenna including a ground plane according to an embodiment of this application.
Figure 11:
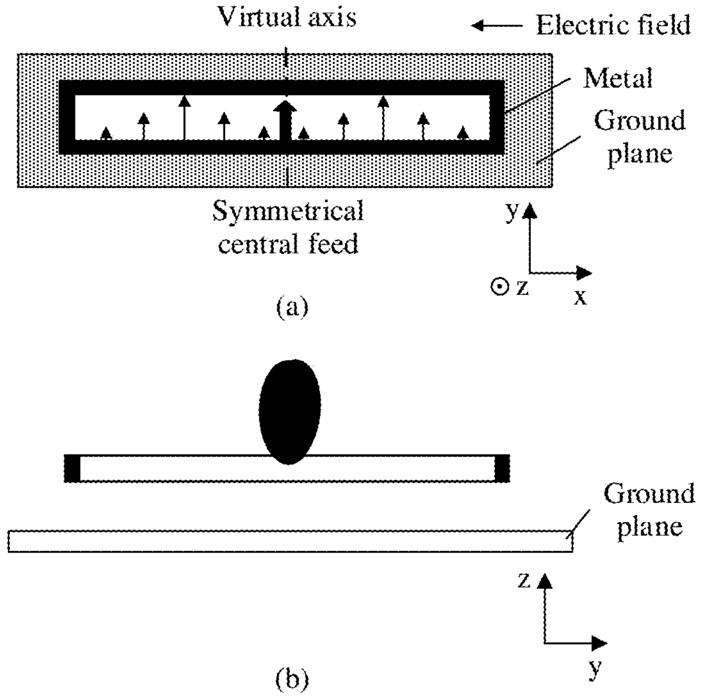
FIG. 11 is a schematic diagram of a symmetrical central feed manner used by a slot antenna including a ground plane according to an embodiment of this application.
Figure 12:
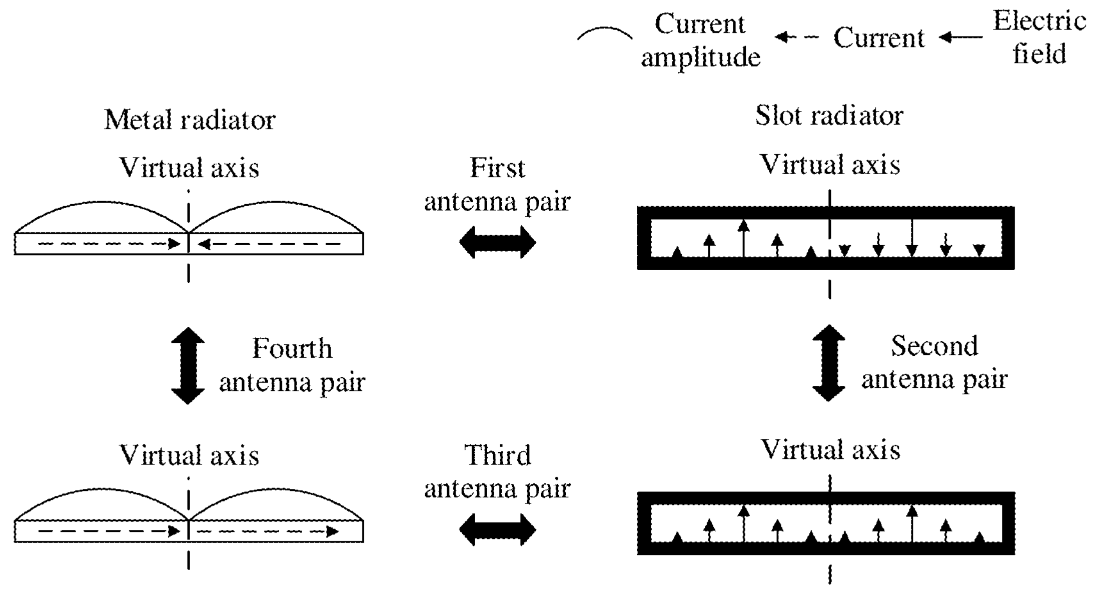
FIG. 12 shows a combination form of four antenna pairs according to an embodiment of this application.
Figure 13:
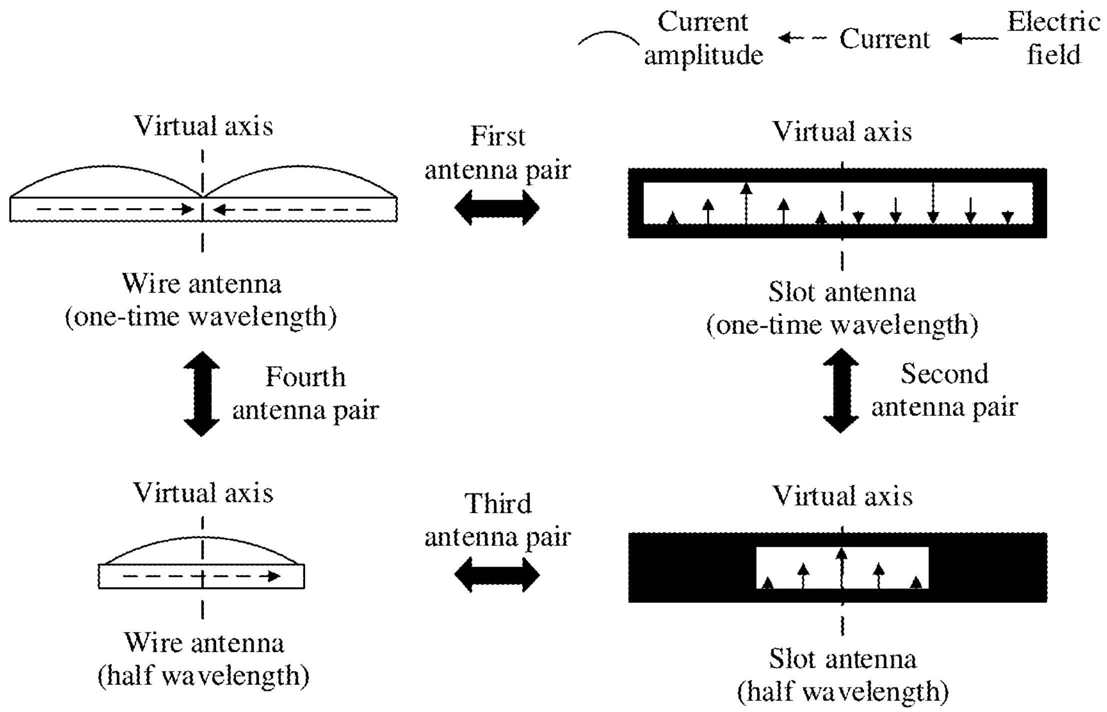
FIG. 13 shows a combination form of another four antenna pairs according to an embodiment of this application.

First, principles in this application are described based on FIG. 2 to FIG. 13. FIG. 2 is a schematic diagram of an even function according to an embodiment of this application. FIG. 3 is a schematic diagram of an odd function according to an embodiment of this application. FIG. 4 is a schematic diagram of a symmetrical central feed manner used by a wire antenna according to an embodiment of this application. FIG. 5 is a schematic diagram of an offset central feed or anti-symmetrical central feed manner used by a wire antenna according to an embodiment of this application. FIG. 6 is a schematic diagram of an offset central feed or anti-symmetrical central feed manner used by a slot antenna according to an embodiment of this application. FIG. 7 is a schematic diagram of a symmetrical central feed manner used by a slot antenna according to an embodiment of this application. FIG. 8 is a schematic diagram of a symmetrical central feed manner used by a patch antenna according to an embodiment of this application. FIG. 9 is a schematic diagram of an offset central feed or anti-symmetrical central feed manner used by a patch antenna according to an embodiment of this application. FIG. 10 is a schematic diagram of an offset central feed or anti-symmetrical central feed manner used by a slot antenna including a ground plane according to an embodiment of this application. FIG. 11 is a schematic diagram of a symmetrical central feed manner used by a slot antenna including a ground plane according to an embodiment of this application. FIG. 12 shows a combination form of four antenna pairs according to an embodiment of this application. FIG. 13 shows a combination form of another four antenna pairs according to an embodiment of this application.

As shown in FIG. 2, f(x) is an even function, and f(−x)=f(x) is satisfied within −Xo to +Xo. However, as shown in FIG. 3, g(x) is an odd function, and g(−x)=−g(x) is satisfied within −Xo to +Xo. An inner product of the even function f(x) and the odd function g(x) is zero, that is, the following formula is satisfied:

$$\int_b^a f(x)g(x)w(x)dx = 0.$$

In this case, it may be considered that the even function f(x) is orthogonal to the odd function g(x).

In the formula, w(x) is a weighting function, and in a simple case, it may be considered that w(x)=1.

According to the antenna structure provided in this embodiment of this application, the antenna structure includes an antenna pair. According to the foregoing principle, current distribution or electric field distribution of two antenna elements in the antenna pair has characteristics similar to those of the foregoing odd function and even function, so that an inner product of radiation generated by one of the two antenna elements and radiation generated by the other of the two antenna elements is zero (integral orthogonal) in a far field, and the radiation generated by one of the two antenna elements and the radiation generated by the other of the two antenna elements do not affect each other. Therefore, good isolation can be obtained between the two antenna elements.

FIG. 4 and FIG. 5 are schematic diagrams of different feed manners used by a wire antenna. The wire antenna extends in an X direction, and has a virtual axis in a Y direction.

As shown in (a) in FIG. 4, the wire antenna uses a symmetrical central feed (symmetrical central feed) manner. Electric fields generated by the wire antenna are symmetrically distributed (for example, with same electric field amplitudes and same phases) along the virtual axis, or currents on the wire antenna are symmetrically distributed (for example, with reverse currents) along the virtual axis. A pattern that is of the wire antenna and that is generated in this feed manner on an xoy plane is shown in (b) in FIG. 4.

It should be understood that the virtual axis may be a virtual symmetry axis of a radiator of an antenna structure, and radiator portions on two sides of the virtual axis have equal lengths or equal electrical lengths. An electrical length may be represented by multiplying a physical length (namely, a mechanical length or a geometric length) by a ratio of a transmission time period of an electrical or electromagnetic signal in a medium to a time period required when the signal passes through a distance the same as the physical length of the medium in free space. The electrical length may satisfy the following formula:

$$\bar{L} = L \times \frac{a}{b},$$

where

L is the physical length, a is the transmission time period of the electrical or electromagnetic signal in the medium, and b is the transmission time period in free space.

Alternatively, the electrical length may be a ratio of a physical length (namely, a mechanical length or a geometric length) to a wavelength of a transmitted electromagnetic wave. The electrical length may satisfy the following formula:

$$\bar{L} = \frac{L}{\lambda},$$

where

L is the physical length, and λ is the wavelength of the electromagnetic wave.

The "symmetrical central feed" mentioned in this application may be understood as the following: A connection point (a feed point) between a feed unit and a radiator is located in a center of the radiator. In an embodiment, a connection region between the feed unit and the radiator covers a geometric structure midpoint of the radiator, or covers an electrical length midpoint of the radiator. When the radiator is a slot of a slot antenna, the "symmetrical central feed" may be understood as the following: A connection point (a feed point) between a feed unit and a side edge of the slot is located in a center of the side edge of the slot. For example, a connection region between the feed unit and the side edge of the slot covers a geometric structure midpoint of the side edge of the slot, or covers an electrical length midpoint on the side edge of the slot. It should be understood that the "midpoint" mentioned in this application is not a midpoint in a strict mathematical sense, but a specific deviation should be allowed. Alternatively, the connection point (the feed point) between the feed unit and the radiator may be located in a region within a specific range near the midpoint, for example, a region within a range (excluding a location of a quarter of an electrical length) deviating from the midpoint by a quarter of an electrical length; or the connection point may be located in a region within a range deviating from the midpoint by one-eighth of an electrical length, where the electrical length may refer to an electrical length of the radiator.

As shown in (a) in FIG. 5, the wire antenna uses an offset central feed (offset central feed) manner or an anti-symmetrical central feed (anti-symmetrical central feed) manner. Electric fields generated by the wire antenna are anti-symmetrically distributed (for example, the electric fields have same electric field amplitudes but opposite phases) (the opposite phases mean, for example, that a phase difference is 180°) along a virtual axis, or currents on the wire antenna are anti-symmetrically distributed (for example, the currents are the same in direction) along a virtual axis. A pattern that is of the wire antenna and that is generated in this feed manner on an xoy plane is shown in (b) in FIG. 5.

The "offset central feed" mentioned in this application may be understood as side feed. In an embodiment, the connection point (the feed point) between the feed unit and the radiator deviates from a symmetric center (the virtual axis) of the radiator. In an embodiment, the connection point (the feed point) between the feed unit and the radiator is located at an end of the radiator and in a region within a range of one quarter of an electrical length (excluding a location of one quarter of an electrical length) away from the endpoint of the radiator; or the connection point may be located in a region within a range of one-eighth of a first electrical length away from the endpoint of the radiator, where the electrical length may refer to an electrical length of the radiator.

The "anti-symmetrical central feed" mentioned in this application may be understood as the following: A positive electrode and a negative electrode of the feed unit are respectively connected to two connection points near the foregoing midpoint of the radiator. Signals output from the positive electrode and the negative electrode of the feed unit have same amplitudes but opposite phases. For example, a phase difference is 180°±10°.

For an antenna pair including wire antennas formed based on the foregoing feed manner, when a first wire antenna in the antenna pair uses the symmetrical central feed manner shown in (a) in FIG. 4, 1-time, 2-time, 3-time, . . . , and n-time (where n is a positive integer) wavelength modes of the first wire antenna may be excited; and when a second wire antenna in the antenna pair uses an offset central feed or anti-symmetrical central feed manner, 1/2, 2/2, 3/2, . . . , and n/2 wavelength modes of the second wire antenna may be excited. Because the first wire antenna and the second wire antenna respectively use different feed manners, distribution of currents and electric fields generated by the first wire antenna and distribution of currents and electric fields generated by the second wire antenna have characteristics similar to those of the foregoing odd function and even function, so that an inner product of radiation generated by one of the two antenna elements and radiation generated by the other of the two antenna elements is zero in a far field, and the radiation generated by one of the two antenna elements and the radiation generated by the other of the two antenna elements do not affect each other. The first wire antenna and the second wire antenna each may obtain high isolation within a bandwidth corresponding to an excited mode.

FIG. 6 and FIG. 7 are schematic diagrams of different feed manners used by a slot antenna. The slot antenna extends in an X direction, and has a virtual axis in a Y direction.

As shown in (a) in FIG. 6, the slot antenna uses an offset central feed manner or an anti-symmetrical central feed manner. Electric fields generated by the slot antenna are anti-symmetrically distributed (the electric fields have same amplitudes but opposite phases, for example, a phase difference is) 180° along the virtual axis. A pattern that is of the slot antenna and that is generated in this feed manner on a yoz plane is shown in (b) in FIG. 6.

As shown in (a) in FIG. 7, the slot antenna uses a symmetrical central feed manner. Electric fields generated by the slot antenna are symmetrically distributed (the electric fields have same amplitudes and same phases) along the virtual axis. A pattern that is of the slot antenna and that is generated in this feed manner on a yoz plane is shown in (b) in FIG. 7.

For an antenna pair including slot antennas formed based on the foregoing feed manner, when a first slot antenna in the antenna pair uses the offset central feed manner or the anti-symmetrical central feed manner shown in (a) in FIG. 6, 1/2, 2/2, 3/2, . . . , and n/2 (where n is a positive integer) wavelength modes of the first slot antenna may be excited; and when a second slot antenna in the antenna pair uses a symmetrical central feed manner, 1-time, 2-time, 3-time, . . . , and n-time wavelength modes of the second slot antenna may be excited. Because the first slot antenna and the second slot antenna respectively use different feed manners, distribution of electric fields generated by the first slot antenna and distribution of electric fields generated by the second slot antenna have characteristics similar to those of the foregoing odd function and even function, so that an inner product of radiation generated by one of the two antenna elements and radiation generated by the other of the two antenna elements is zero in a far field, and the radiation generated by one of the two antenna elements and the radiation generated by the other of the two antenna elements do not affect each other. The first slot antenna and the second slot antenna each may obtain high isolation within a bandwidth corresponding to an excited mode.

It should be understood that, for the antenna structures shown in FIG. 4 to FIG. 7, all sizes of antenna radiators of the antenna structures may be based on one time of an operating wavelength (an electrical length of a radiator of the wire antenna is one time of the operating wavelength or an electrical length of a slot of the slot antenna is one time of the operating wavelength). The operating wavelength may be considered as a wavelength corresponding to a center frequency of an operating frequency band of the antenna structure, or may be considered as a wavelength corresponding to a resonance generated by the antenna structure. Because the size of the radiator of the antenna structure is large, radiation efficiency of the antenna structure can be improved by increasing a radiation aperture. Therefore, radiation efficiency bandwidths of the foregoing antenna structures are good.

The technical solutions provided in the foregoing embodiments are not limited to being applicable to the antenna structures shown in FIG. 4 to FIG. 7, and are still applicable to another antenna structure. In an embodiment, the wire antenna includes a straight strip or a bent radiator without a slot, a straight strip or a bent radiator with one or more slots, and/or the like. In an embodiment, a form of the wire antenna further includes a dipole (dipole) antenna, a patch (patch) antenna, a meta patch (meta patch) antenna (a meta structure is a metamaterial structure, and may be a structure in which an original single radiator is replaced with a plurality of coupling units that are very close to each other), and the like. In an embodiment, the slot antenna includes a linear slot, an L-shaped slot, a U-shaped slot, or the like. In an embodiment, the slot antenna may be a closed slot antenna, an open slot antenna, or the like.

For example, when a ground plane is disposed below the wire antennas shown in FIG. 4 and FIG. 5, an antenna structure formed by the wire antennas changes from a dipole antenna to a patch antenna, and the patch antenna may alternatively be a meta patch antenna. Currents, electric fields, and patterns corresponding to different feed manners of the wire antennas are shown in FIG. 8 and FIG. 9. Similarly, it is also applicable to an antenna structure formed by disposing a ground plane below the slot antennas shown in FIG. 6 and FIG. 7. Electric fields and patterns corresponding to different feed manners of the slot antennas are shown in FIG. 10 and FIG. 11.

It should be understood that the foregoing wire antennas or slot antennas may be mutually combined to form antenna pairs. As shown in FIG. 12, antenna elements in the antenna pair may change current or electric field distribution of the antenna elements in the antenna pair in a feed manner, and a high-isolation antenna pair may be formed provided that the currents or electric fields are orthogonal.

FIG. 12 shows four different combination forms of antenna pairs. However, in an actual design, the combination forms may not be limited to the antenna structures shown in the foregoing embodiments. To be specific, regardless of a wire antenna, a slot antenna, or another antenna form, or regardless of an electrical size of the antenna (the antenna structure may be designed based on a half wavelength, a one-time wavelength, or a three-half wavelength). A high-isolation antenna pair may be formed through combination provided that currents or electric fields of antenna elements in an antenna pair are orthogonal (one antenna element is symmetrically distributed, that is, has an even function characteristic, and the other antenna element is anti-symmetrically distributed, that is, has an odd function characteristic).

For example, as shown in FIG. 13, both a slot antenna designed based on a half wavelength and a slot antenna designed based on a one-time wavelength perform feeding in an offset central feed manner. Electric fields generated by the slot antenna designed based on a half wavelength are symmetrically distributed, electric fields generated by the slot antenna designed based on a one-time wavelength are anti-symmetrically distributed, and the two antenna elements may be combined to form a high-isolation antenna pair (a second antenna pair in FIG. 13). By analogy, as shown in FIG. 13, two antenna structures designed based on a one-time wavelength and two antenna structures designed based on a half wavelength can be combined to form four different high-isolation antenna pairs. It should be understood that the foregoing technical solution is also applicable to an antenna structure designed based on a three-halve wavelength and a two-time wavelength. Details are not described herein again. It should be noted that, in antenna design of an electronic device, due to limited internal space, an antenna structure of a quarter wavelength, for example, a wire antenna of a quarter wavelength that is grounded at one end and opened at the other end, is generally considered that a current (or an electric field) of the antenna structure has a characteristic similar to anti-symmetrical distribution.

Figure 14:
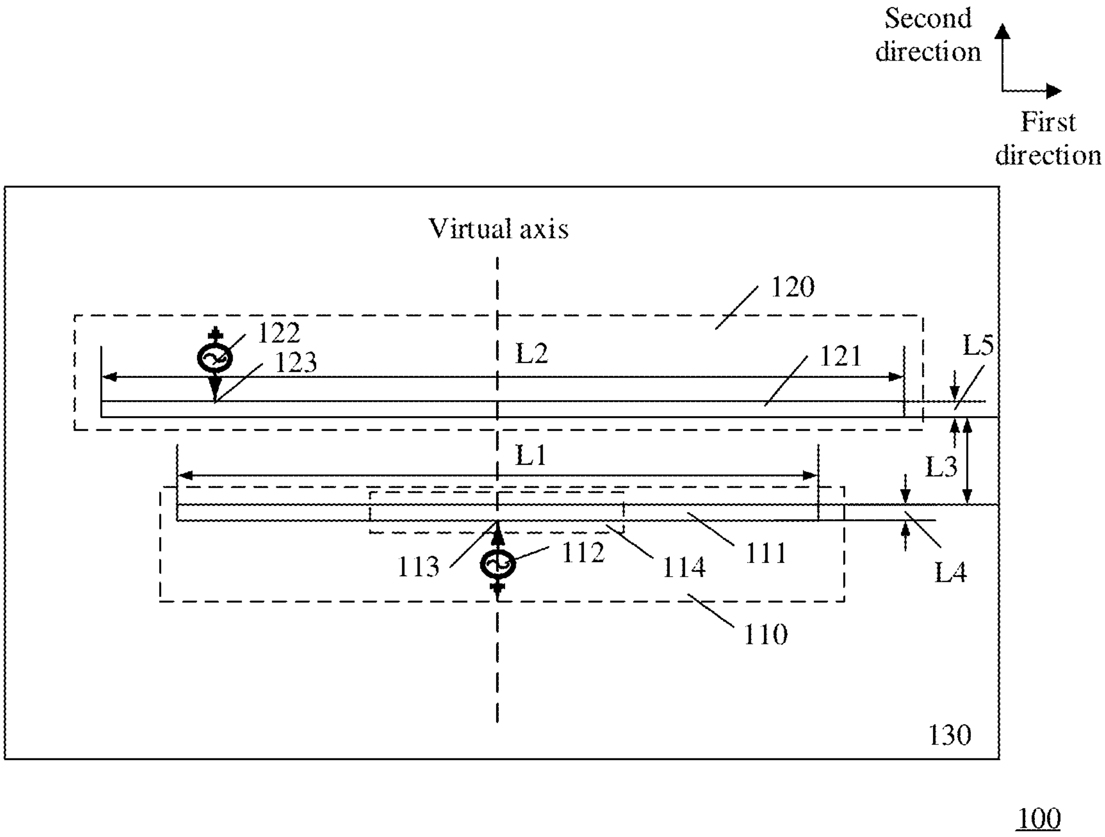
FIG. 14 is a schematic diagram of an antenna structure 100 according to an embodiment of this application.

FIG. 14 is a schematic diagram of an antenna structure 100 according to an embodiment of this application. The antenna structure 100 may be applied to the electronic device shown in FIG. 1.

As shown in FIG. 14, the antenna structure 100 includes a first antenna element 110 and a second antenna element 120. An operating frequency band of the first antenna element 110 is the same as or adjacent to an operating frequency band of the second antenna element 120.

The first antenna element 110 may include a first slot 111 disposed at a metal layer 130. The second antenna element 120 may include a second slot 121 disposed at the metal layer 130. The first slot 111 and the second slot 121 at the metal layer 130 may be disposed in parallel and be spaced apart, to save an area that is of the metal layer 130 and that is occupied by the antenna structure 100, and to be more applicable to decreasing internal space inside the electronic device. The first slot 111 and the second slot 121 extend in a first direction and are spaced apart in a second direction. The second direction is perpendicular to the first direction, and projections of the first slot 111 and the second slot 121 in the second direction at least partially overlap. It should be understood that "extend in the first direction" in this application should be understood as the following: The radiator/slot is in a shape of a straight strip and the straight strip extends in the first direction, or the radiator/slot is in a bent shape, and at least a part or all of the bent shape extends in the first direction. The "spaced apart in the second direction" in this application should be understood as the following: The first radiator/slot is evenly spaced or unevenly spaced from the second radiator/slot in the second direction. A spacing distance between the first slot 111 and the second slot 121 in the second direction is less than a quarter of a first wavelength or a quarter of a second wavelength. The first wavelength is a wavelength corresponding to an operating frequency band of the first antenna 110. For example, the first wavelength may be a wavelength corresponding to a center frequency of the operating frequency band of the first antenna 110 or a wavelength corresponding to a resonance point of the first antenna 110. The second wavelength is a wavelength corresponding to an operating frequency band of the second antenna 120. For example, the second wavelength may be a wavelength corresponding to a center frequency of the operating frequency band of the second antenna 120 or a wavelength corresponding to a resonance point of the second antenna 120. The first slot 111 includes a first feed point 113. The first feed point 113 is disposed in a central region 114 of the first slot 111, and the first feed point 113 is configured to feed the first antenna element 110. The first feed unit 112 is electrically connected to metal layers on two sides of the first slot 111 at the first feed point 113, to feed the first antenna element 110. The second slot 121 includes a second feed point 123. The second feed point 123 is disposed at an end of the second slot 121, and the second feed point 123 is configured to feed the second antenna element 120. The second feed unit 122 is electrically connected to metal layers on two sides of the second slot 121 at the second feed point 123, to feed the second antenna element 120.

In this embodiment, the first antenna element 110 uses a symmetrical central feed manner, and electric fields generated by the first antenna element are symmetrically distributed. The second antenna element 120 uses an offset central feed manner, and electric fields generated by the second antenna element are anti-symmetrically distributed. Because the electric field generated by the first antenna element 110 is orthogonal to the electric field generated by the second antenna element 120 (the electric fields of the first antenna element are symmetrically distributed, that is, have an even function characteristic, and the electric fields of the second antenna element are anti-symmetrically distributed, that is, have an odd function characteristic), the first antenna element 110 and the second antenna element 120 may be combined to form a high-isolation antenna pair.

It should be understood that, based on the principle shown in the foregoing embodiment, the second antenna element 120 may produce same effect in an anti-symmetrical central feed manner. That is, the second feed point 123 is disposed in a central region of the second slot 121, and the second feed unit 122 is electrically connected to the metal layers on the two sides of the second slot 121 at the second feed point 123, to feed the second antenna element 120.

In the foregoing embodiment, that the first slot 111 and the second slot 121 are disposed in parallel may be understood as the following: A length direction of the first slot 111 is approximately parallel to a length direction of the second slot 121. Because internal space of the electronic device is increasingly limited, in engineering application, the first slot 111 and the second slot 121 may be bent (the first slot 111 and the second slot 121 are not necessarily straight lines), to adapt to the internal space of the electronic device. Therefore, that the first slot 111 is parallel to the second slot 121 may be considered as the following: An angle between the length direction of the first slot 111 and the length direction of the second slot 121 is less than 45°.

The "central region of the slot" mentioned in this application (for example, the central region 114 of the first slot 111) may be understood as a region formed at a specific distance from a midpoint of the first slot 111. The midpoint of the first slot 111 may be a geometric center of the first slot 111 (where the first slot 111 has same lengths on two sides of the midpoint), or the midpoint of the first slot 111 may be a midpoint of an electrical length of the first slot 111 (where the first slot 111 has same electrical lengths on two sides of the midpoint). For example, when the electrical length of the first slot 111 is the first wavelength, the central region 114 of the first slot 111 may be a region whose distance from the midpoint is within a quarter of the first wavelength. "The feed point is disposed in a central region of the slot" mentioned in this application should be understood as the following: The feed point is disposed in the central region of the slot, and may be specifically disposed on a side edge of the slot.

The "an end of the slot" (for example, an end of the second slot 121) mentioned in this application cannot be narrowly understood as a point, and may alternatively be considered as a segment of a slot region that includes an endpoint of the slot and that is on the second slot 121. For example, when the electrical length of the second slot 121 is the second wavelength, an end of the second slot 121 may be considered as a slot region whose distance from the endpoint is within one quarter of the second wavelength, or may be considered as a slot region whose distance from the endpoint is within 10 mm. "The feed point is disposed at an end of the slot" mentioned in this application should be understood as the following: The feed point is disposed at an end of the slot, and may be specifically disposed on a side edge of the slot.

In an embodiment, the electric fields generated by the first antenna element 110 may be symmetrically distributed along a virtual axis, and the electric fields generated by the second antenna element 120 may be anti-symmetrically distributed along the virtual axis. The virtual axis may be a virtual symmetry axis of the first slot 111 (where the first slot 111 has same lengths or electrical lengths on two sides of the virtual axis), or may be a virtual symmetry axis of the second slot 121 (where the second slot 121 has same lengths or electrical lengths on two sides of the virtual axis).

In an embodiment, a spacing distance between the virtual symmetry axis of the first slot 111 and the virtual symmetry axis of the second slot 121 in the first direction is less than a quarter of the first wavelength or a quarter of the second wavelength. As overall symmetry of the antenna structure increases, a radiation characteristic of the antenna structure becomes better. For example, when the virtual symmetry axis of the first slot 111 overlaps the virtual symmetry axis of the second slot 121, a radiator characteristic of the antenna structure is optimal. However, in an electronic device, an antenna structure needs to be designed with reference to internal space of the electronic device. Therefore, the virtual symmetry axis of the first slot 111 and the virtual symmetry axis of the second slot 121 may not necessarily fully overlap. When the spacing distance between the virtual symmetry axis of the first slot and the virtual symmetry axis of the second slot in the first direction is less than a quarter of the first wavelength or less than a quarter of the second wavelength, good isolation may also be maintained between the first antenna element and the second antenna element.

In an embodiment, the first slot 111 and the second slot 121 are symmetrical along the virtual axis, that is, the first slot 111 has same lengths or electrical lengths on two sides of the virtual axis, and the second slot 121 has same lengths or electrical lengths on two sides of the virtual axis. It should be understood that, as symmetry between the first slot 111 and the second slot 121 increases, an overall radiation characteristic of the antenna structure 100 becomes better. However, in an electronic device, an antenna structure needs to be designed with reference to internal space of the electronic device. Therefore, the first slot 111 and the second slot 121 cannot be fully symmetrical along the virtual axis. When the first slot 111 or the second slot 121 deviates from the virtual axis by a range within a quarter of the first wavelength or a quarter of the second wavelength, good isolation may also be maintained between the first antenna element 110 and the second antenna element 120. For example, the virtual symmetry axis of the first slot 111 and the virtual symmetry axis of the second slot 121 are spaced by a range within a quarter of the first wavelength or a quarter of the second wavelength.

In an embodiment, the first feed unit 112 and the second feed unit 122 may be different radio frequency channels in a radio frequency chip inside the electronic device.

In an embodiment, the electrical length of the first slot 111 may be the first wavelength, and the electrical length of the second slot 121 may be the second wavelength. The first slot 111 and the second slot 121 may correspond to the second antenna pair in FIG. 12. It should be understood that, for the first slot 111 and the second slot 121, different electronic components may be used to change lengths of the first slot 111 and the second slot 121 while it is ensured that the electrical length of the first slot 111 and the electrical length the second slot 121 do not change. In this embodiment of this application, an example in which the first antenna element 110 and the second antenna element 120 operate at 3 GHz is used for description. Because a resonance point generated by the first antenna element 110 and a resonance point generated by the second antenna element 120 are different, that a length L1 of the first slot 111 is 82 mm and a length L2 of the second slot 121 is 102 mm is used for description. A resonant frequency band of the first antenna element 110 and a resonant frequency band of the second antenna element 120 may be adjusted by adjusting the length of the first slot 111 and the length of the second slot 121 based on an actual production design requirement, or by adding an electronic component. This is not limited in this application.

Further, a width L4 of the first slot 111 and a width L5 of the second slot 121 may be adjusted, to adjust the resonant frequency band of the first antenna element 110 and the resonant frequency band of the second antenna element 120. In this application, L4=L5=3 mm is used as an example for description, and an adjustment may be made based on an actual production design requirement. This is not limited in this application.

In an embodiment, the first antenna element 110 and the second antenna element 120 may be disposed at a very close distance to form an intra-frequency antenna pair, which may be applied to a MIMO antenna system. In this embodiment of this application, an example in which the first antenna element 110 and the second antenna element 120 operate at 3 GHz is used for description. A distance between the first slot 111 and the second slot 121 may be less than 10 mm. For example, in this embodiment, that a distance L3 between the first slot 111 and the second slot 121 is 6.5 mm is used for description. The distance between the first slot 111 and the second slot 121 may be adjusted based on an actual production design requirement. This is not limited in this application. It should be understood that the distance L3 between the first slot 111 and the second slot 121 may be considered as a shortest straight-line distance between a point in the first slot 111 and a point in the second slot 121.

Figure 15:
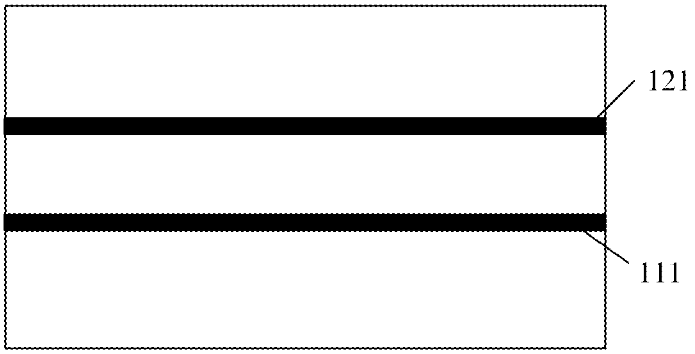
FIG. 15 is a schematic diagram of a structure of an open slot according to an embodiment of this application.

In an embodiment, the first slot 111 and the second slot 121 may be closed slots, as shown in FIG. 14. Alternatively, the first slot 111 and the second slot 121 may be open slots, as shown in FIG. 15. An adjustment may be made based on an actual production design requirement. This is not limited in this application.

In an embodiment, the first slot and/or the second slot may be formed by using a hollow part of any conductive part (for example, a conductive plate or a conductive layer) in the electronic device. It should be understood that the first slot and/or the second slot in this application may be filled with an insulation material.

Figure 16:
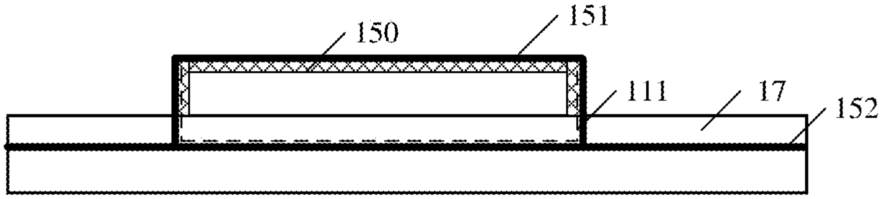
FIG. 16 is a sectional view of an antenna structure according to an embodiment of this application.
Figure 17:
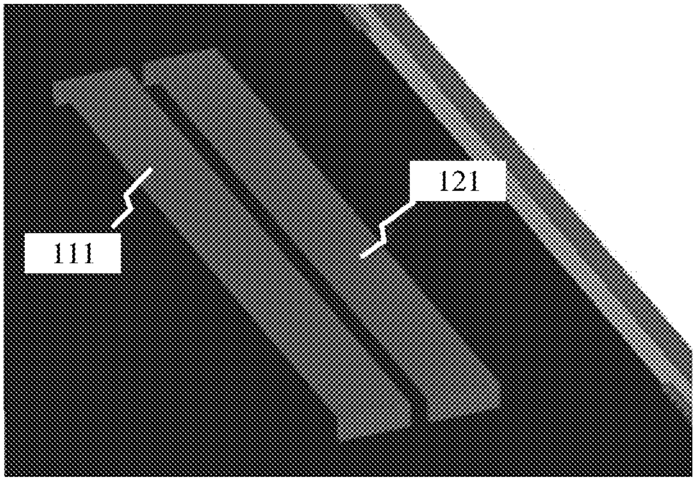
FIG. 17 is a schematic diagram of another antenna structure according to an embodiment of this application.

In an embodiment, the metal layer 130 may be a metal layer in the PCB 17 in the electronic device shown in FIG. 1. The metal layer 130 may be used as a ground plane in the electronic device, or may be used as a carrier of the first slot 111 and the second slot 121. It should be understood that the first slot 111 and the second slot 121 shown in FIG. 14 are merely used as examples. In actual production, the first slot 111 and the second slot 121 may be alternatively formed by using a plurality of different structures. For example, as shown in FIG. 16, a first metal layer 151 may be disposed above the PCB 17 by using a laser-direct-structuring (laser-direct-structuring, LDS) technology. One end of the first metal layer 151 is electrically connected to the PCB 17, and the other end of the first metal layer 151 is electrically connected to the PCB 17. The first slot is formed between the first metal layer 151 and the PCB 17. Specifically, one end of the first metal layer 151 is electrically connected to a second metal layer 152 (a ground plane) in the PCB 17, and the other end of the first metal layer 151 is electrically connected to the second metal layer 152, to form the slot 111 (shown by a dashed box in the figure). The first metal layer 151 may be disposed above a support 150, to provide good strength. The second slot 121 may use a same structure, as shown in FIG. 17.

Figure 18:
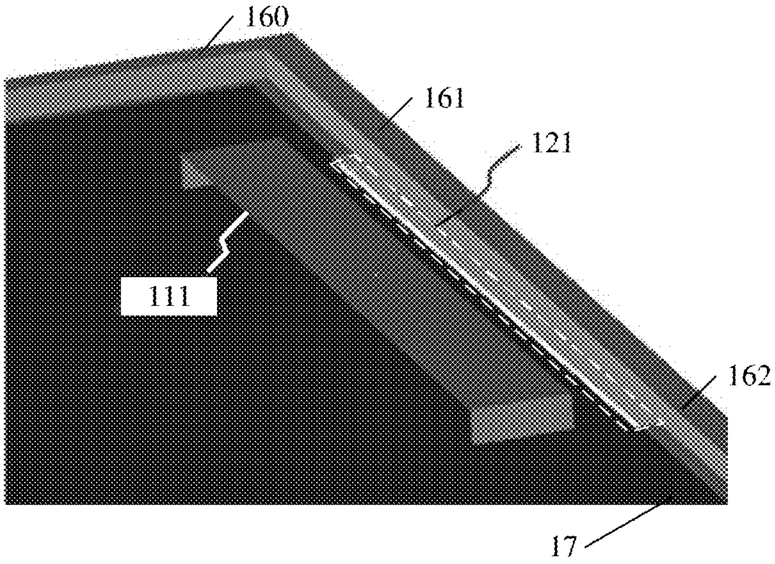
FIG. 18 is a schematic diagram of another antenna structure according to an embodiment of this application.

Alternatively, the second slot 121 may be formed by using another structure. As shown in FIG. 18, the second slot 121 may be formed by using a part of a metal frame 160 of the electronic device and the PCB 17. The metal frame 160 is electrically connected to the PCB 17 at a first location 161, and the metal frame 160 is electrically connected to the PCB 17 at a second location 162, so that the metal frame 160 and the PCB 17 form the second slot 121 between the first location 161 and the second location 162. Specifically, the metal frame 160 and the second metal layer (the ground plane) in the PCB 17 form the second slot 121.

Alternatively, the first slot and the second slot may be formed by using another conductive part in the electronic device. For example, a slot may be formed between a housing of the electronic device and the PCB, or a slot may be formed between a display of the electronic device and the PCB, or a slot may be formed between a display of the electronic device and a metal layer disposed on the support, or a slot may be formed between the housing and a frame of the electronic device. This is not limited in this application. Any two conductive parts in the electronic device may be used to form a slot.

Figure 19:
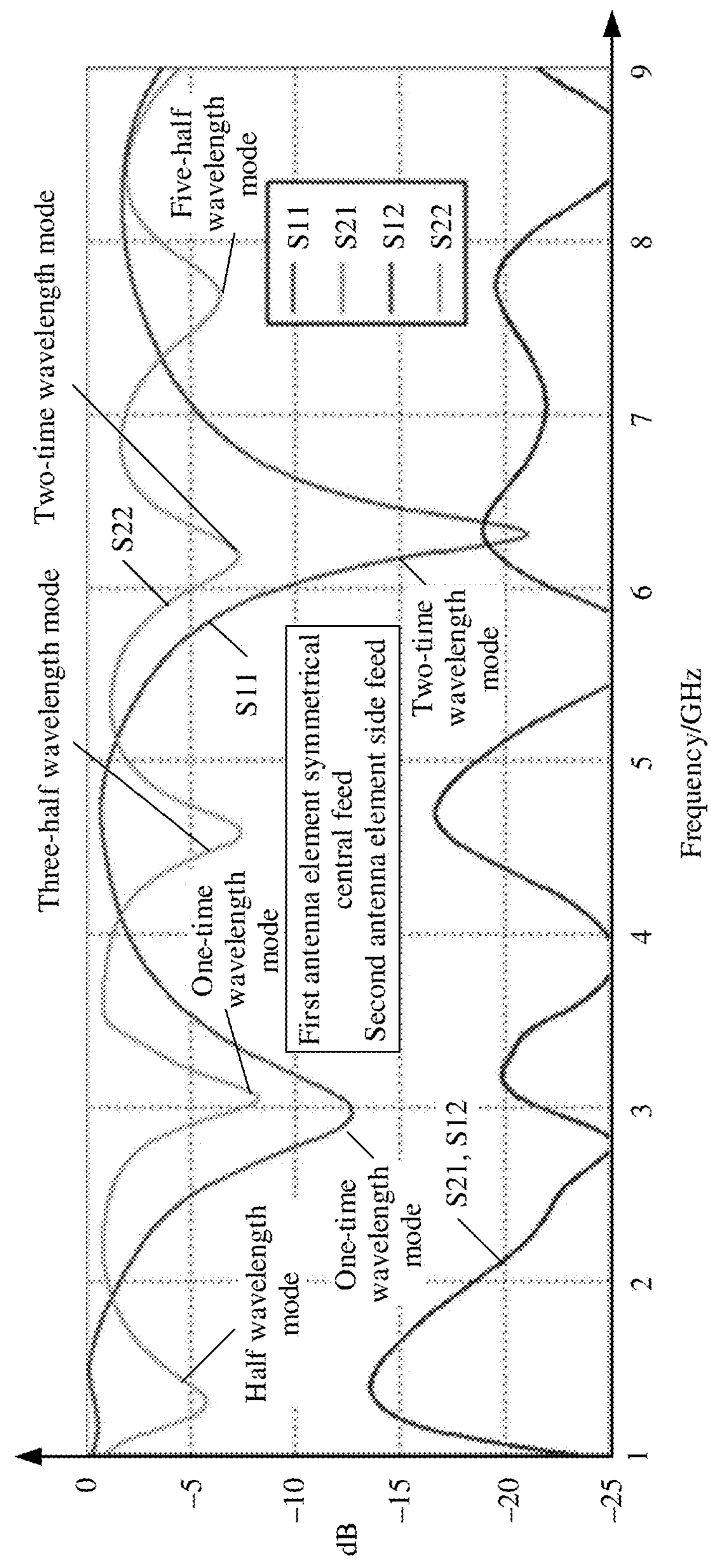
FIG. 19 is a simulation diagram of an S parameter of the antenna structure shown in FIG. 14.
Figure 20:
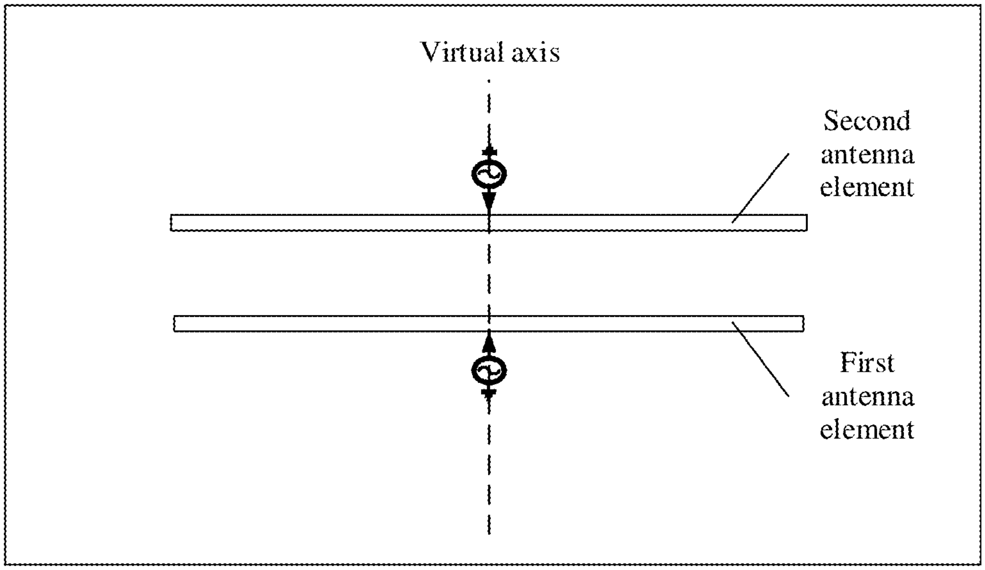
FIG. 20 shows an antenna structure in which both a first antenna element and a second antenna element use a symmetrical central feed manner.
Figure 21:
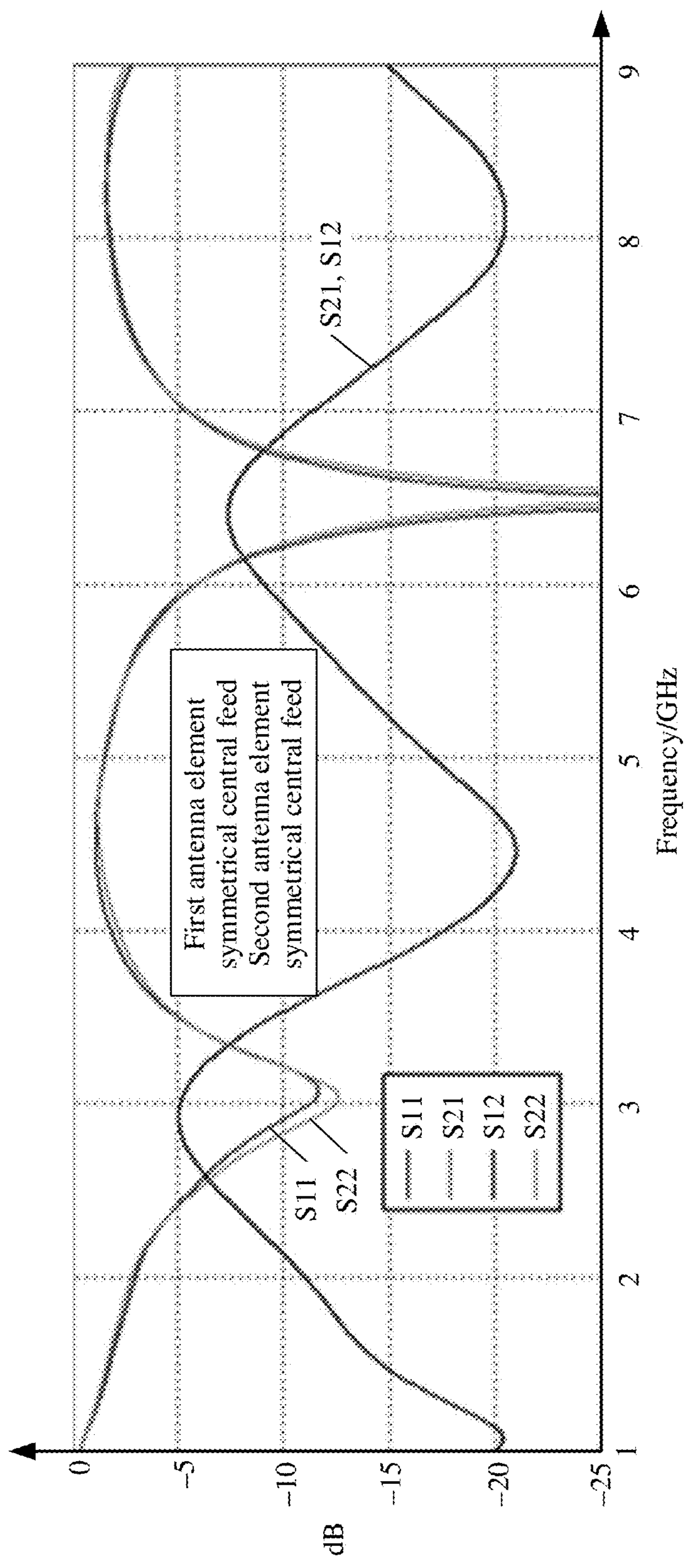
FIG. 21 is a simulation diagram of an S parameter of the antenna structure shown in FIG. 20.
Figure 22:
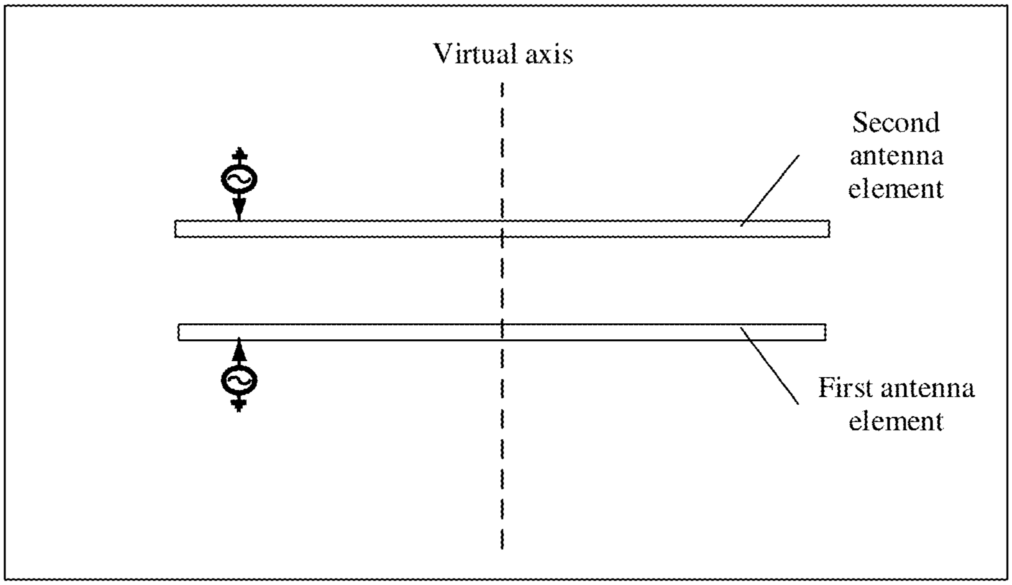
FIG. 22 shows an antenna structure in which both a first antenna element and a second antenna element use a same-side offset central feed manner.
Figure 23:
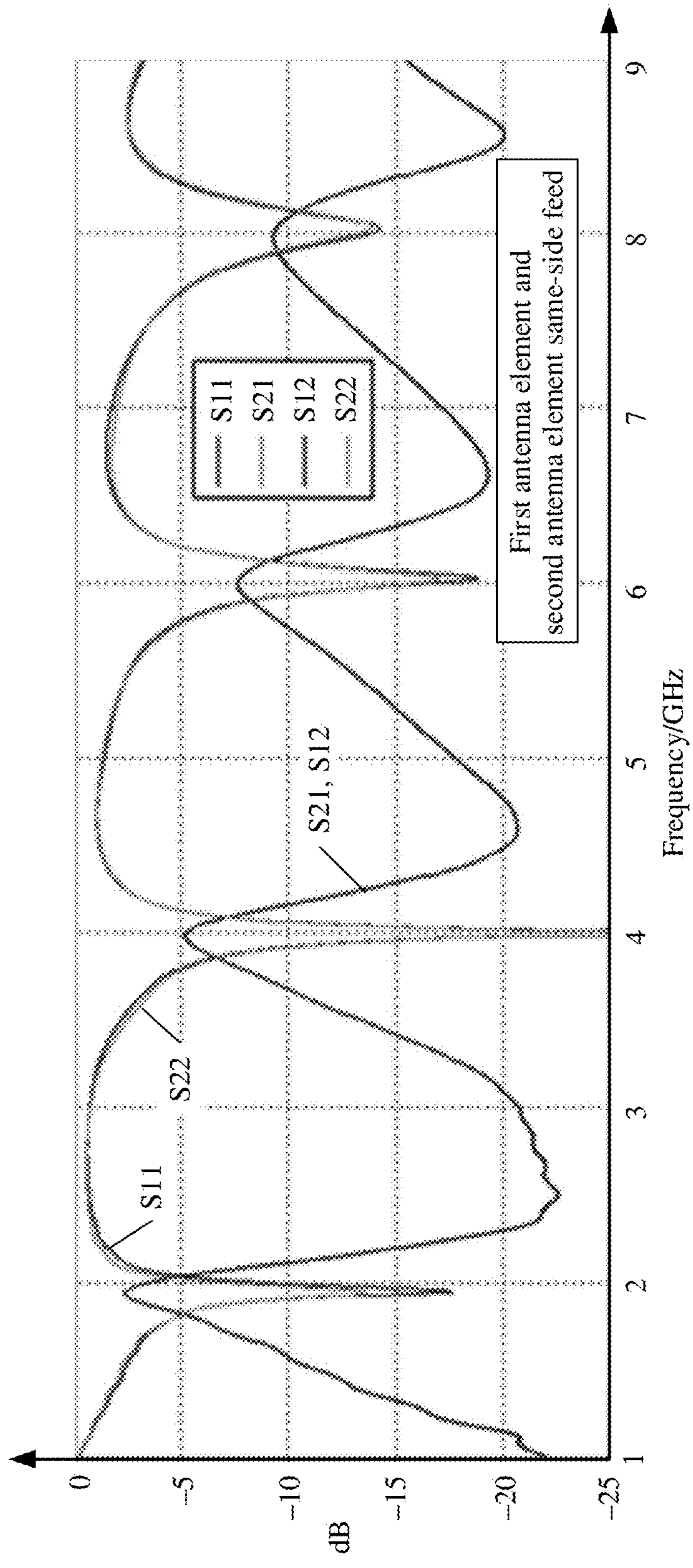
FIG. 23 is a simulation diagram of an S parameter of the antenna structure shown in FIG. 22.
Figure 24:
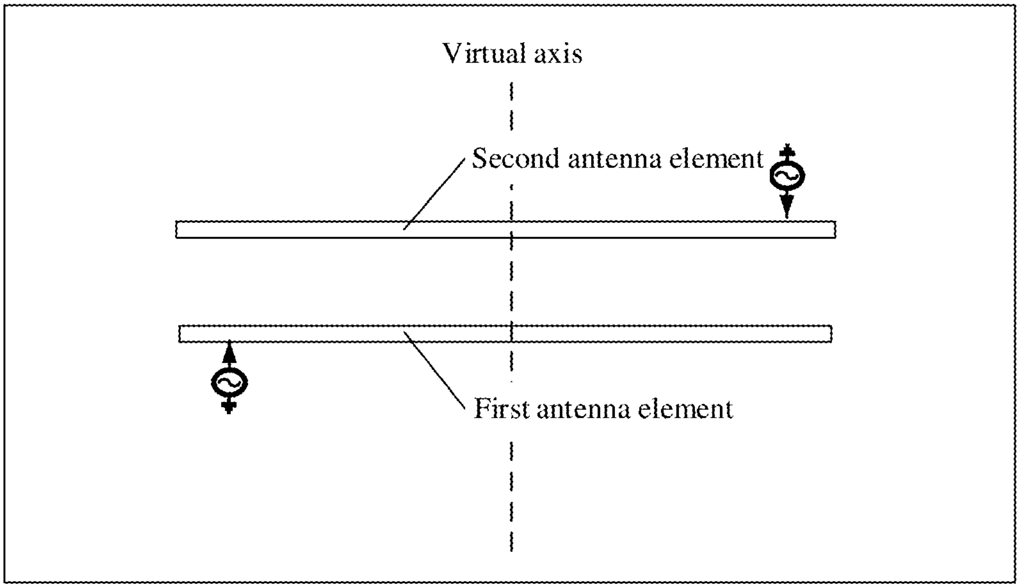
FIG. 24 shows an antenna structure in which both a first antenna element and a second antenna element use a different-side offset central feed manner.
Figure 25:
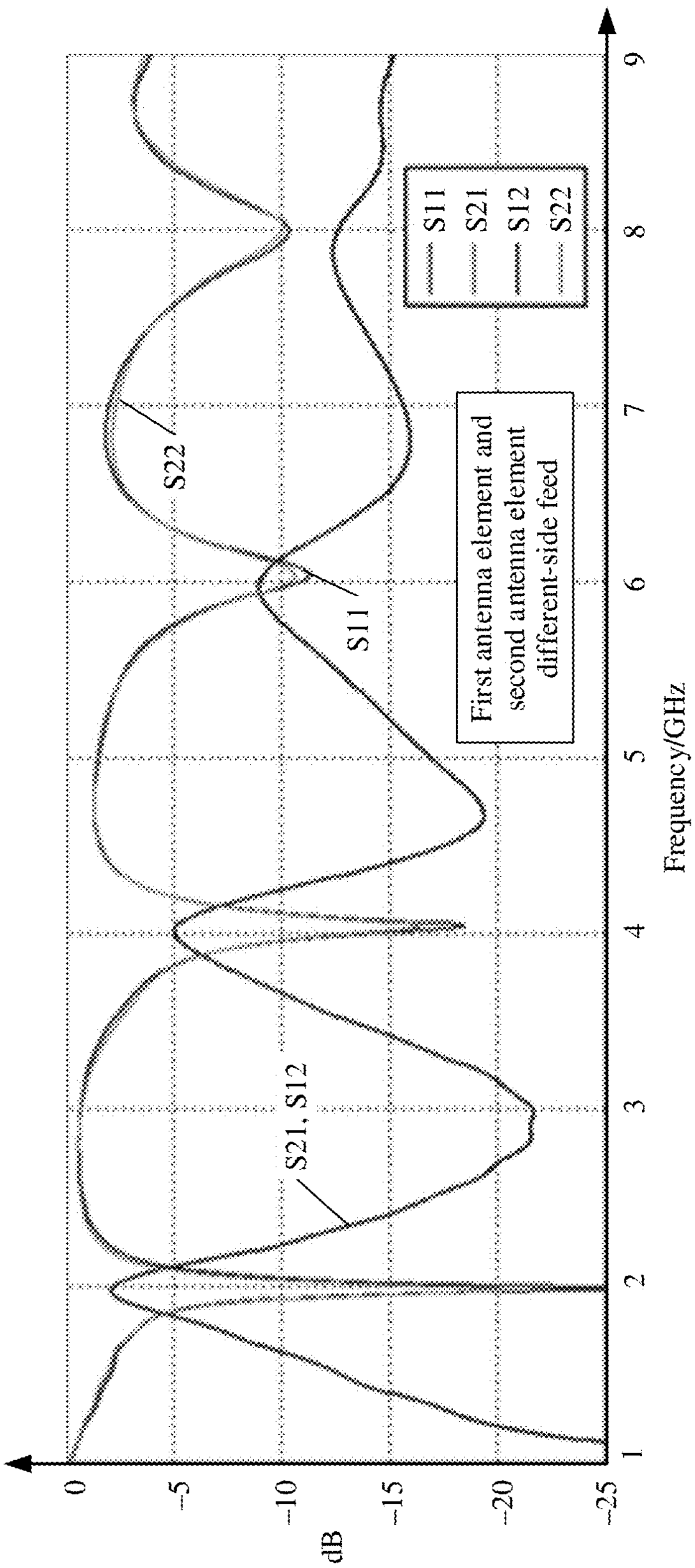
FIG. 25 is a simulation diagram of an S parameter of the antenna structure shown in FIG. 24.

FIG. 19 to FIG. 25 show antenna structures in different feed manners and simulation diagrams of S parameters corresponding to the antenna structures according to embodiments of this application. FIG. 19 is a simulation diagram of an S parameter of the antenna structure shown in FIG. 14. FIG. 20 shows an antenna structure in which both a first antenna element and a second antenna element use a symmetrical central feed manner. FIG. 21 is a simulation diagram of an S parameter of the antenna structure shown in FIG. 20. FIG. 22 shows an antenna structure in which both a first antenna element and a second antenna element use a same-side offset central feed manner. FIG. 23 is a simulation diagram of an S parameter of the antenna structure shown in FIG. 22. FIG. 24 shows an antenna structure in which both a first antenna element and a second antenna element use a different-side offset central feed manner. FIG. 25 is a simulation diagram of an S parameter of the antenna structure shown in FIG. 24.

It should be understood that a difference between the antenna structures shown in the foregoing embodiments lies only in the feed manners and slot lengths. The slot lengths of the antenna structures shown in FIG. 20, FIG. 22, and FIG. 24 are all 82 mm, and other environments are the same. For example, all the antenna structures use a same size of a metal layer, namely, 120 mm×80 mm×0.1 mm, a conductivity of 5.8 mm×e7 S/m, and a slot width of 3 mm. In addition, for brevity of description, in this embodiment of this application, an example in which the operating frequency band of the first antenna element is the same as the operating frequency band of the second antenna element (the first antenna element and the second antenna element are intra-frequency units) is used for description. The technical solution provided in this embodiment of this application may also be used when the operating frequency band of the first antenna element is adjacent to the operating frequency band of the second antenna element.

In addition, lengths of the two slots in the antenna structure may be the same or may be different, and may be adjusted by using an electronic component. Lengths of the two slots in the antenna structure shown in FIG. 14 are different, only to simplify antenna structure matching and further enable the two antenna elements to achieve intra-frequency effect.

As shown in FIG. 19 (corresponding to the antenna structure shown in FIG. 14), FIG. 21 (corresponding to the antenna structure shown in FIG. 20), FIG. 23 (corresponding to the antenna structure shown in FIG. 22), and FIG. 25 (corresponding to the antenna structure shown in FIG. 24), when the first antenna element and the second antenna element are intra-frequency antenna elements, only in the antenna structure shown in FIG. 14, on an intra-frequency band, isolation (S12, S21) between the first antenna element and the second antenna element is greater than 19 dB, the first antenna element and the second antenna element may be applied to the MIMO antenna system, or may be applied as intra-frequency antenna elements (for example, operating on a Wi-Fi frequency band and a BT frequency band respectively). For other antenna structures (the antenna structures shown in FIG. 20, FIG. 22, and FIG. 24), because different feed manners are used, an electric field generated by the first antenna element is non-orthogonal to an electric field generated by the second antenna element. Therefore, isolation is poor, and is around −5 dB.

It should be understood that, as shown in FIG. 14 and FIG. 19, the first antenna element uses a symmetrical central feed manner. When the first feed unit performs feeding, a one-time wavelength mode and a two-time wavelength mode of the first antenna element may be excited. The second antenna element uses an offset central feed manner. When the second feed unit performs feeding, a half wavelength mode, a one-time wavelength mode, a three-half wavelength mode, a two-time wavelength mode, a two-time wavelength mode, and a five-half wavelength mode of the second antenna element may be excited. In the antenna structure shown in FIG. 14, near 3 GHZ, the one-time wavelength mode of the first antenna element and the one-time wavelength mode of the second antenna element may be used to enable the first antenna element and the second antenna element to be intra-frequency. Alternatively, near 6.3 GHz, the two-time wavelength mode of the first antenna element and the two-time wavelength mode of the second antenna element may be used to enable the first antenna element and the second antenna element to be intra-frequency.

Figure 26:
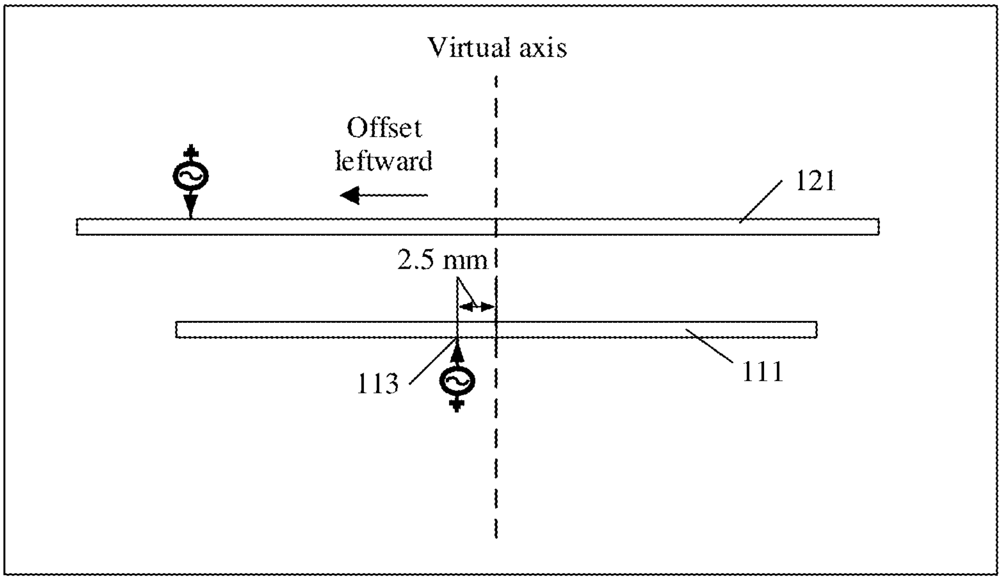
FIG. 26 is a schematic diagram of an asymmetric antenna structure according to an embodiment of this application.

FIG. 26 is a schematic diagram of an asymmetric antenna structure according to an embodiment of this application.

It should be understood that, in the antenna structure shown in FIG. 14, the first slot 111 and the second slot 121 are symmetrical along the virtual axis, and the first feed point 113 of the first antenna element is disposed on the virtual axis. In this case, good isolation can be obtained, as shown in FIG. 19. When the first feed point 113 disposed on the first slot 111 deviates from the virtual axis (which may be considered as the virtual symmetry axis of the first slot), the second slot 121 may be offset towards a same side of the first feed point to compensate for an overall asymmetric shape of the antenna structure.

As shown in FIG. 26, the first feed point 113 is offset to a left side, and an offset D1 of the first feed point 113 is 2.5 mm. Asymmetry caused by the offset of the first feed point 113 may be compensated by offsetting the entire second slot 121 to the left side.

Figure 27:
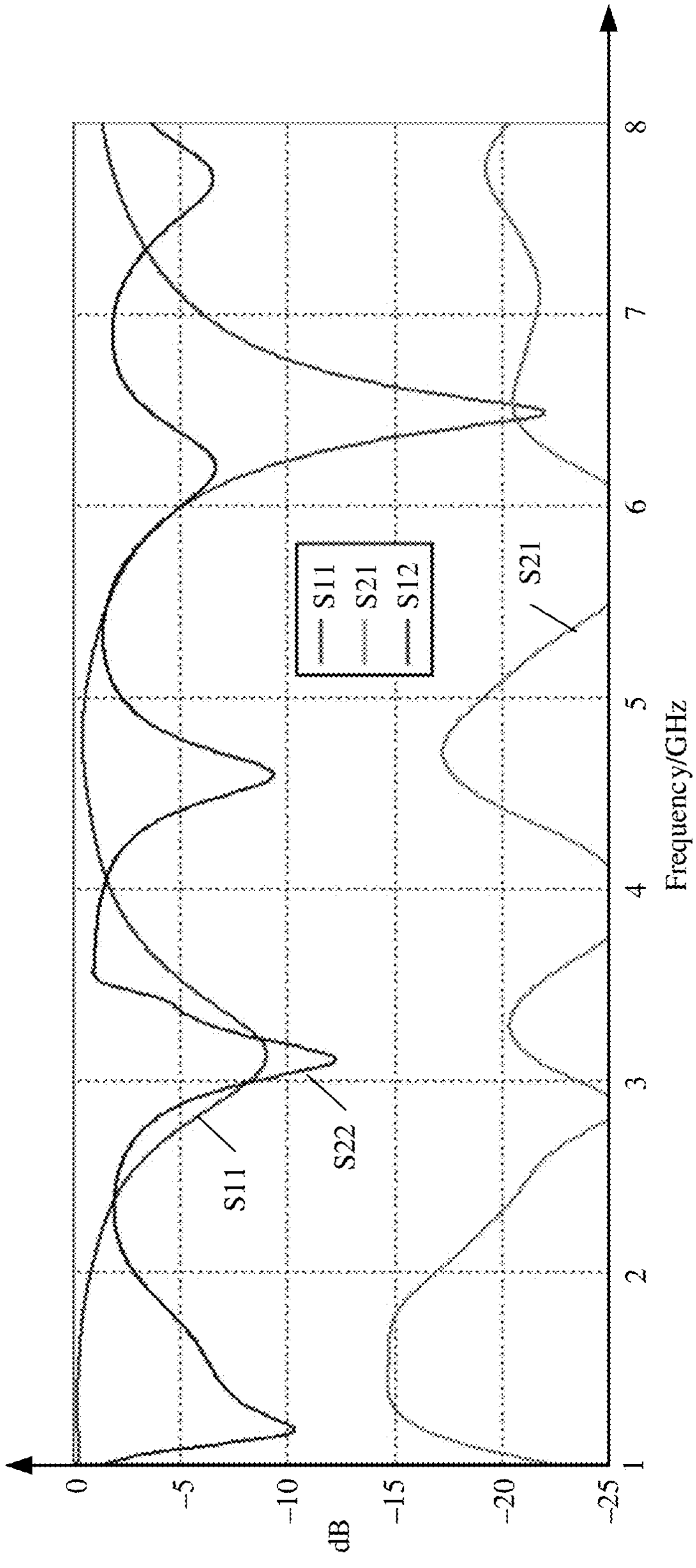
FIG. 27 is a simulation diagram of an S parameter of the antenna structure shown in FIG. 26.
Figure 28:
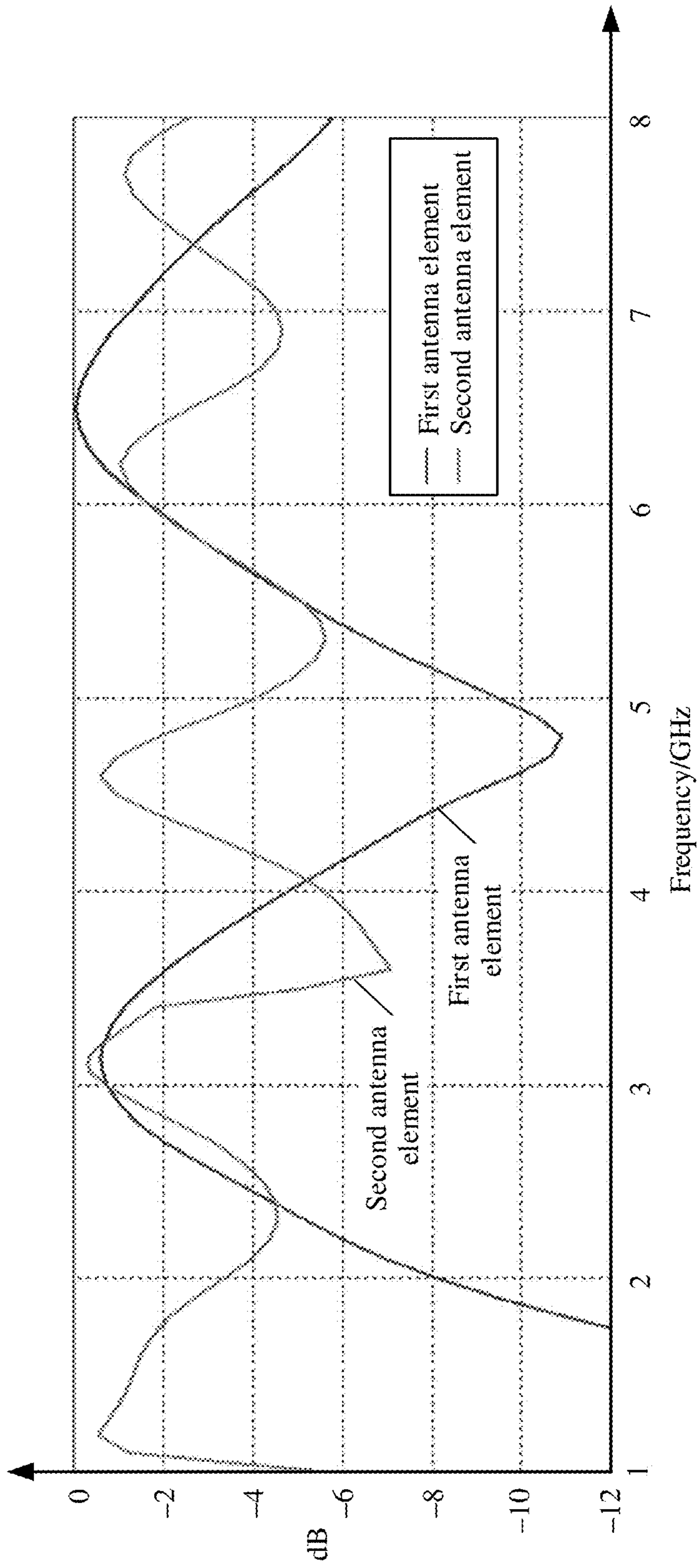
FIG. 28 is a simulation result diagram of total efficiency of the antenna structure shown in FIG. 26.
Figure 29:
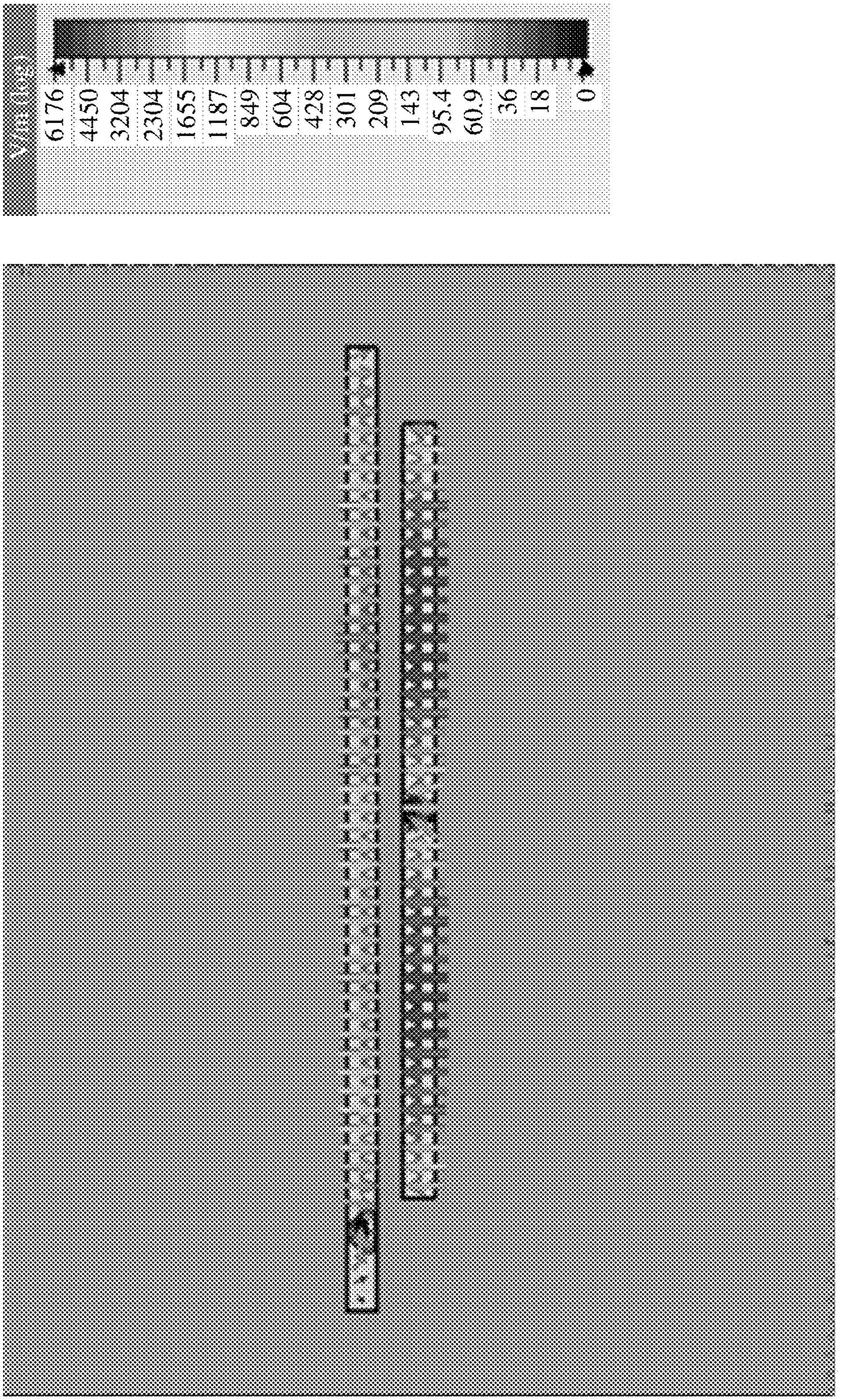
FIG. 29 is a schematic diagram of electric field distribution when a first feed unit in the antenna structure shown in FIG. 26 operates.
Figure 30:
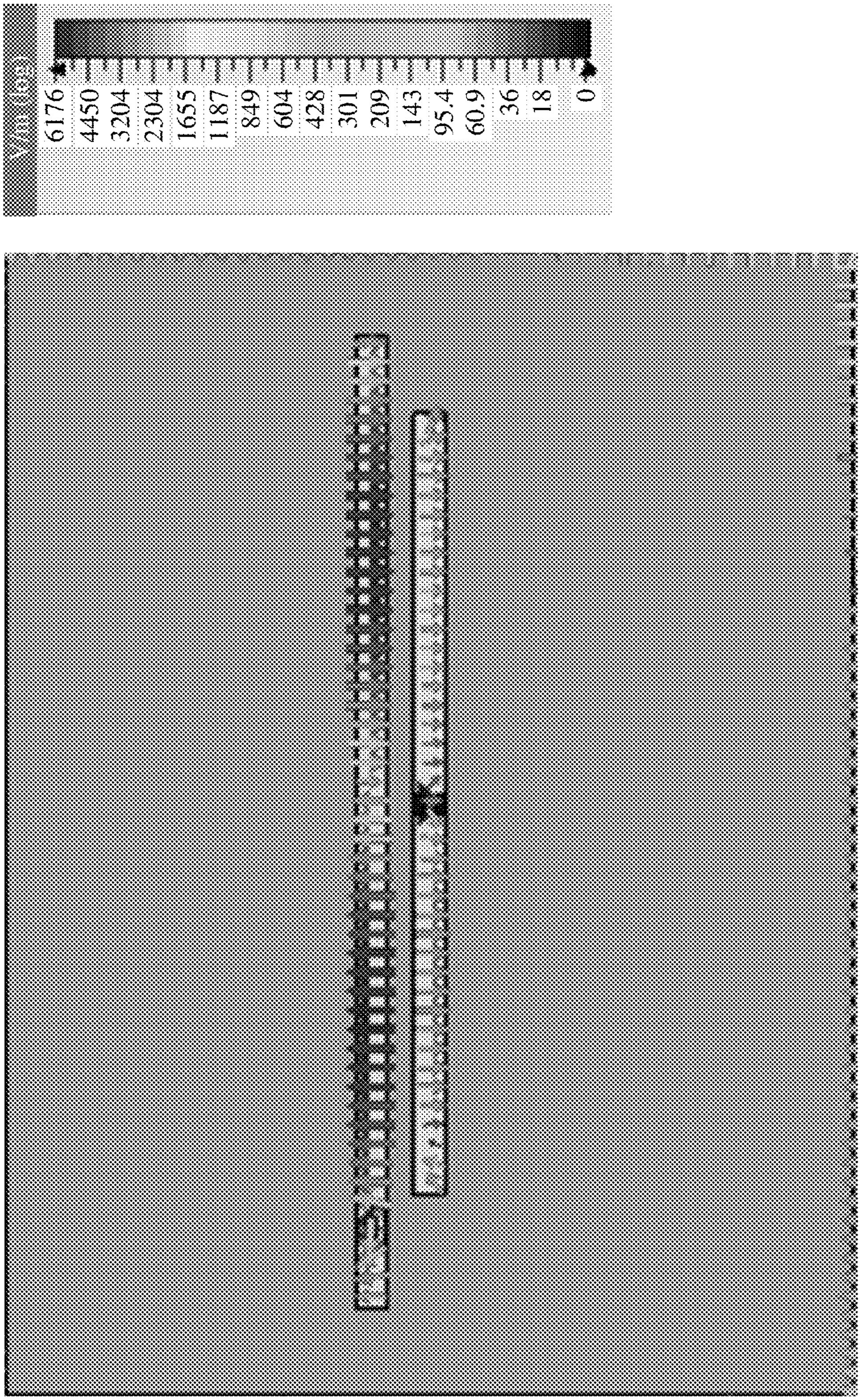
FIG. 30 is a schematic diagram of electric field distribution when a second feed unit in the antenna structure shown in FIG. 26 operates.
Figure 31:
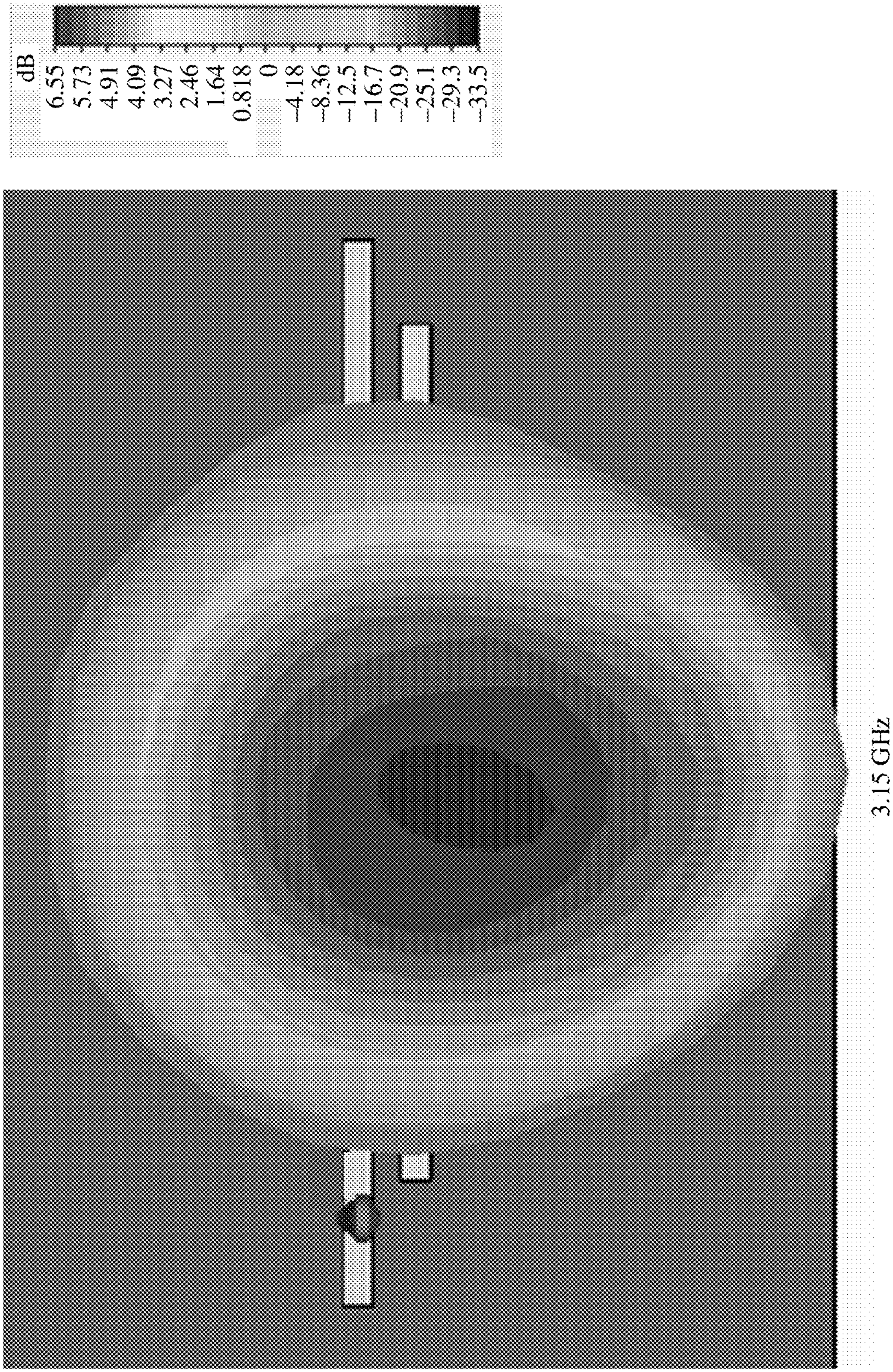
FIG. 31 is a pattern of the first feed unit in the antenna structure shown in FIG. 26 when the first feed unit operates.
Figure 32:
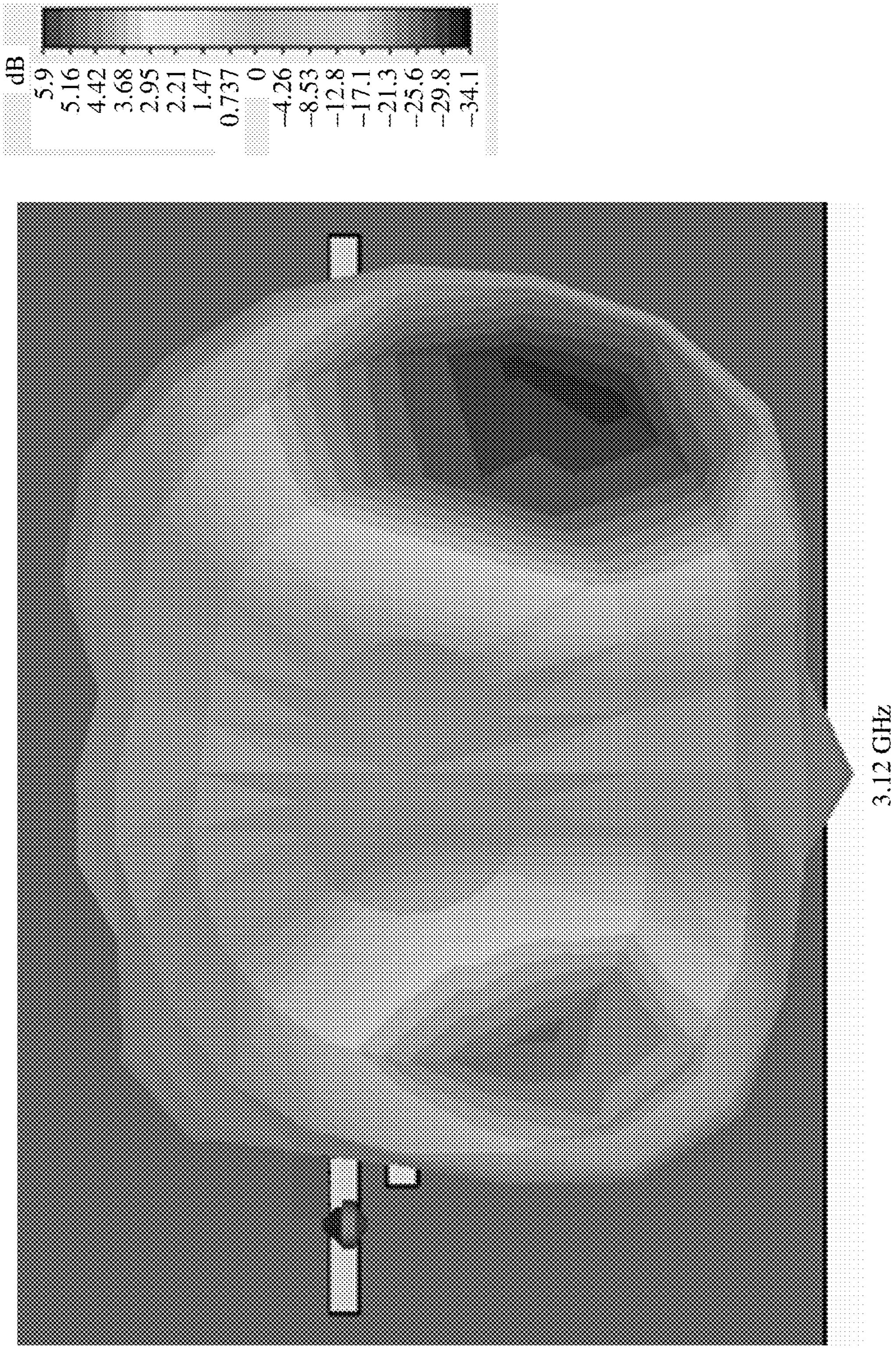
FIG. 32 is a pattern of the second feed unit in the antenna structure shown in FIG. 26 when the second feed unit operates.

FIG. 27 to FIG. 32 are schematic diagrams of simulation results according to embodiments of this application. FIG. 27 is a simulation diagram of an S parameter of the antenna structure shown in FIG. 26. FIG. 28 is a simulation result diagram of total efficiency (total efficiency) of the antenna structure shown in FIG. 26. FIG. 29 is a schematic diagram of electric field distribution when a first feed unit in the antenna structure shown in FIG. 26 operates. FIG. 30 is a schematic diagram of electric field distribution when a second feed unit in the antenna structure shown in FIG. 26 operates. FIG. 31 is a pattern of the first feed unit in the antenna structure shown in FIG. 26 when the first feed unit operates. FIG. 32 is a pattern of a second feed unit in the antenna structure shown in FIG. 26 when the second feed unit operates.

As shown in FIG. 27, in this case, the first antenna element and the second antenna element may still obtain isolation (S21) of more than 15 dB on an intra-frequency band.

For actual engineering application, it is impossible that there is a fully symmetric structure. Therefore, in the technical solution provided in this embodiment of this application, a design solution of the antenna structure may be adjusted based on an actual spatial layout, to better adapt to internal space of the electronic device. In addition, the antenna element in the antenna structure may still have good isolation.

As shown in FIG. 28, total efficiency of both the first antenna element and the second antenna element on an intra-frequency band is greater than −5 dB. The first antenna element and the second antenna element have high total efficiency.

FIG. 29 and FIG. 30 show electric field distribution corresponding to a resonance point of the first antenna element and a resonance point of the second antenna element. As shown in FIG. 29, when the first feed unit performs feeding, electric fields generated by the first antenna element at 3.15 GHz are symmetrically distributed. As shown in FIG. 30, when the second feed unit performs feeding, electric fields generated by the second antenna element at 3.12 GHz are anti-symmetrically distributed. Because the electric field generated by the first antenna element is orthogonal to the electric field generated by the second antenna element, isolation between the first antenna element and the second antenna element is good.

It should be understood that, because the electric field generated by the first antenna element is orthogonal to the electric field generated by the second antenna element, corresponding patterns differ greatly, as shown in FIG. 31 and FIG. 32. In addition, as shown in FIG. 27, in an interval of 1 GHz to 8 GHz, the first antenna element and the second antenna element have two intra-frequency bands (near 3 GHz and near 6.3 GHZ). In this embodiment of this application, for brevity of description, only a simulation result diagram near 3 GHz is provided. When the first antenna element and the second antenna element are near 6.3 GHZ, similar effect is generated. Details are not described one by one herein in this application.

Figure 33:
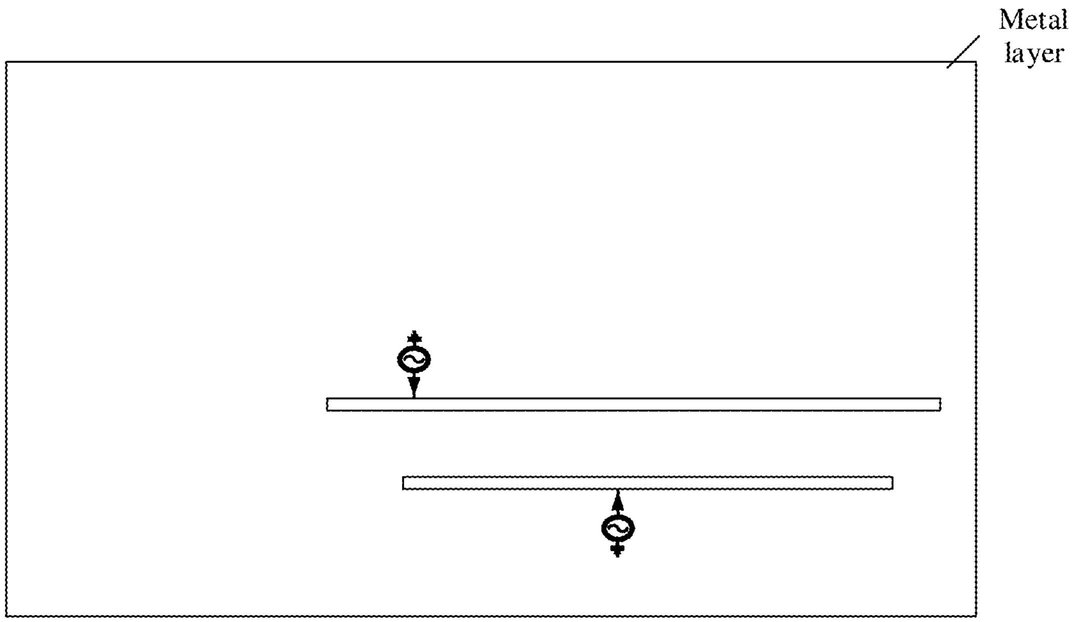
FIG. 33 shows a layout solution of another antenna structure according to an embodiment of this application.

FIG. 33 shows a layout solution of another antenna structure according to an embodiment of this application.

It should be understood that, for a slot antenna, because slots are disposed at different locations of a metal layer, when a feed unit feeds the slot antenna, a radiation characteristic is affected due to asymmetric current distribution on the metal layer. Therefore, an embodiment of this application provides a structure that is not disposed in a center of a metal layer. A difference between this structure and the antenna structure shown in FIG. 26 lies only in a different location of an antenna structure (the antenna structure shown in FIG. 33 is disposed in a lower right corner of the metal layer) and a different size of a metal layer. In the antenna structure shown in FIG. 26, a size of the metal layer is 120 mm×80 mm×0.1 mm, but a size of the metal layer in FIG. 33 is 180 mm×120 mm×0.1 mm.

Figure 34:
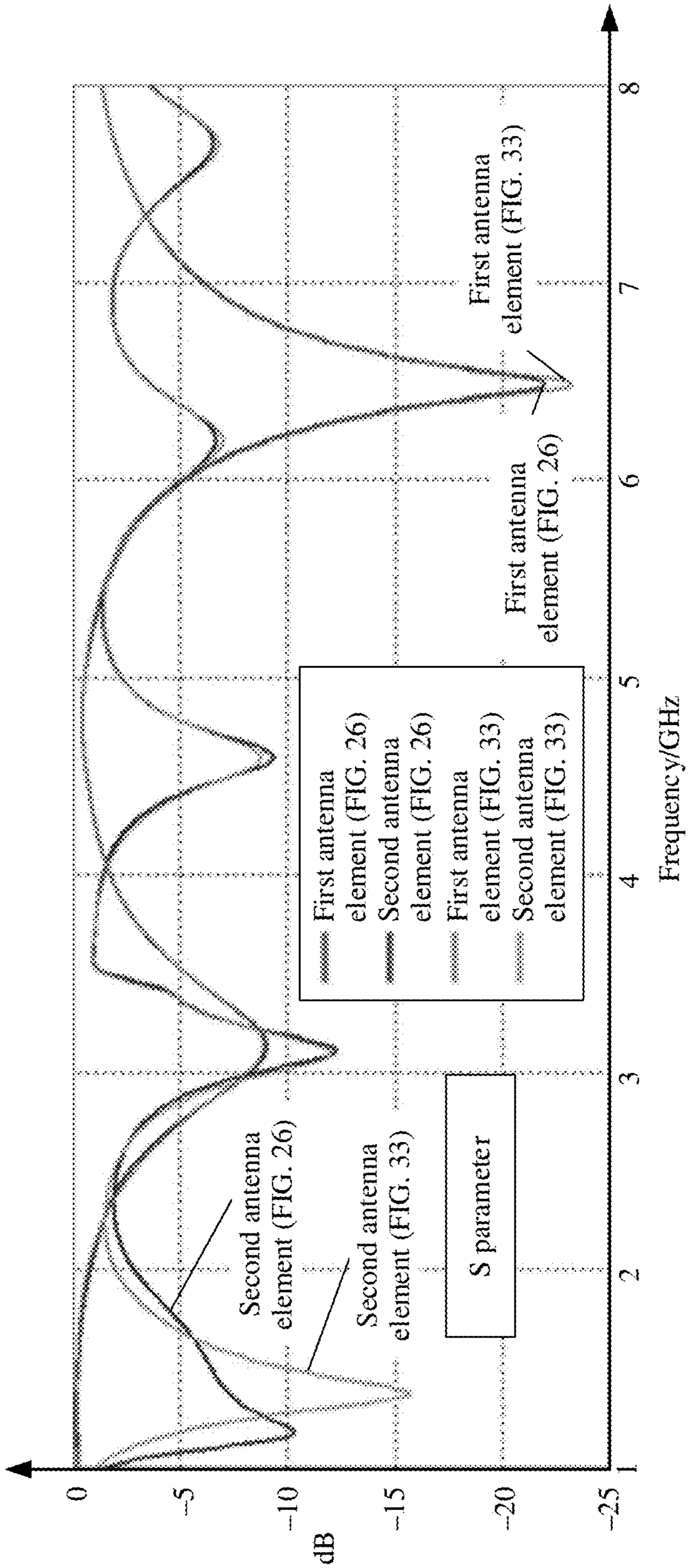
FIG. 34 is a simulation diagram of an S parameter of the antenna structure shown in FIG. 33 and an S parameter of the antenna structure shown in FIG. 26.

FIG. 34 is a simulation diagram of an S parameter of the antenna structure shown in FIG. 33 and an S parameter of the antenna structure shown in FIG. 26.

As shown in FIG. 34, an adjusted position of the antenna structure does not affect resonance generated by the first antenna element and resonance generated by the second antenna element.

Figure 35:
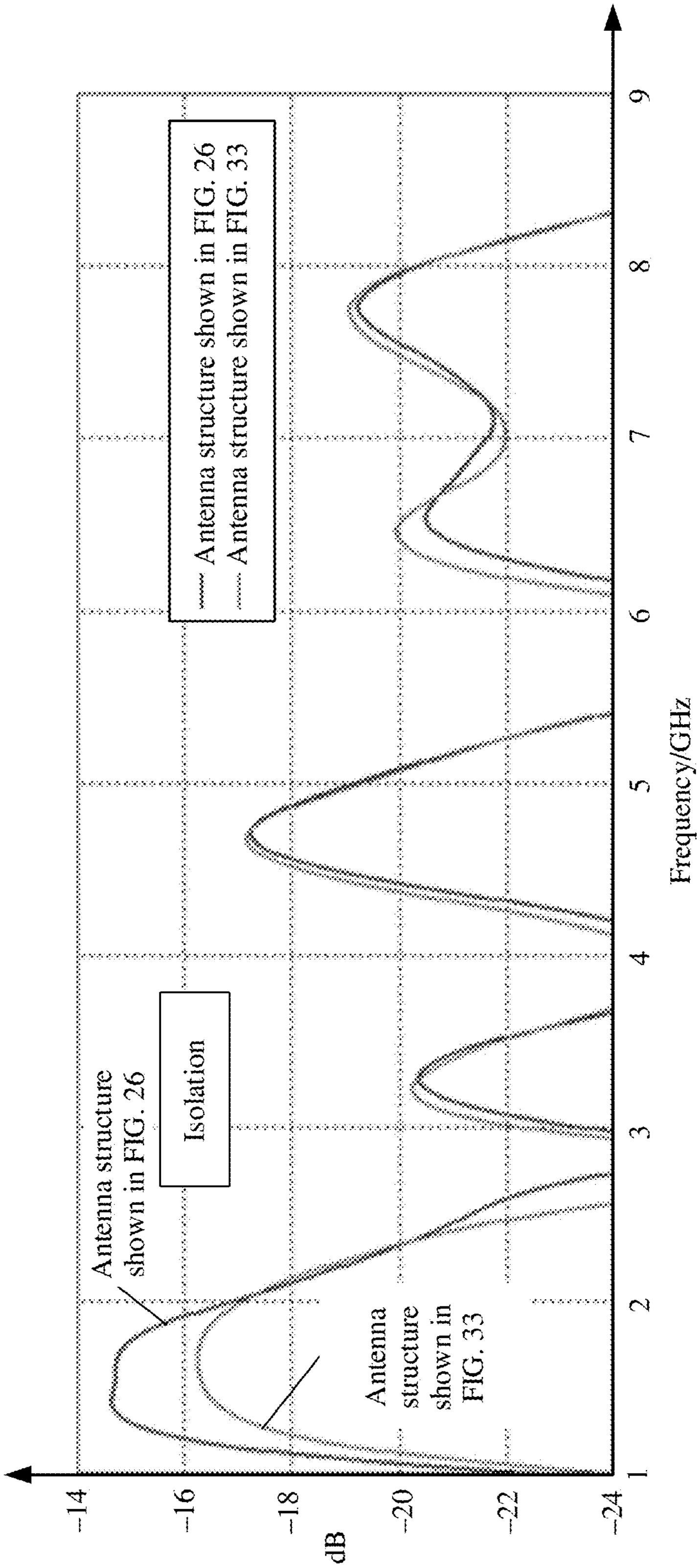
FIG. 35 is a simulation diagram of isolation of the antenna structure shown in FIG. 33 and isolation of the antenna structure shown in FIG. 26.

FIG. 35 is a simulation diagram of isolation of the antenna structure shown in FIG. 33 and isolation of the antenna structure shown in FIG. 26.

As shown in FIG. 35, an adjusted position of the antenna structure does not affect isolation (S21) between the first antenna element and the second antenna element, and good isolation can still be maintained between the first antenna element and the second antenna element. In an intra-frequency band, the isolation is greater than 18 dB.

Figure 36:
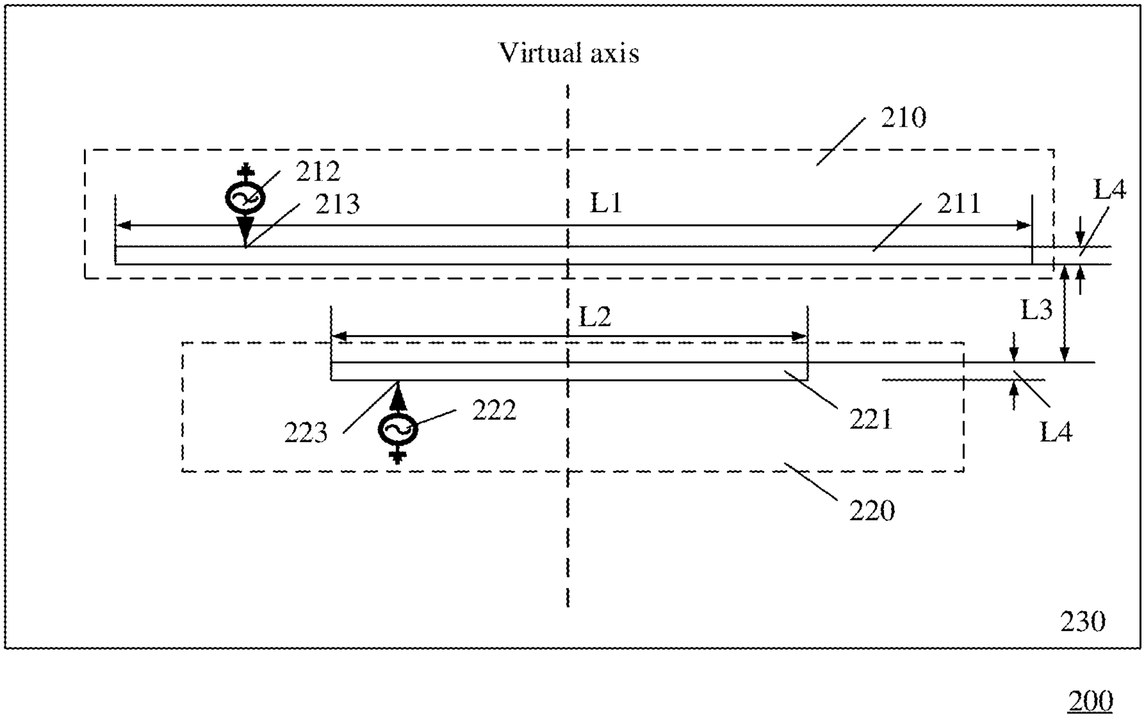
FIG. 36 is a schematic diagram of another antenna structure 200 according to an embodiment of this application.

FIG. 36 is a schematic diagram of another antenna structure 200 according to an embodiment of this application.

It should be understood that, in the foregoing embodiments (as shown in FIG. 14 to FIG. 35), an example in which the first antenna element and the second antenna element are one-time wavelength slot antennas is used for description.

The first antenna element and the second antenna element correspond to the second antenna pair shown in FIG. 12. As shown in FIG. 19, in the foregoing embodiment, the one-time wavelength mode of the first antenna element and the one-time wavelength mode of the second antenna element are used to enable the first antenna element and the second antenna element to be intra-frequency. The electric fields generated by the first antenna element in the symmetrical central feed manner are symmetrically distributed, and the electric fields generated by the second antenna element in the offset central feed manner are anti-symmetrically distributed. In this way, the electric field generated by the first antenna element is orthogonal to the electric field generated by the second antenna element, so that good isolation is maintained between the first antenna element and the second antenna element on an intra-frequency band.

As shown in FIG. 36, a size of the second slot 221 may be reduced, so that an electrical length of the second antenna element 220 is a half of a second wavelength. A one-time wavelength mode of the first antenna element 210 and a half wavelength mode of the second antenna element 220 may be used to enable the first antenna element 210 and the second antenna element 220 to be intra-frequency. In addition, an area that is of a metal layer 230 and that is occupied by the antenna structure 200 can be reduced.

It should be understood that the second antenna element 220 performs feeding in the offset central feed manner (the second feed unit 222 feeds the second antenna element 220 at an end of the second slot 221), and electric fields generated by a half wavelength slot antenna are symmetrically distributed. Therefore, to ensure that the first antenna element and the second antenna element maintain good isolation on an intra-frequency band or an adjacent frequency band, electric fields generated by the first antenna element 210 needs to be anti-symmetrically distributed, and the first antenna element 210 needs to use the offset central feed manner (the first feed unit 212 feeds the first antenna element 210 at an end of the first slot 211) to generate electric fields that are anti-symmetrically distributed. In addition, a second feed point 223 at which the second feed unit 222 is electrically connected to the second slot 221 and a first feed point 213 at which the first feed unit 212 is electrically connected to the first slot 211 may be located on a same side of a virtual axis, or separately located on two sides of a virtual axis. This is not limited in this application.

The antenna structure shown in FIG. 36 corresponds to the second antenna pair shown in FIG. 13. Both a slot antenna designed based on a half wavelength and a slot antenna designed based on a one-time wavelength perform feeding in an offset central feed manner. Electric fields generated by the slot antenna designed based on a half wavelength are symmetrically distributed, electric fields generated by the slot antenna designed based on a one-time wavelength are anti-symmetrically distributed, and the two antenna elements may be combined to form a high-isolation antenna pair.

As shown in FIG. 36, an electrical length of the first slot 211 may be a first wavelength. An electrical length of the second slot 221 may be a half of a second wavelength. It should be understood that a medium may be filled in the first slot 211 and the second slot 221, to further reduce an area that is of the metal layer 230 and that is occupied by the antenna structure 200. In this embodiment of this application, that a mixture (PC/ABS) of polycarbonate and acrylonitrile-butadiene-styrene copolymer is filled is used as an example for description. A dielectric constant (Er) of the mixture is 3, and a loss angle tangent (tan $\theta$) is 0.01. This is not limited in this application. An adjustment may be made based on an actual design.

In this embodiment of this application, an example in which the first antenna element 210 and the second antenna element 220 operate at 2.5 GHz is used for description. Because a resonance point generated by the first antenna element 210 and a resonance point generated by the second antenna element 220 are different, that a length L1 of the first slot 211 is 95 mm and a length L2 of the second slot 221 is 46 mm is used for description. A resonant frequency band of the first antenna element 210 and a resonant frequency band of the second antenna element 220 may be adjusted by adjusting the length of the first slot 211 and the length of the second slot 221 based on an actual production design requirement, or by adding an electronic component. This is not limited in this application.

Further, a width L4 of the first slot 211 and a width L5 of the second slot 221 may be adjusted, to adjust the resonant frequency band of the first antenna element 210 and the resonant frequency band of the second antenna element 220. In this application, L4=L5=2 mm is used as an example for description, and an adjustment may be made based on an actual production design requirement. This is not limited in this application.

In this embodiment of this application, an example in which the first antenna element 210 and the second antenna element 220 operate at 2.5 GHz is used for description. A distance between the first slot 211 and the second slot 221 may be less than 10 mm. For example, in this embodiment, that a distance L3 between the first slot 211 and the second slot 221 is 4 mm is used for description. The distance between the first slot 111 and the second slot 121 may be adjusted based on an actual production design requirement. This is not limited in this application. It should be understood that the distance L3 between the first slot 111 and the second slot 121 may be considered as a shortest straight-line distance between a point in the first slot 111 and a point in the second slot 121.

Figure 37:
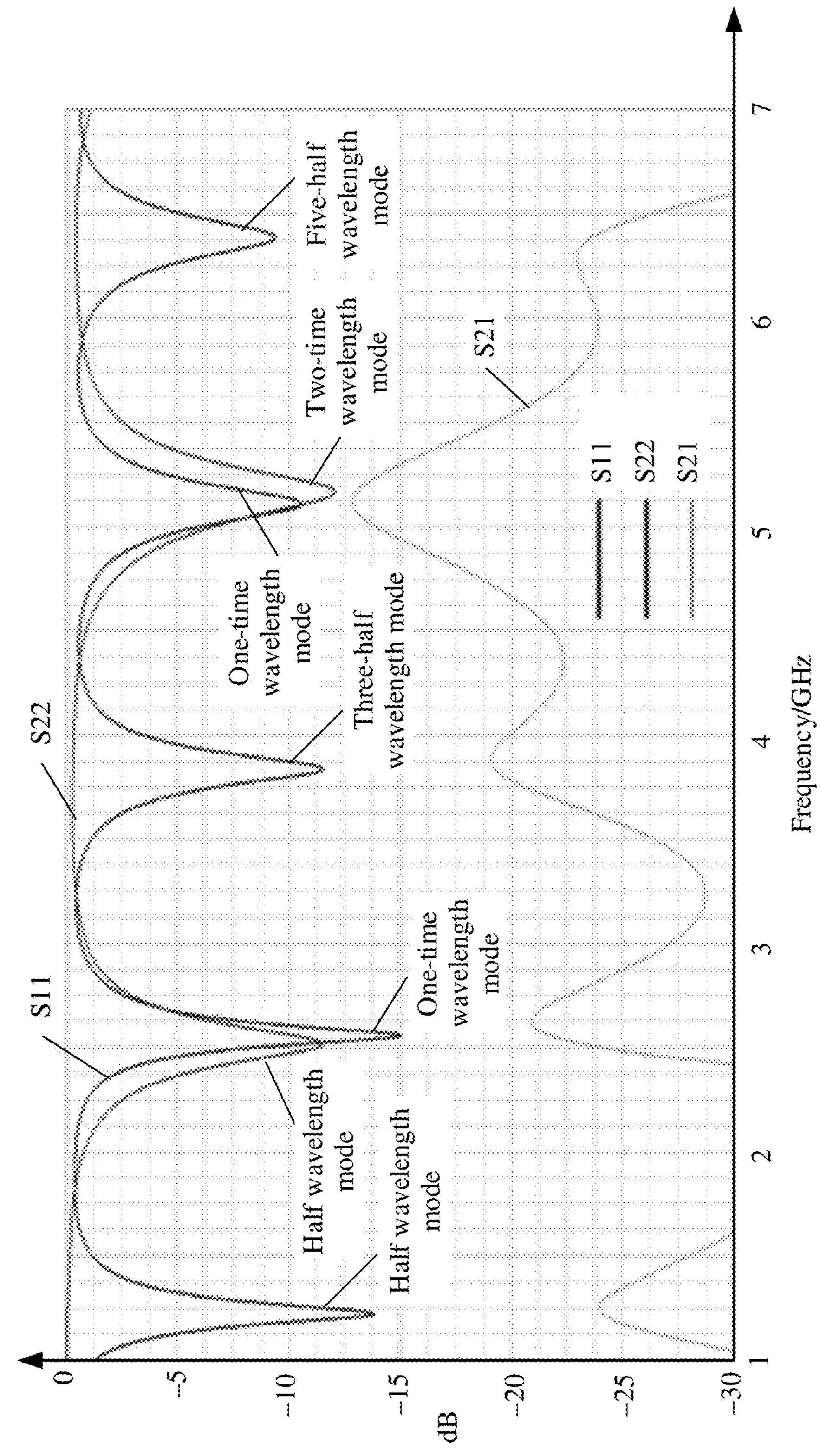
FIG. 37 is a simulation diagram of an S parameter of the antenna structure shown in FIG. 36.
Figure 38:
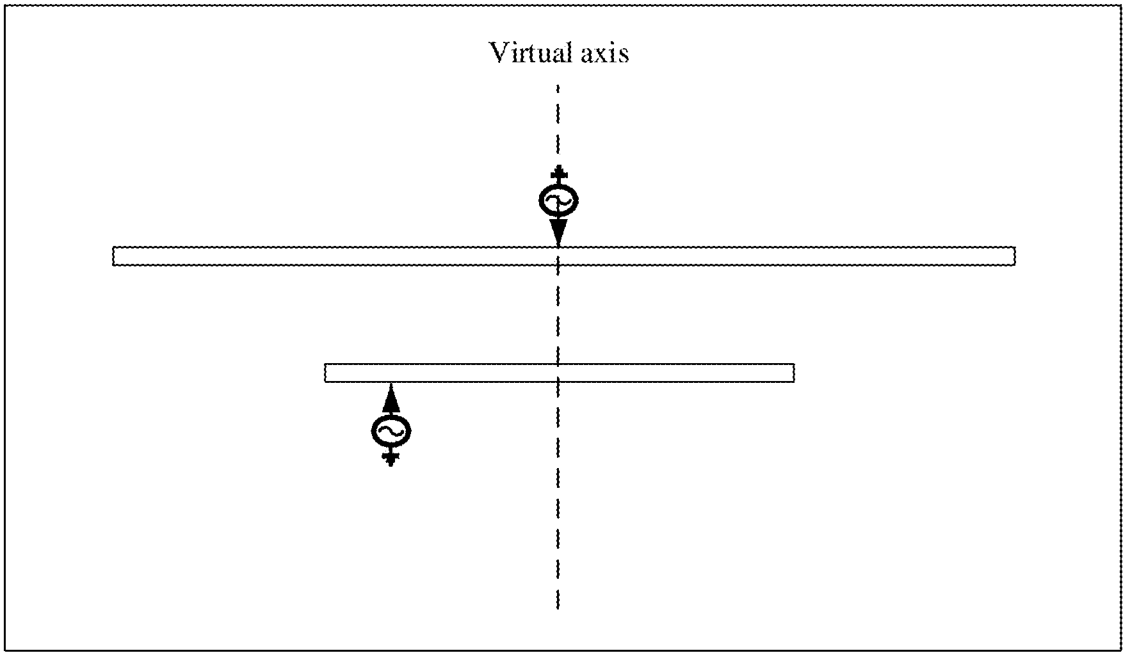
FIG. 38 is a schematic diagram of another antenna structure.
Figure 39:
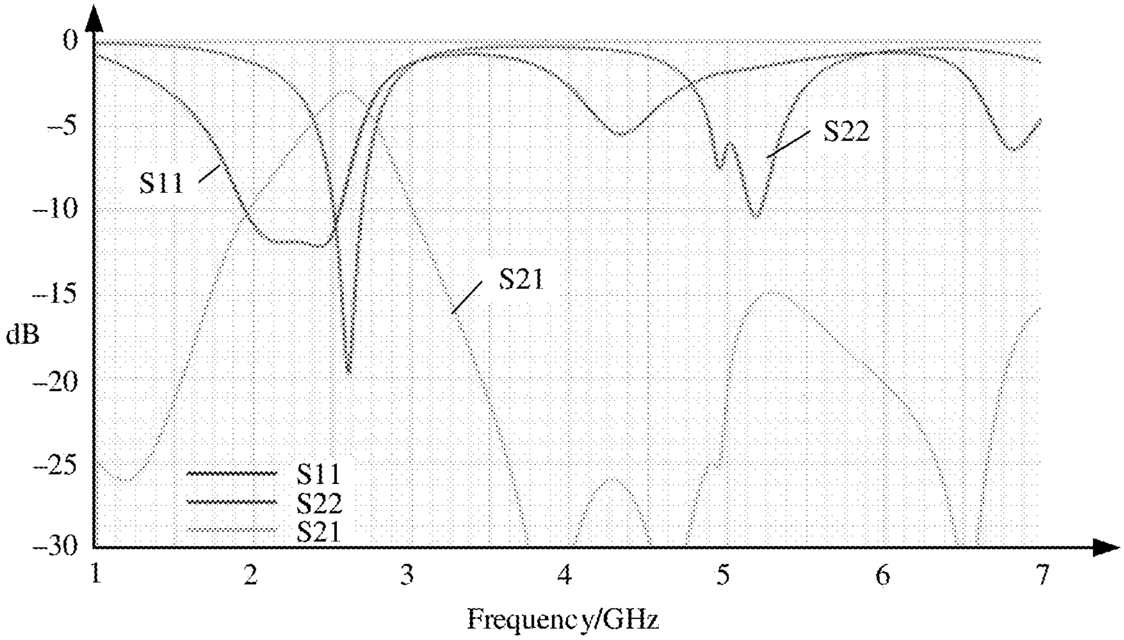
FIG. 39 is a simulation diagram of an S parameter of the antenna structure shown in FIG. 38.

FIG. 37 to FIG. 39 show antenna structures in different feed manners and simulation diagrams of S parameters corresponding to the antenna structures according to embodiments of this application. FIG. 37 is a simulation diagram of an S parameter of the antenna structure shown in FIG. 36. FIG. 38 is a schematic diagram of another antenna structure; FIG. 39 is a simulation diagram of an S parameter of the antenna structure shown in FIG. 38.

As shown in FIG. 38, a first antenna element in the antenna structure uses a symmetrical central feed manner. It should be understood that a difference between the antenna structure shown in FIG. 38 and the antenna structure shown in FIG. 36 lies only in feed manners of the first antenna element, and other environments are the same. For example, all the antenna structures use a same size of a metal layer, namely, 160 mm×100 mm×0.7 mm, and a conductivity of 5.8×e7 S/m.

As shown in FIG. 37 and FIG. 39, when the first antenna element and the second antenna element operate on a same frequency band or an adjacent frequency band, only in the antenna structure shown in FIG. 36, on an intra-frequency band, isolation (S21) between the first antenna element and the second antenna element is greater than 13 dB, the first antenna element and the second antenna element may be applied to the MIMO antenna system, or may be applied as intra-frequency antenna elements (for example, operating on a Wi-Fi frequency band and a BT frequency band respectively). In the antenna structure shown in FIG. 38, the first antenna element uses a symmetrical central feed manner, and generated electric fields are symmetrically distributed; and the second antenna element uses an offset central feed manner, and generated electric fields are symmetrically distributed. Therefore, the electric field generated by the first antenna element is non-orthogonal to the electric field generated by the second antenna element, and the isolation is poor and is around −5 dB.

As shown in FIG. 36 and FIG. 37, the first antenna element uses an offset central feed manner. When the first feed unit performs feeding, a half wavelength mode, a one-time wavelength mode, a three-half wavelength mode, a two-time wavelength mode, a two-time wavelength mode, and a five-half wavelength mode of the first antenna element may be excited. The second antenna element uses an offset central feed manner. When the second feed unit performs feeding, a half wavelength mode and a one-time wavelength mode of the second antenna element may be excited. In the antenna structure shown in FIG. 36, near 2.5 GHZ, the one-time wavelength mode of the first antenna element and the half wavelength mode of the second antenna element may be used to enable the first antenna element and the second antenna element to be intra-frequency. Alternatively, near 5.2 GHz, the two-time wavelength mode of the first antenna element and the one-time wavelength mode of the second antenna element may be used to enable the first antenna element and the second antenna element to be intra-frequency.

Figure 40:
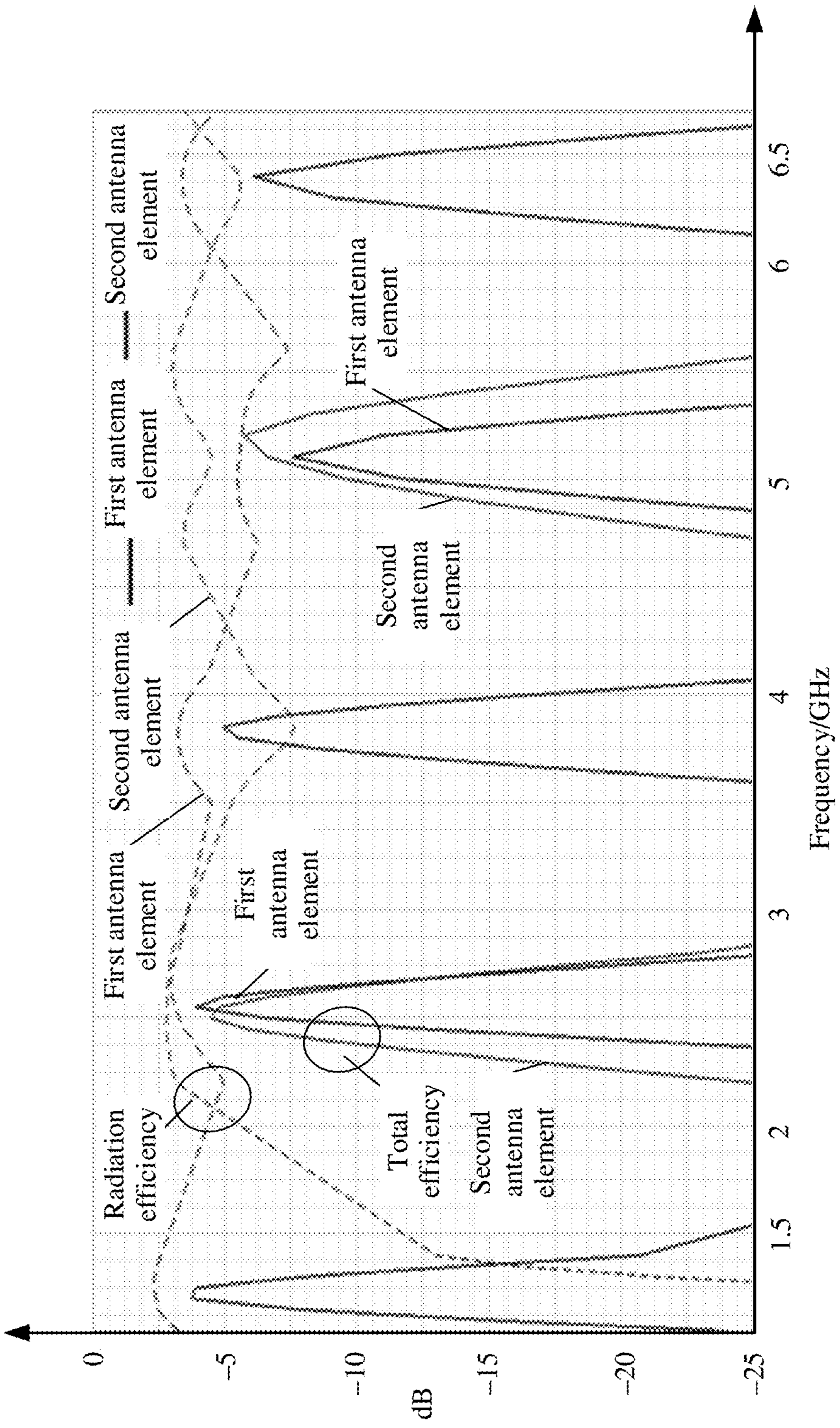
FIG. 40 is a simulation result diagram of efficiency of the antenna structure shown in FIG. 36.
Figure 41:
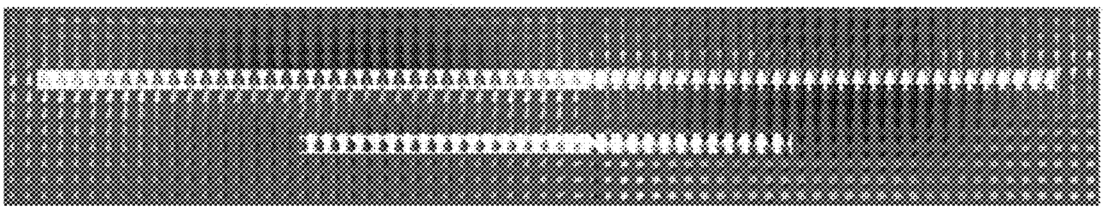
FIG. 41 is a schematic diagram of electric field distribution when a first feed unit in the antenna structure shown in FIG. 36 operates.
Figure 42:
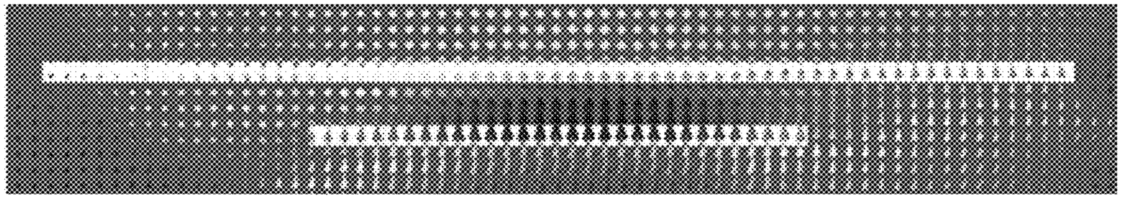
FIG. 42 is a schematic diagram of electric field distribution when a second feed unit in the antenna structure shown in FIG. 36 operates.
Figure 43:
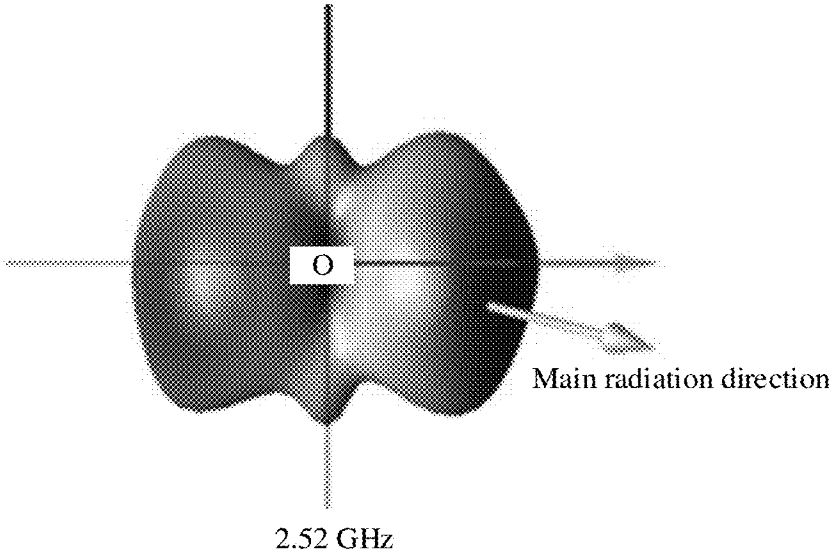
FIG. 43 is a pattern of the first feed unit in the antenna structure shown in FIG. 36 when the first feed unit operates.
Figure 44:
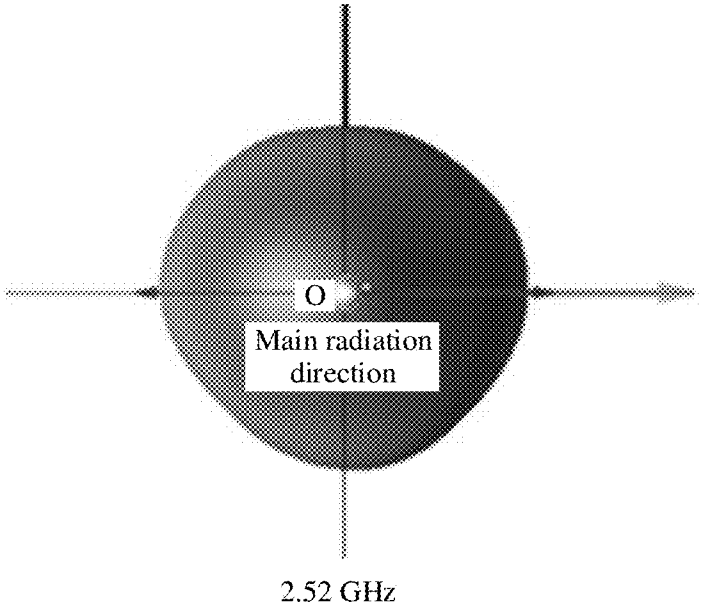
FIG. 44 is a pattern of the second feed unit in the antenna structure shown in FIG. 36 when the second feed unit operates.

FIG. 40 to FIG. 44 are schematic diagrams of simulation results according to embodiments of this application. FIG. 40 is a simulation result diagram of efficiency of the antenna structure shown in FIG. 36. FIG. 41 is a schematic diagram of electric field distribution when a first feed unit in the antenna structure shown in FIG. 36 operates. FIG. 42 is a schematic diagram of electric field distribution when a second feed unit in the antenna structure shown in FIG. 36 operates. FIG. 43 is a pattern of the first feed unit in the antenna structure shown in FIG. 36 when the first feed unit operates. FIG. 44 is a pattern of a second feed unit in the antenna structure shown in FIG. 36 when the second feed unit operates.

As shown in FIG. 40, total efficiency of both the first antenna element and the second antenna element on an intra-frequency band is greater than −10 dB. The first antenna element and the second antenna element have high total efficiency. In addition, on the frequency band, radiation efficiency of the first antenna element and radiation efficiency of the second antenna element are equivalent, a difference between the radiation efficiency of the first antenna element and the radiation efficiency of the second antenna element is within 1 dB, and the first antenna element and the second antenna element have similar radiation performance.

FIG. 41 and FIG. 42 show electric field distribution corresponding to a resonance point of the first antenna element and a resonance point of the second antenna element. As shown in FIG. 41, when the first feed unit performs feeding, electric fields generated by the first antenna element at 2.52 GHz are anti-symmetrically distributed. As shown in FIG. 42, when the second feed unit performs feeding, electric fields generated by the second antenna element at 2.52 GHz are symmetrically distributed. Because the electric field generated by the first antenna element is orthogonal to the electric field generated by the second antenna element, isolation between the first antenna element and the second antenna element is good.

It should be understood that, because the electric field generated by the first antenna element is orthogonal to the electric field generated by the second antenna element, corresponding patterns differ greatly, as shown in FIG. 43 and FIG. 44. In addition, as shown in FIG. 27, in an interval of 1 GHz to 7 GHZ, the first antenna element and the second antenna element have two intra-frequency bands (near 2.5 GHz and near 5.2 GHz). In this embodiment of this application, for brevity of description, only a simulation result diagram near 2.5 GHz is provided. When the first antenna element and the second antenna element are near 5.2 GHZ, similar effect is generated. Details are not described one by one herein in this application.

Figure 45:
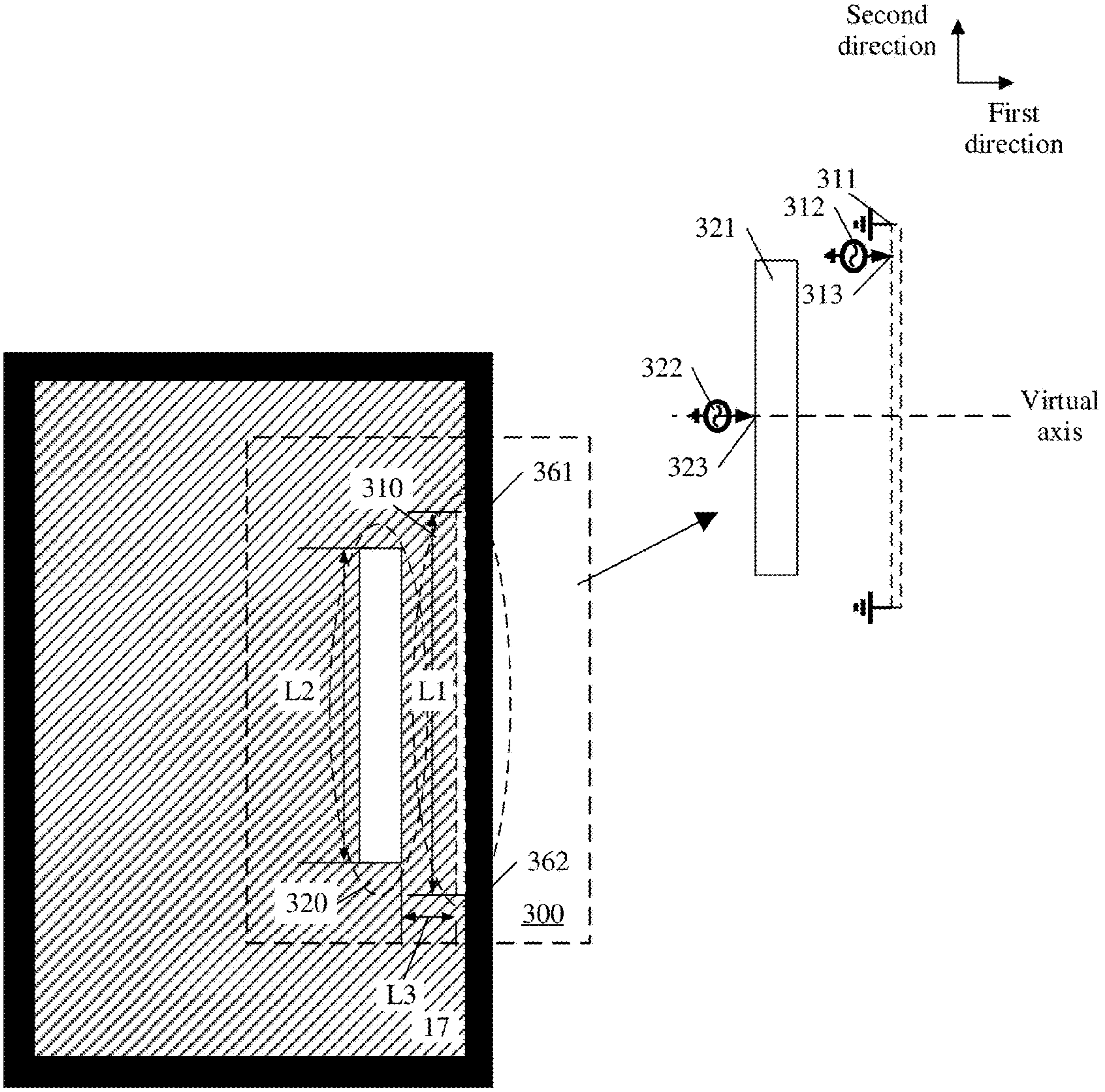
FIG. 45 is a schematic diagram of an antenna structure 300 according to an embodiment of this application.

FIG. 45 is a schematic diagram of an antenna structure 300 according to an embodiment of this application. The antenna structure 300 may be applied to the electronic device shown in FIG. 1.

As shown in FIG. 45, the antenna structure 300 includes a first antenna element 310 and a second antenna element 320. An operating frequency band of the first antenna element 310 is the same as or adjacent to an operating frequency band of the second antenna element 320.

The first antenna element 310 may include a slot 311. The second antenna element 320 may include a first radiator 321. The first radiator 321 and the slot 311 may be disposed in parallel and be spaced apart, to save space occupied by the antenna structure 300, and to be more applicable to decreasing internal space inside the electronic device. The slot 311 and the first radiator 321 extend in a first direction and are spaced apart in a second direction. The second direction is perpendicular to the first direction, and projections of the slot 311 and the first radiator 321 in the second direction at least partially overlap. A spacing distance between the slot 311 and the first radiator 321 in the second direction is less than a quarter of a first wavelength or a quarter of a second wavelength. The first wavelength is a wavelength corresponding to an operating frequency band of the first antenna 310. For example, the first wavelength may be a wavelength corresponding to a center frequency of the operating frequency band of the first antenna 310 or a wavelength corresponding to a resonance point of the first antenna 310. The second wavelength is a wavelength corresponding to an operating frequency band of the second antenna 320. For example, the second wavelength may be a wavelength corresponding to a center frequency of the operating frequency band of the second antenna 320 or a wavelength corresponding to a resonance point of the second antenna 320. The slot 311 includes a first feed point 313. The first feed point 313 is disposed at an end of the slot 311, and the first feed point 313 is configured to feed the first antenna element 310. A first feed unit 312 is electrically connected, at the first feed point 313, to a conductor on one side of the slot 311, to feed the first antenna element 310. The first radiator 321 includes a second feed point 323. The second feed point 323 is disposed in a central region of the first radiator 321, and the second feed point 323 is configured to feed the second antenna element 320. The second feed unit 322 is electrically connected to the first radiator 321 at the second feed point 323, to feed the second antenna element 120.

In this embodiment, the first antenna element 310 uses an offset central feed manner, and electric fields generated by the first antenna element 310 are anti-symmetrically distributed. The second antenna element 320 uses a symmetrical central feed manner, and electric fields generated by the second antenna element 320 are symmetrically distributed. Because the electric field generated by the first antenna element 310 is orthogonal to the electric field generated by the second antenna element 320 (the electric fields of the first antenna element are anti-symmetrically distributed, that is, have an odd function characteristic, and the electric fields of the second antenna element are symmetrically distributed, that is, have an even function characteristic), the first antenna element 310 and the second antenna element 320 may be combined to form a high-isolation antenna pair.

It should be understood that, based on the principle shown in the foregoing embodiment, the first antenna element 310 may produce same effect in an anti-symmetrical central feed manner. That is, the first feed point 313 is disposed in a central region of the slot 311, and a positive electrode and a negative electrode of the first feed unit 312 are electrically connected to metal on two sides of the second slot 311 at the first feed point 313, to feed the first antenna element 320.

In the foregoing embodiment, that the first radiator 321 and the slot 311 are disposed in parallel may be understood as the following: A length direction of the first radiator 321 is approximately parallel to a length direction of the slot 311. Because internal space of the electronic device is increasingly limited, in engineering application, the first radiator 321 and the slot 311 may be bent (the first radiator 321 and the slot 311 are not necessarily straight lines), to adapt to the internal space of the electronic device. Therefore, that the first radiator 321 is parallel to the slot 311 may be considered as the following: An angle between the length direction of the first radiator 321 and the length direction of the slot 311 is less than 45°.

An end of the slot 311 cannot be narrowly understood as a point, and may alternatively be considered as a segment of a radiator that includes an endpoint and that is on the slot 311. For example, when an electrical length of the slot 311 is a first wavelength, an end of the slot 311 may be considered as a region whose distance from the endpoint is within a quarter of the first wavelength, or may be considered as a region whose distance from the endpoint is within 10 mm. The first wavelength is a wavelength corresponding to an operating frequency band of the first antenna element 310. For example, the first wavelength may be a wavelength corresponding to a resonance point of the first antenna element 310, or may be a wavelength corresponding to a center frequency of the operating frequency band of the first antenna element 310.

The central region of the first radiator 321 may be understood as a region formed at a specific distance from a midpoint of the first radiator 321. The midpoint of the first radiator 321 may be a geometric center of the first radiator 321 (where the first radiator 321 has same lengths on two sides of the midpoint), or the midpoint of the first radiator 321 may be a midpoint of an electrical length of the first radiator 321 (where the first radiator 321 has same electrical lengths on two sides of the midpoint). For example, when the electrical length of the first radiator 321 is one time of the second wavelength, the central region of the first radiator 321 may be a region whose distance from the midpoint is within a quarter of the second wavelength. The second wavelength is a wavelength corresponding to an operating frequency band of the second antenna element 320. For example, the second wavelength may be a wavelength corresponding to a resonance point of the second antenna element 320, or may be a wavelength corresponding to a center frequency of the operating frequency band of the second antenna element 320.

In an embodiment, the slot 311 may be formed by using a conductive part of a frame 360 of the electronic device and the PCB 17. The frame 360 may alternatively be a metal frame. The metal frame 360 is electrically connected to the PCB 17 at a first location 361, and the metal frame 360 is electrically connected to the PCB 17 at a second location 362, so that the metal frame 360 and the PCB 17 form the slot 311 between the first location 361 and the second location 362. Specifically, the metal frame 360 is electrically connected to a ground metal layer of the PCB 17 at the first location 361, and the metal frame 360 is electrically connected to the ground metal layer at the second location 362, so that the ground metal layer and the metal frame 360 form the slot 311 between the first location 361 and the second location 362. It should be understood that this embodiment of this application is merely for brevity of description, but does not limit a manner of forming the slot 311. For example, the slot 311 may alternatively be disposed on any conductive structure (for example, a conductive sheet or a conductive layer) inside the electronic device. In an embodiment, the slot 311 may be disposed on the metal layer of the PCB, or the slot may be implemented in a manner that is shown in FIG. 16 and in which the metal layer is disposed above the PCB through LDS, and the slot is disposed on the metal layer, or the slot may be formed between a display of the electronic device and the PCB, or the slot may be formed between a display of the electronic device and a metal layer disposed on a support, or the slot may be formed between a housing and a frame of the electronic device. Similarly, the first radiator 321 may alternatively be designed in a plurality of manners. For example, the first radiator 321 may be implemented through LDS and disposed above the PCB, or may be implemented by using a part of a metal frame of the electronic device, or may be implemented by using another conductive part in the electronic device, for example, an FPC. This is not limited in this application. An adjustment may be made based on a spatial layout inside the electronic device. In an embodiment, the first radiator 321 is a radiator whose two ends are open. For example, both a first end and a second end of the first radiator 321 are open ends. The "open end" in this application should be understood as an ungrounded end. For example, that the first end of the radiator is an open end should be understood as the following: No ground point is disposed on a segment that is of the radiator and whose distance from the first end is within a quarter of a wavelength.

In an embodiment, the electric fields generated by the first antenna element 310 may be anti-symmetrically distributed along a virtual axis, and the electric fields generated by the second antenna element 320 may be symmetrically distributed along the virtual axis. The virtual axis may be a virtual symmetry axis of the slot 311 (where the slot 311 has same lengths or electrical lengths on two sides of the virtual axis), or may be a virtual symmetry axis of the first radiator 321 (where the first radiator 321 has same lengths or electrical lengths on two sides of the virtual axis).

In an embodiment, a spacing distance between the virtual symmetry axis of the slot 311 and the virtual symmetry axis of the first radiator 321 in the first direction is less than a quarter of the first wavelength or a quarter of the second wavelength. As overall symmetry of the antenna structure increases, a radiation characteristic of the antenna structure becomes better. For example, when the virtual symmetry axis of the slot 311 overlaps the virtual symmetry axis of the first radiator 321, a radiator characteristic of the antenna structure is optimal. However, in an electronic device, an antenna structure needs to be designed with reference to internal space of the electronic device. Therefore, the virtual symmetry axis of the slot 311 and the virtual symmetry axis of the first radiator 321 may not necessarily fully overlap.

When the spacing distance between the virtual symmetry axis of the slot and the virtual symmetry axis of the first radiator in the first direction is less than a quarter of the first wavelength or less than a quarter of the second wavelength, good isolation may also be maintained between the first antenna element and the second antenna element.

In an embodiment, the currents generated by the first antenna element 310 may be anti-symmetrically distributed along the virtual axis, and the currents generated by the second antenna element 320 may be symmetrically distributed along the virtual axis.

In an embodiment, the slot 311 and the first radiator 321 are symmetrical along the virtual axis, that is, the slot 311 and the first radiator 321 have same lengths or electrical lengths on two sides of the virtual axis. It should be understood that, as symmetry between the slot 311 and the first radiator 321 increases, an overall radiation characteristic of the antenna structure 300 becomes better. However, in an electronic device, an antenna structure needs to be designed with reference to internal space of the electronic device. Therefore, the slot 311 and the first radiator 321 cannot be fully symmetrical along the virtual axis. When the slot 311 or the first radiator 321 deviates from the virtual axis by a range within a quarter of the first wavelength or a quarter of the second wavelength, good isolation may also be maintained between the first antenna element 110 and the second antenna element 120.

In an embodiment, the electrical length of the slot 311 may be the first wavelength, and the electrical length of the first radiator 321 may be the second wavelength. The slot 311 and the first radiator 321 may correspond to the third antenna pair in FIG. 12. It should be understood that, for the slot 311 and the first radiator 321, different electronic components may be used to change lengths of the slot 311 and the first radiator 321 while it is ensured that the electrical length of the slot 311 and the electrical length the first radiator 321 do not change. In this embodiment of this application, an example in which the first antenna element 310 and the second antenna element 320 operate at 2.5 GHz is used for description. Because a resonance point generated by the first antenna element 410 and a resonance point generated by the second antenna element 320 are different, that a length L1 of the slot 311 is 82 mm and a length L2 of the first radiator 321 is 78 mm is used for description. A resonant frequency band of the first antenna element 310 and a resonant frequency band of the second antenna element 320 may be adjusted by adjusting the length of the slot 311 and the length of the first radiator 321 based on an actual production design requirement, or by adding an electronic component. This is not limited in this application.

Further, in this embodiment, the first radiator 321 is disposed above the PCB 17 through LDS. In this application, an example in which a distance between the first radiator 321 and the PCB 17 is 2.8 mm is used for description. An adjustment may be made based on an actual production design requirement. This is not limited in this application.

In an embodiment, a distance L3 between the slot 311 and the first radiator 321 may be less than a quarter of the first wavelength or a quarter of the second wavelength. That is, the first antenna element 310 and the second antenna element 320 may be disposed at a very close distance to form an intra-frequency antenna pair, which may be applied to a MIMO antenna system. In this embodiment of this application, an example in which the first antenna element 310 and the second antenna element 320 operate at 2.5 GHz is used for description. A distance between the slot 311 and the first radiator 321 may be less than 10 mm. For example, in this embodiment, that the distance L3 between the slot 311 and the first radiator 321 is 5 mm is used for description. The distance between the slot 311 and the first radiator 321 may be adjusted based on an actual production design requirement. This is not limited in this application. It should be understood that the distance L3 between the slot 311 and the first radiator 321 may be considered as a shortest straight-line distance between a point in the slot 311 and a point on the first radiator 321.

Figure 46:
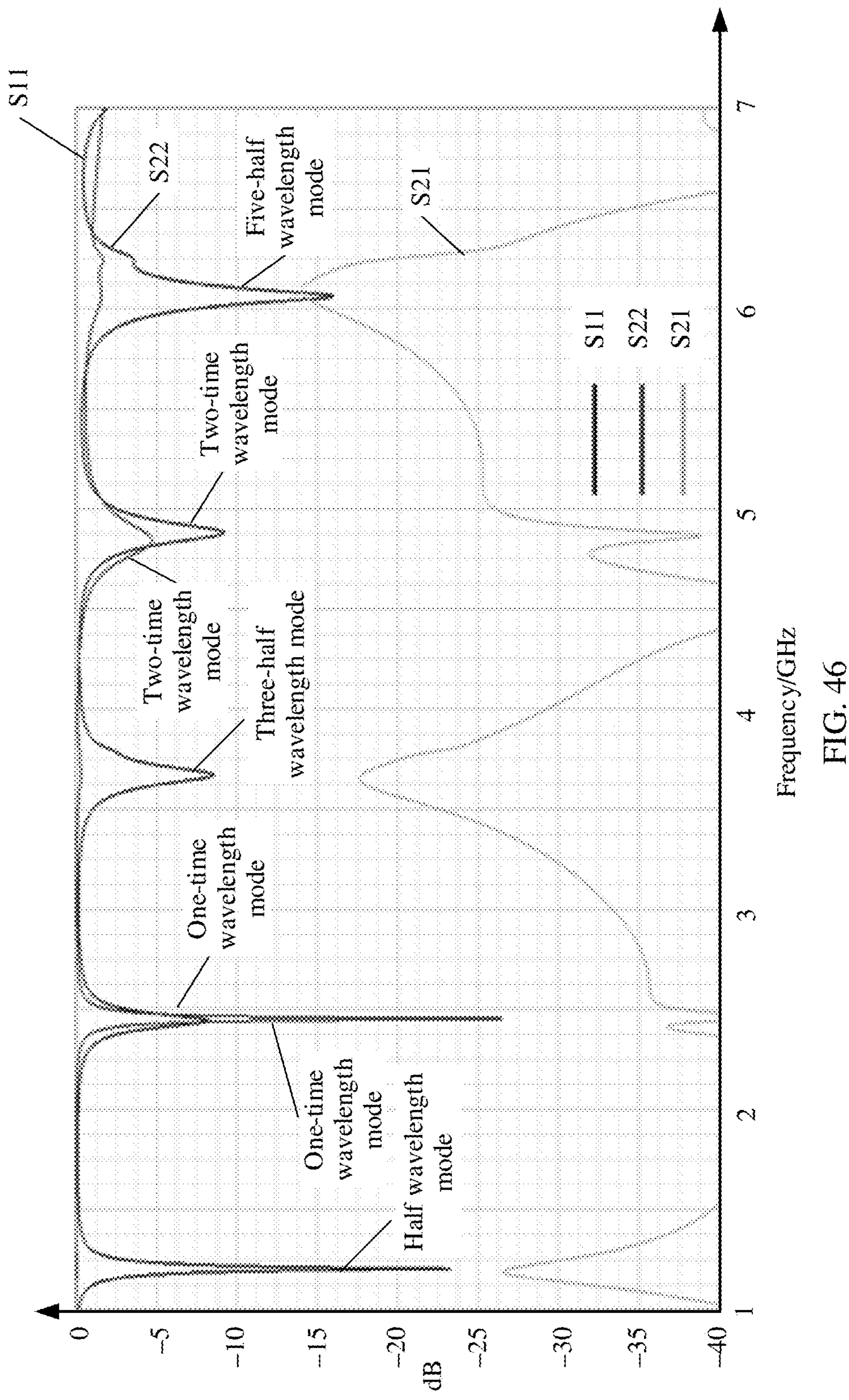
FIG. 46 is a simulation diagram of an S parameter of the antenna structure shown in FIG. 45.
Figure 47:
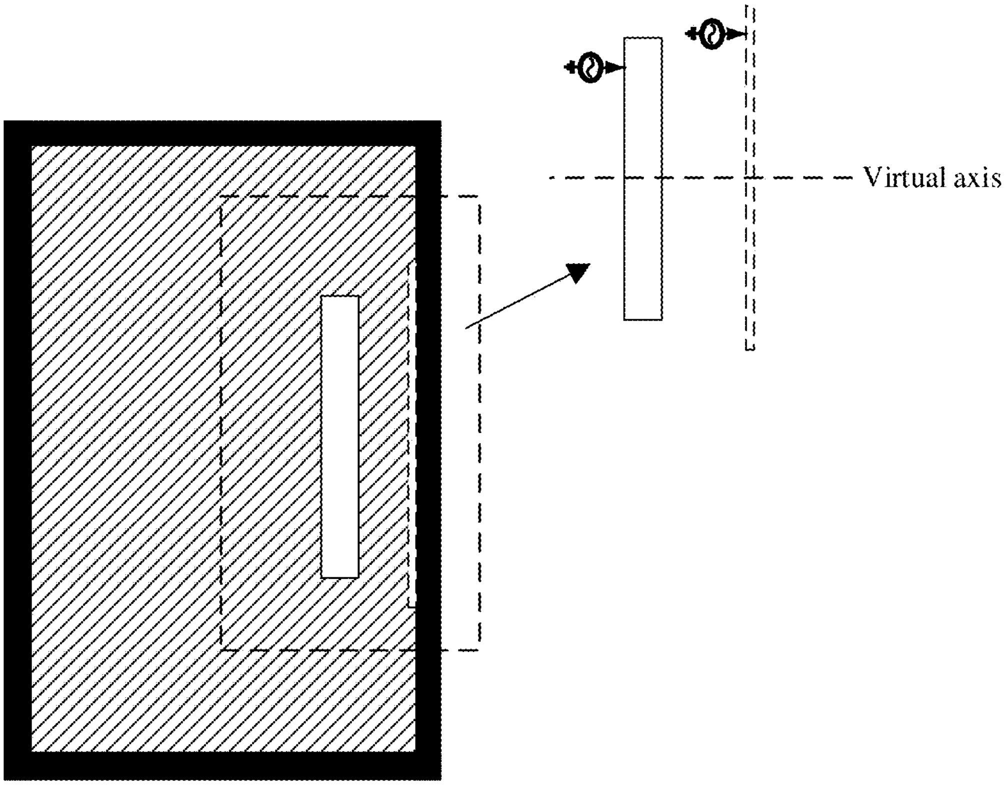
FIG. 47 shows an antenna structure in which both a first antenna element and a second antenna element use an offset central feed manner.
Figure 48:
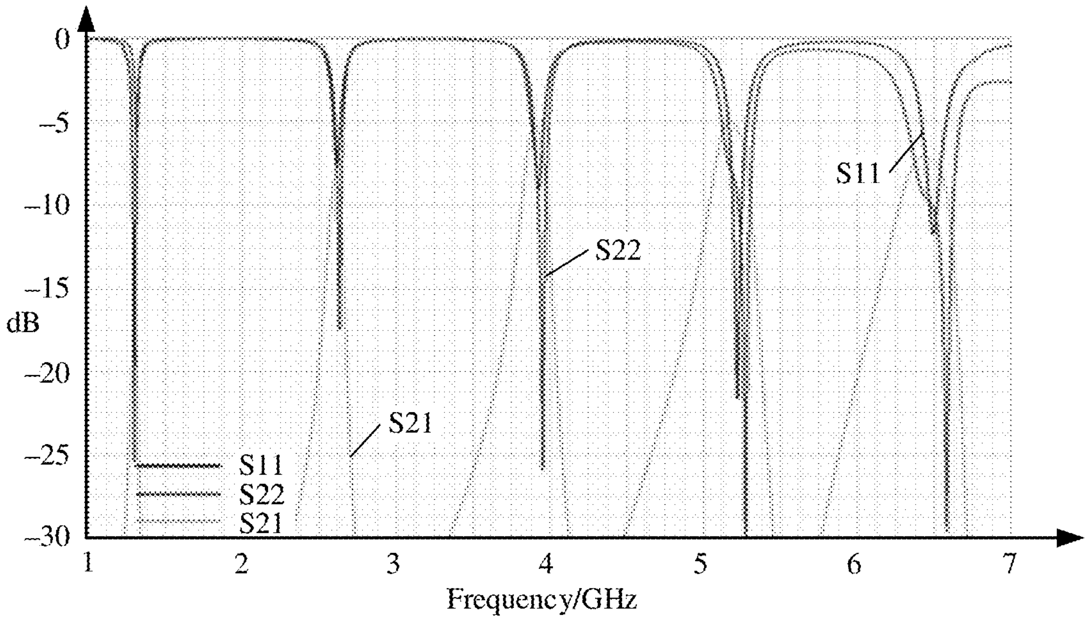
FIG. 48 is a simulation diagram of an S parameter of the antenna structure shown in FIG. 47.

FIG. 46 to FIG. 48 show antenna structures in different feed manners and simulation diagrams of S parameters corresponding to the antenna structures according to embodiments of this application. FIG. 46 is a simulation diagram of an S parameter of the antenna structure shown in FIG. 45. FIG. 47 shows an antenna structure in which both a first antenna element and a second antenna element use an offset central feed manner. FIG. 48 is a simulation diagram of an S parameter of the antenna structure shown in FIG. 47.

It should be understood that a difference between the antenna structures shown the foregoing embodiments lies only in feed manners, and other environments are the same. For example, all metal frames of the electronic devices in which the antenna structures are located have a same size, namely, 158 mm×78 mm.

As shown in FIG. 46 and FIG. 48, when the first antenna element and the second antenna element are intra-frequency antenna elements, only in the antenna structure shown in FIG. 45, on an intra-frequency band, isolation (S21) between the first antenna element and the second antenna element is greater than 25 dB, the first antenna element and the second antenna element may be applied to the MIMO antenna system, or may be applied as intra-frequency antenna elements (for example, operating on a Wi-Fi frequency band and a BT frequency band respectively). For the antenna structure shown in FIG. 47, because a different feed manner is used, an electric field or a current generated by the first antenna element is non-orthogonal to an electric field or a current generated by the second antenna element. Therefore, isolation is poor, and poorest isolation is around −5 dB.

It should be understood that, as shown in FIG. 45 and FIG. 46, the first antenna element uses an offset central feed manner. When the first feed unit performs feeding, a half wavelength mode, a one-time wavelength mode, a three-half wavelength mode, a two-time wavelength mode, a two-time wavelength mode, and a five-half wavelength mode of the first antenna element may be excited. The second antenna element uses a symmetrical central feed manner. When the second feed unit performs feeding, a one-time wavelength mode and a two-time wavelength mode of the second antenna element may be excited. In the antenna structure shown in FIG. 45, near 2.5 GHZ, the one-time wavelength mode of the first antenna element and the one-time wavelength mode of the second antenna element may be used to enable the first antenna element and the second antenna element to be intra-frequency. Alternatively, near 4.8 GHz, the two-time wavelength mode of the first antenna element and the two-time wavelength mode of the second antenna element may be used to enable the first antenna element and the second antenna element to be intra-frequency.

Figure 49:
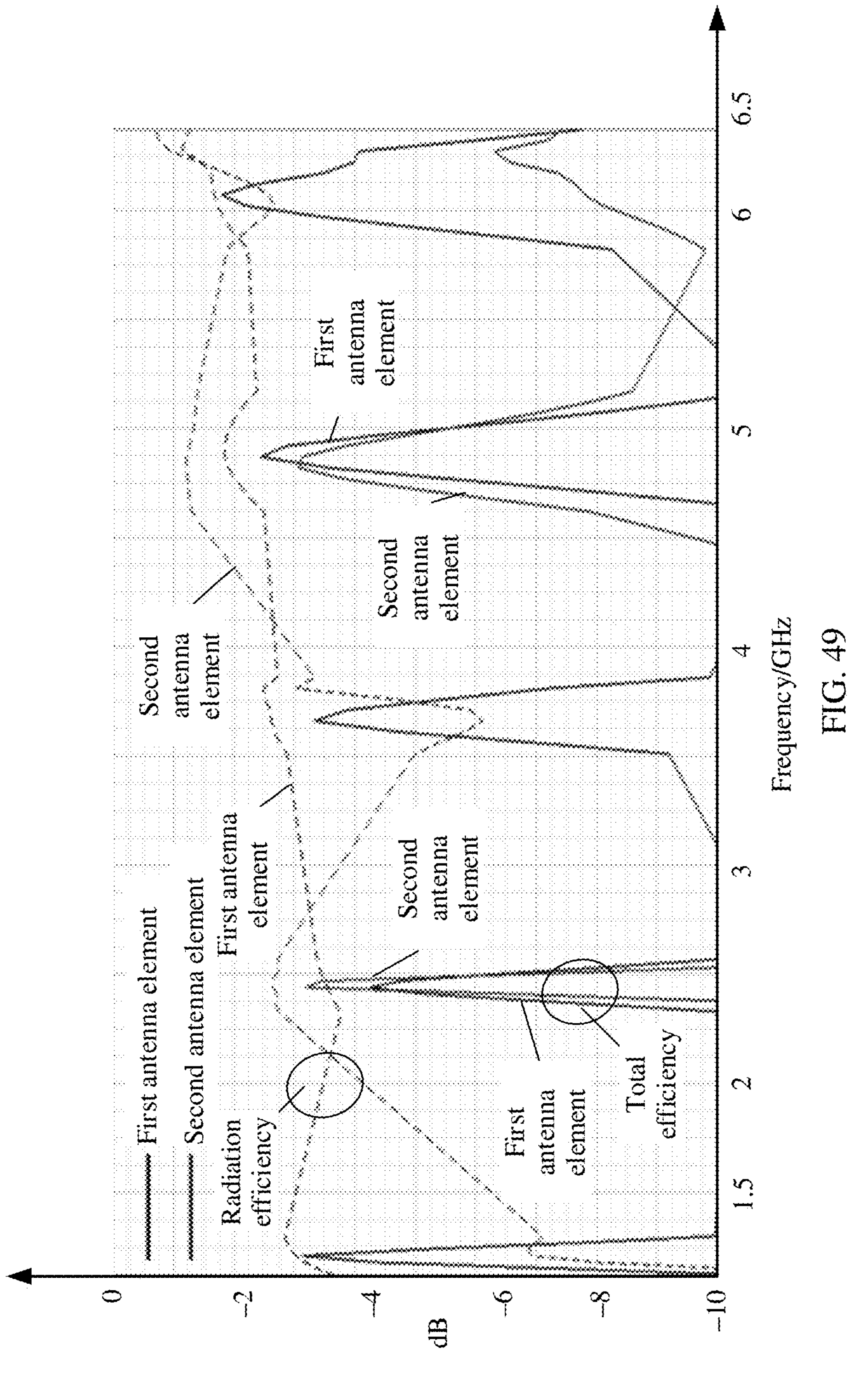
FIG. 49 is a simulation result diagram of efficiency of the antenna structure shown in FIG. 45.
Figure 50:
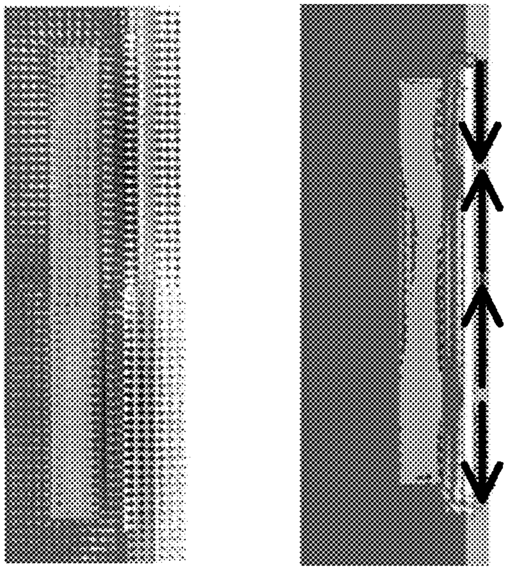
FIG. 50 is a schematic diagram of electric field distribution and current distribution when a first feed unit in the antenna structure shown in FIG. 45 operates.
Figure 51:
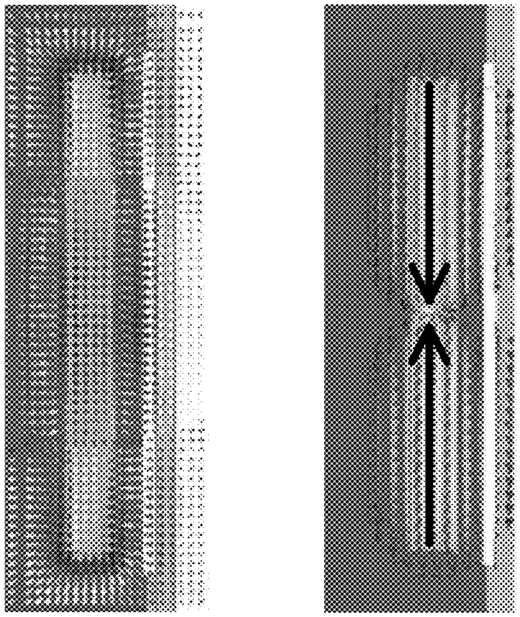
FIG. 51 is a schematic diagram of electric field distribution and current distribution when the second feed unit in the antenna structure shown in FIG. 36 operates.
Figure 52:
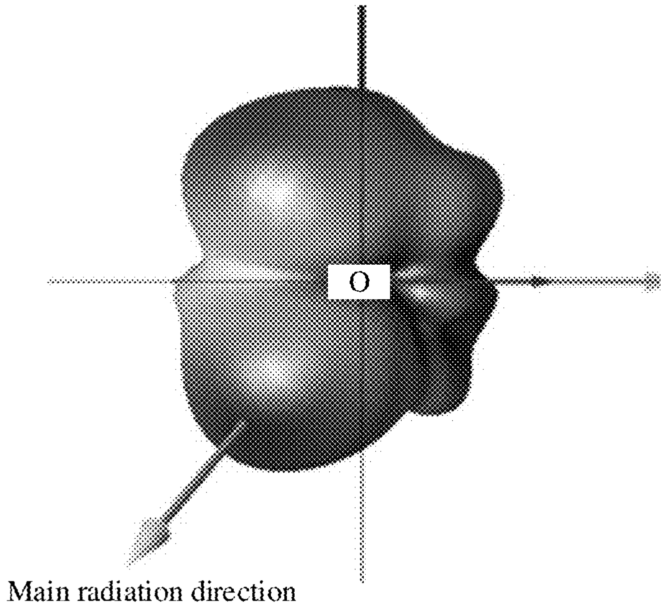
FIG. 52 is a pattern of the first feed unit in the antenna structure shown in FIG. 45 when the first feed unit operates.
Figure 53:
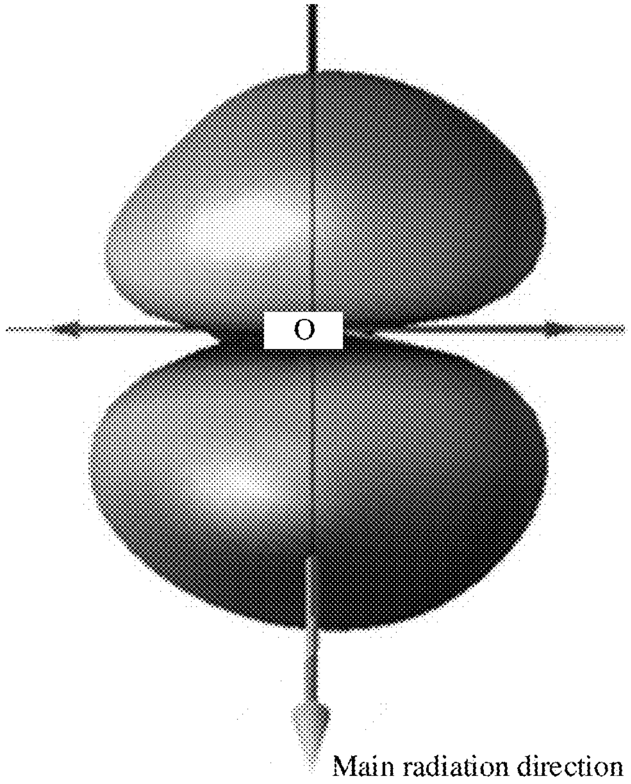
FIG. 53 is a pattern of a second feed unit in the antenna structure shown in FIG. 45 when the second feed unit operates.

FIG. 49 to FIG. 44 are schematic diagrams of simulation results according to embodiments of this application. FIG. 49 is a simulation result diagram of efficiency of the antenna structure shown in FIG. 45. FIG. 50 is a schematic diagram of electric field distribution and current distribution when a first feed unit in the antenna structure shown in FIG. 45 operates. FIG. 51 is a schematic diagram of electric field distribution and current distribution when the second feed unit in the antenna structure shown in FIG. 36 operates. FIG. 52 is a pattern of the first feed unit in the antenna structure shown in FIG. 45 when the first feed unit operates. FIG. 53 is a pattern of a second feed unit in the antenna structure shown in FIG. 45 when the second feed unit operates.

As shown in FIG. 49, total efficiency of both the first antenna element and the second antenna element on an intra-frequency band is greater than −10 dB. The first antenna element and the second antenna element have high total efficiency. In addition, on the frequency band, radiation efficiency of the first antenna element and radiation efficiency of the second antenna element are equivalent, a difference between the radiation efficiency of the first antenna element and the radiation efficiency of the second antenna element is within 1.5 dB, and the first antenna element and the second antenna element have similar radiation performance.

FIG. 50 and FIG. 51 show electric field distribution and current distribution corresponding to a resonance point of the first antenna element and a resonance point of the second antenna element.

As shown in (a) in FIG. 50, when the first feed unit performs feeding, electric fields generated by the first antenna element at 2.45 GHz are anti-symmetrically distributed. As shown in (b) in FIG. 50, when the first feed unit performs feeding, currents generated by the first antenna element at 2.45 GHz are anti-symmetrically distributed.

As shown in (a) in FIG. 51, when the second feed unit performs feeding, electric fields generated by the second antenna element at 2.45 GHz are symmetrically distributed. As shown in (b) in FIG. 51, when the second feed unit performs feeding, currents generated by the second antenna element at 2.45 GHz are symmetrically distributed.

Because the electric field and the current generated by the first antenna element are orthogonal to the electric field and the current generated by the second antenna element, isolation between the first antenna element and the second antenna element is good.

It should be understood that, because the electric field and the current generated by the first antenna element are orthogonal to the electric field and the current generated by the second antenna element, corresponding patterns differ greatly, as shown in FIG. 52 and FIG. 53. In addition, as shown in FIG. 46, in an interval of 1 GHz to 7 GHZ, the first antenna element and the second antenna element have two intra-frequency bands (near 2.5 GHz and near 4.9 GHZ). In this embodiment of this application, for brevity of description, only a simulation result diagram near 2.5 GHz is provided. When the first antenna element and the second antenna element are near 4.9 GHZ, similar effect is generated. Details are not described one by one herein in this application.

In the antenna structure shown in FIG. 45, an example in which the first antenna element and the second antenna element are a one-time wavelength slot antenna and a one-time wavelength wire antenna is used for description. The first antenna element and the second antenna element correspond to the third antenna pair shown in FIG. 12. As shown in FIG. 46, in the foregoing embodiment, the one-time wavelength mode of the first antenna element and the one-time wavelength mode of the second antenna element are used to enable the first antenna element and the second antenna element to be intra-frequency. The electric field or the current generated by the first antenna element in an offset central feed manner is orthogonal to the electric field or the current generated by the second antenna element in a symmetrical central feed manner, so that the first antenna element and the second antenna element maintain good isolation on an intra-frequency band. Alternatively, refer to the third antenna pair in FIG. 13. A size of the slot and a size of the first radiator 321 may be reduced, so that the first antenna element and the second antenna element are a half wavelength slot antenna and a half wavelength wire antenna.

In this case, the first antenna element performs feeding in an offset central feed manner, and electric fields generated by the half wavelength slot antenna are symmetrically distributed. Therefore, to ensure that the first antenna element and the second antenna element maintain good isolation on an intra-frequency band, the electric fields generated by the second antenna element needs to be anti-symmetrically distributed, and the second antenna element 210 needs to generate anti-symmetrically distributed electric fields in an anti-symmetrically central feed manner. The half wavelength mode of the first antenna element and the half wavelength mode of the second antenna element may be used to enable the first antenna element and the second antenna element to be intra-frequency. In addition, an area that is of a metal layer and that is occupied by the antenna structure can be reduced.

A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An electronic device comprising an antenna structure, wherein the antenna structure comprises:

a first antenna element, wherein the first antenna element comprises a first slot and a first feed point; and a second antenna element, wherein the second antenna element comprises a second slot and a second feed point, wherein the first slot and the second slot extend in a first direction and are spaced apart in a second direction, the second direction is perpendicular to the first direction, projections of the first slot and the second slot in the second direction at least partially overlap, a spacing distance between the first slot and the second slot in the second direction is less than a quarter of a first wavelength or a quarter of a second wavelength, a spacing distance between a first virtual symmetry axis of the first slot and a second virtual symmetry axis of the second slot in the first direction is less than a quarter of the first wavelength or a quarter of the second wavelength, the first wavelength corresponds to a first operating frequency band of the first antenna element, and the second wavelength corresponds to a second operating frequency band of the second antenna element, wherein the first feed point is disposed in a central region of the first slot, or the first feed point is disposed at an end of the first slot, and the first feed point is configured to feed the first antenna element, and wherein the second feed point is disposed at an end of the second slot, and the second feed point is configured to feed the second antenna element, and wherein the first operating frequency band of the first antenna element is the same as or adjacent to the second operating frequency band of the second antenna element.

2. The electronic device according to claim 1, wherein that the first operating frequency band is adjacent to the second operating frequency band includes that a difference between a start frequency point of the first operating frequency band and an end frequency point of the second operating frequency band is less than 10% of a center frequency of the first operating frequency band, and a first frequency of a first frequency point in the first operating frequency band is greater than a second frequency of a second frequency point in the second operating frequency band.

3. The electronic device according to claim 1, wherein the first virtual symmetry axis of the first slot overlaps the second virtual symmetry axis of the second slot.

4. The electronic device according to claim 1, wherein the first feed point is disposed in the central region of the first slot, a first electrical length of the first slot is the first wavelength, and a second electrical length of the second slot is the second wavelength.

5. The electronic device according to claim 1, wherein the first feed point is disposed at the end of the first slot, a first electrical length of the first slot is a half of the first wavelength, and a second electrical length of the second slot is the second wavelength.

6. The electronic device according to claim 5, wherein the first feed point and the second feed point are disposed on a same side of a virtual axis, the virtual axis is the first virtual symmetry axis of the first slot or the second virtual symmetry axis of the second slot, and the virtual axis is perpendicular to the first direction.

7. The electronic device according to claim 1, wherein the spacing distance between the first slot and the second slot in the second direction is less than 10 mm.

8. The electronic device according to claim 1, wherein the electronic device further comprises:

one or more conductive parts, wherein the first slot of the first antenna element is either one of:

a slot disposed on a conductive part in the one or more conductive parts, or a slot formed between at least two of the one or more conductive parts.

9. The electronic device according to claim 1, wherein the electronic device further comprises:

one or more conductive parts, wherein the second slot of the second antenna element is either one of:

a slot disposed on a conductive part of the one or more conductive parts, or a slot formed between at least two of the one or more conductive parts.

10. An electronic device comprising an antenna structure, wherein the antenna structure comprises:

a first antenna element, wherein the first antenna element comprises a slot and a first feed point; and a second antenna element, wherein the second antenna element comprises a radiator and a second feed point, wherein the slot and the radiator extend in a first direction and are spaced apart in a second direction, the second direction is perpendicular to the first direction, projections of the slot and the radiator in the second direction at least partially overlap, a spacing distance between the slot and the radiator in the second direction is less than a quarter of a first wavelength or a quarter of a second wavelength, and a spacing distance between a first virtual symmetry axis of the slot and a second virtual symmetry axis of the radiator in the first direction is less than a quarter of the first wavelength or a quarter of the second wavelength, the first wavelength corresponds to a first operating frequency band of the first antenna element, and the second wavelength corresponds to a second operating frequency band of the second antenna element, wherein the first feed point is disposed at an end of the slot, and the first feed point is configured to feed the first antenna element, and wherein the second feed point is disposed in a central region of the radiator, or the second feed point is disposed at an end of the radiator, and the second feed point is configured to feed the second antenna element, and wherein the first operating frequency band of the first antenna element is the same as or adjacent to the second operating frequency band of the second antenna element.

11. The electronic device according to claim 10, wherein the first virtual symmetry axis of the slot overlaps the second virtual symmetry axis of the radiator.

12. The electronic device according to claim 10, wherein a first electrical length of the slot is the first wavelength, and a second electrical length of the radiator is the second wavelength.

13. The electronic device according to claim 10, wherein the electronic device further comprises:

one or more conductive parts, wherein the slot of the first antenna element is either one of:

a slot disposed on a conductive part in the one or more conductive parts, or a slot formed between at least a first conductive part and a second conductive part in the one or more conductive parts.

14. The electronic device according to claim 13, wherein the radiator of the second antenna element is a third conductive part in the one or more conductive parts, and two ends of the radiator are open.

15. An electronic device comprising an antenna structure, wherein the antenna structure comprises:

a first antenna element, wherein the first antenna element comprises a first radiator and a first feed point; and a second antenna element, wherein the second antenna element comprises a second radiator and a second feed point, wherein the first radiator and the second radiator are disposed in parallel and are spaced apart, a spacing distance between the first radiator and the second radiator is less than a quarter of a first wavelength or a quarter of a second wavelength, the first wavelength corresponds to a first operating frequency band of the first antenna element, the second wavelength corresponds to a second operating frequency band of the second antenna element, and a first electrical length of the first radiator is the first wavelength or a second electrical length of the second radiator is the second wavelength, wherein a first electric field generated by the first antenna element is orthogonal to a second electric field generated by the second antenna element, or a first current generated by the first antenna element is orthogonal to a second current generated by the second antenna element, and wherein the first operating frequency band of the first antenna element is the same as or adjacent to the second operating frequency band of the second antenna element.

16. The electronic device according to claim 15, wherein first electric fields generated by the first antenna element are anti-symmetrical along a virtual axis, second electric fields generated by the second antenna element are symmetrical along the virtual axis, and the virtual axis is a first virtual symmetry axis of the first radiator or a second virtual symmetry axis of the second radiator.

17. The electronic device according to claim 15, wherein first currents generated by the first antenna element are anti-symmetrical along a virtual axis, second currents generated by the second antenna element are symmetrical along the virtual axis, and the virtual axis is a first virtual symmetry axis of the first radiator or a second virtual symmetry axis of the second radiator.

18. The electronic device according to claim 10, wherein the spacing distance between the slot and the radiator in the second direction is less than 10 mm.

19. The electronic device according to claim 10, wherein a first electrical length of the slot is a half of the first wavelength, and a second electrical length of the radiator is the second wavelength.

20. The electronic device according to claim 10, wherein the first feed point and the second feed point are disposed on a same side of a virtual axis, the virtual axis is the first virtual symmetry axis of the slot or the second virtual symmetry axis of the radiator, and the virtual axis is perpendicular to the first direction.

* * * * *